United States Patent [19]

Nutten et al.

[11] E Re. 31,233

[45] Reissued May 10, 1983

BEST AVAILABLE COPY

[54] CHARGE FORMING METHOD AND APPARATUS WITH OVERSPEED GOVERNOR

[75] Inventors: Warren D. Nutten, Grafton, Wis.; Bernard C. Phillips, Toledo, Ohio

[73] Assignee: Borg-Warner Corporation, Chicago, Ill.

[21] Appl. No.: 86,619

[22] Filed: Oct. 19, 1979

Related U.S. Patent Documents

Reissue of:

[64] Patent No.: 3,738,608
Issued: Jun. 12, 1973
Appl. No.: 74,812
Filed: Sep. 23, 1970

U.S. Applications:

[62] Division of Ser. No. 766,580, Oct. 10, 1968, abandoned.

[51] Int. Cl.[3] ..... F02D 9/00; F02D 11/02

[52] U.S. Cl. ..... 123/330; 123/319; 123/332; 123/349; 123/198 D; 123/400; 123/363; 251/76; 261/DIG. 68

[58] Field of Search ..... 123/103, 198 DB, 100, 123/101, 115, 330, 332, 349, 198 D, 400, 363, 123/319; 137/38, 45; 251/76; 261/DIG. 68

[56] References Cited

U.S. PATENT DOCUMENTS

| | | | |
|---|---|---|---|
| 1,429,448 | 9/1922 | Noble | 184/26 |
| 1,624,093 | 4/1927 | Davis | 137/38 |
| 1,645,661 | 10/1927 | Pillars | 184/26 |
| 1,828,650 | 10/1931 | Duer et al. | 123/106 |
| 2,098,570 | 11/1937 | Davis | 184/26 |
| 2,529,770 | 11/1950 | Hanson | 137/153 |
| 2,702,559 | 2/1955 | Bodine | 137/38 |
| 3,521,652 | 7/1970 | Reeks | 123/198 |
| 3,601,102 | 8/1971 | Schneider | 123/119 |

FOREIGN PATENT DOCUMENTS

| | | | |
|---|---|---|---|
| 212651 | 12/1966 | Sweden | 123/103 |

*Primary Examiner*—Ronald B. Cox
*Attorney, Agent, or Firm*—Florian S. Gregorczyk

[57] ABSTRACT

The invention disclosed embraces a charge forming method of and apparatus embodying an instrumentality responsive to engine vibrations or disturbances brought into operation when the engine reaches a predetermined speed to automatically deliver excess fuel to the engine thereby momentarily providing a nonignitible mixture preventing overspeeding of the engine.

7 Claims, 76 Drawing Figures

CHARGE FORMING METHOD AND APPARATUS WITH OVERSPEED GOVERNOR

Matter enclosed in heavy brackets [ ] appears in the original patent but forms no part of this reissue specification; matter printed in italics indicates the additions made by reissue.

This application is a *reissue of Ser. No. 74,812, now Patent No. 3,738,608 and a* division of my copending application Ser. No. 766,580, filed Oct. 10, 1968, now abandoned.

The invention relates to a method of and apparatus for controlling delivery of fuel and air mixture to an internal combustion engine to normally supply a power mixture for engine operation under load conditions and to automatically modify the mixture at predetermined engine speed to govern the engine and prevent excessive high speed.

Internal combustion engines of the reciprocating piston type and particularly two cycle engines are used extensively for powering tools, such as chain saws, and for other uses where the engine is periodically subjected to high loads. When the load is suddenly reduced or removed, overspeeding of the engine results if the throttle remains in full open position. One of the most important uses of small two cycle engines where such overspeeding of the engine is encountered is that of operating chain saws. In the felling of trees or cutting of logs and tree limbs by the use of an engine driven chain saw, the saw is subjected to intermittent loading. When cutting a log or limb, the load on the engine endures until the log or limb is severed. When the saw cut is completed, the saw breaks through and the engine, being momentarily unloaded, attains an excessively high speed within a fraction of a second after the load is removed. Overspeeding of a small engine, particularly an engine of the two cycle type, may result in severe damage to the engine for several reasons. As the lubricant for a two-cycle engine is contained in the liquid fuel there may be insufficient lubrication at excessive high speed. The components of the engine subjected to excessive high speed may be broken or fractured by centrifugal forces. As running friction is greatly increased at high engine speeds, piston or bearing seizure may ensue rendering the engine inoperable.

If the operator does not instantly reduce the speed of the engine by manipulation of the throttle when a no load condition occurs, engine damage is liable to ensue. Chain saw operators, in trimming limbs from a felled tree are prone to walk along the tree trunk cutting off the limbs successively while holding the throttle continuously in wide open position causing severe overspeeding of the engine between the limb cutting operations, a practice which usually results in damage to the engine. Such conditions of operation greatly reduce engine life and subject the saw manufacturer to excessive warranty claims. The same difficulties are encountered in other uses of internal combustion engines where the engine is subjected to overspeeding under no load conditions.

The invention embraces a method of preventing excessive high speed of an internal combustion engine by automatically modifying the fuel and air ratio of the fuel and air mixture when the engine exceeds a predetermined speed, the modification or change in fuel to air ratio being effected through a medium or means responsive to engine vibrations or disturbances independently of the aspiration or reduced pressure existent in the charge forming apparatus or carburetor providing the normal fuel and air mixture.

Another object of the invention resides in a method of governing the operation of an internal combustion engine, the method involving the automatic delivery of an excess amount of liquid fuel to the engine whenever the engine attains a predetermined speed, the delivery of excess fuel being controlled by a vibration responsive instrumentality.

Another object of the invention resides in a method of governing or limiting the speed of an internal combustion engine to prevent overspeeding of the engine involving a medium responsive to engine vibration occurring at a predetermined engine speed effective to superimpose excess liquid fuel on the normal fuel and air mixture supplied to an engine to effect an impaired or slow burning mixture resulting in an instantaneous decrease in the power of the engine and hence a substantial reduction in engine speed.

Another object of the invention resides in a method of governing the speed of an internal combustion engine involving the automatic delivery of an excess of liquid fuel into any region of the induction system through the use of an instrumentality responsive to a predetermined frequency of vibration of the engine.

Another object of the invention resides in an apparatus or device activated by or rendered out of phase with engine vibration of predetermined frequency to thereby deliver an excess of fuel into the induction system operative to reduce the engine speed.

Still another object of the invention is the provision in the induction system of an internal combustion engine of a vibration responsive valve rendered effective at a predetermined frequency to admit an excess of liquid fuel into the induction system or charge forming device to thereby reduce engine speed.

Another object of the invention is the provision of a vibration responsive valve associated with the induction system or charge forming apparatus for an internal combustion engine intercalated with fuel conveying passage means for delivering excess fuel to the engine at a predetermined frequency of vibration of the engine to prevent overspeeding thereof.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

The method and the apparatus of the invention involve feeding an excess of liquid fuel to a reciprocating piston internal combustion engine of either the two cycle or four cycle type through the use of a vibration responsive body actuated by or rendered out of phase with engine vibrations or disburbance occurring at a particular speed of the engine to cause oscillation or relative displacement of the body and thereby admit fuel into the engine induction system in an amount effective to reduce the engine speed and prevent overspeed of the engine.

The apparatus for accomplishing this method is referred to herein generally as a vibration responsive instrumentality, means or unit providing an overspeed governor, the governing medium being responsive to and actuated or displaced by engine vibrations when the engine attains a predetermined speed. The overspeed governor method and arrangement of the invention have particular utility with low horsepower two and four cycle engines and especially engines employed for powering chain saws, lawn mowers, portable drills and the like.

It is found that the vibration responsive means or valve may be arranged to deliver liquid fuel into various regions of the induction system of an engine and the drawings illustrate various arrangements for positioning or mounting a vibration responsive body or valve whereby it is subjected to engine vibrations and is effective at a particular frequency of vibration to be moved or oscillated by such vibration to admit excess fuel to the engine for engine governing purposes.

Figure 1:
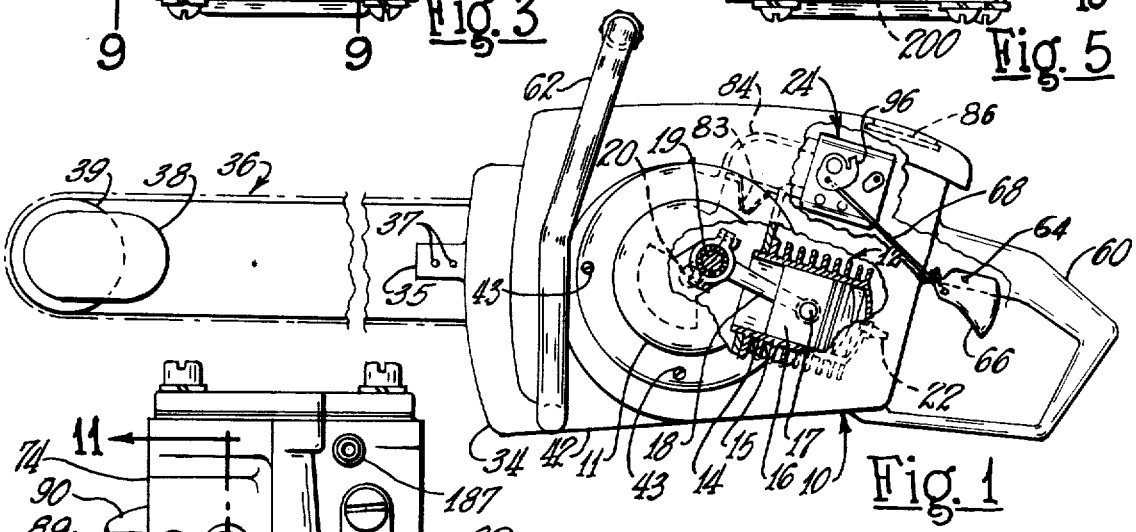
FIG. 1 is a side elevational view of a portion of a chain saw of conventional construction illustrating the engine and a combined diaphragm carburetor and fuel pump construction embodying a form of the invention.
Figure 4:
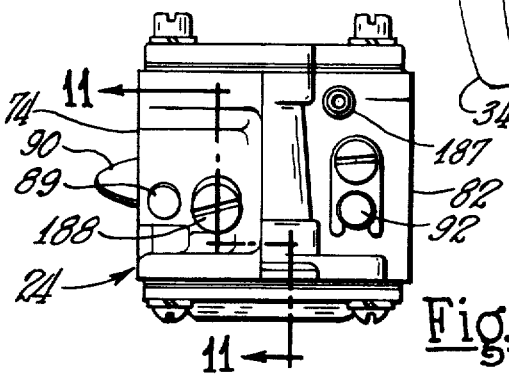
FIG. 4 is an elevational view of the opposite side of the construction shown in FIG. 2.

Referring initially to FIG. 1, there is illustrated a side elevational view, partly in section, of a portion of the power driven chain saw showing a form of charge forming apparatus or carburetor embodying the invention associated with the engine. The arrangement shown in FIG. 1 is inclusive of a chain saw frame construction 10 which forms an integral part of an engine crankcase 11 of a two cycle engine 12 on which is mounted a cylinder 14 having cooling fins 15. Slidable in the cylinder 14 is a conventional piston 16 having a piston pin 17 connected by a connecting rod 18 with a crank pin 19 on a crank arm of a crankshaft 20 journally supported in the crankcase 11.

The engine illustrated is of the two cycle type, viz. wherein the fuel and air mixture is admitted into the chamber provided by the crankcase 11 and compressed therein upon the down stroke of the piston 16, the compressed mixture being then delivered through a suitable port into the combination chamber of the cylinder above the piston in the conventional manner. The mixture is ignited by a spark plug 22 at each revolution of the crankshaft.

The fuel and air combustible mixture is provided through a combined fuel pump and carburetor or charge forming apparatus 24 mounted by the engine crankcase, the carburetor illustrated being shown in detail in FIGS. 2 through 11 and hereinafter described.

The frame 10 is fashioned with a forwardly extending portion 34 to which is secured an elongated plate-like member 35 providing a support and guide means for an endless chain type saw construction 36. The saw support plate 35 is secured to the frame by means of bolts 37. The forward end of the support member 35 is provided with a housing 38 which journally supports a roller guide 39 which is engaged by the chain saw 36 in the conventional manner.

A removable housing on the opposite side of housing 42 encloses a conventional centrifugally-actuated clutch for establishing a drive connection between the engine crankshaft 20 and a saw driving sprocket (not shown) when the engine is operated above idling speed. The housing also encloses a fuel tank (not shown) providing a supply of liquid fuel to the carburetor and fuel pump construction 24.

The chain saw frame 10 is equipped with tubular handle or hand grip members 60 and 62 for the operators convenience in handling the chain saw. Pivotally supported upon a pin 64 is a throttle operating member 66 which is connected by a link 68 to the throttle valve of the carburetor hereinafter described.

In operation, when the engine is idling, the clutch contained within the housing 42 disengages the engine crankshaft from the saw chain 36. When the operator manipulates the throttle control member or trigger 66, the throttle valve in the carburetor is opened to admit increased fuel and air mixture into the engine crankcase causing the engine to increase in speed. The increased engine speed effects actuation of the centrifugal clutch in the housing 42 to establish a drive connection between the engine and the saw chain 36.

The form of the combined fuel pump and carburetor 24 is illustrated in FIGS. 2 through 12 and is of a type embodying a metering diaphragm and a fuel pumping diaphragm, this type being used extensively with chain saw engines by reason of its compact construction and is position free, ie. is operable in all angular positions including inverted position. The invention of overspeed governor device is embodied in the carburetor and fuel pump construction shown in FIGS. 2 through 11. The carburetor and fuel pump construction shown in FIGS. 2 through 11 is of the general character shown in Phillips' U.S. Pat. No. 3,275,306.

The carburetor or charge forming device of the construction 24 is inclusive of a body 74, preferably of cast metal, the body being fashioned with an air and fuel mixing passage 76 having an air inlet region 77, a Venturi 78 having a choke band or restricted region 79, the mixing passage having a mixture outlet region 80.

Figure 2:
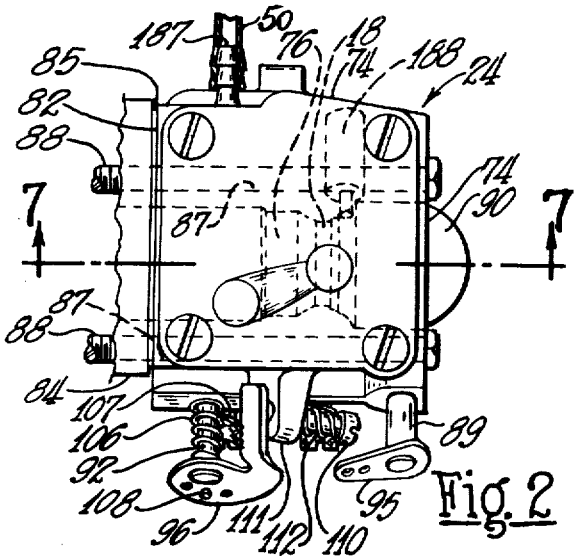
FIG. 2 is a top plan view of a combined diaphragm carburetor and diaphragm fuel pump construction shown in FIG. 1 embodying a form of the invention.

The mixture outlet end of the carburetor body has a uniplanar surface 82 which is adapted to be secured to n elbow-shaped manifold 84 connected with the engine crankcase 11, a suitable gasket 85, shown in FIG. 2, being disposed between the mounting surface 82 and the manifold 84.

The mixture outlet 80 registers with the manifold 84, a conventional one-way reed valve construction 83 being disposed at the entrance of the manifold into the crankcase as is con-ventional with a two cycle engine to admit mixture into the crankcase but prevent reverse flow into the mixing passage of the carburetor. The opposite end of the body 10 is fitted with an air filter or air cleaner of conventional construction 86, shown in FIG. 1. The body is fashioned with lengthwise arranged bores 87 accommodating bolts 88 shown in broken lines in FIG. 2 securing the carburetor to the crankcase.

Figure 6:
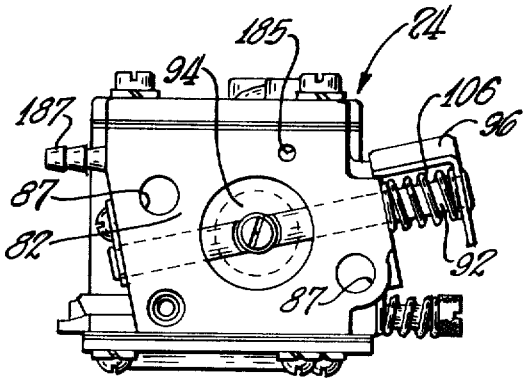
FIG. 6 is a view of the mixture outlet end of the carburetor and fuel pump construction.
Figure 3:
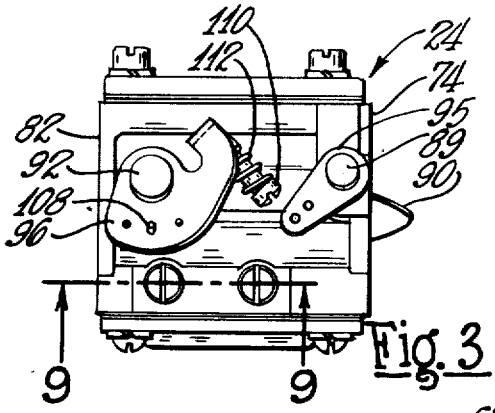
FIG. 3 is a side elevational view of the construction shown in FIG. 2.
Figure 5:
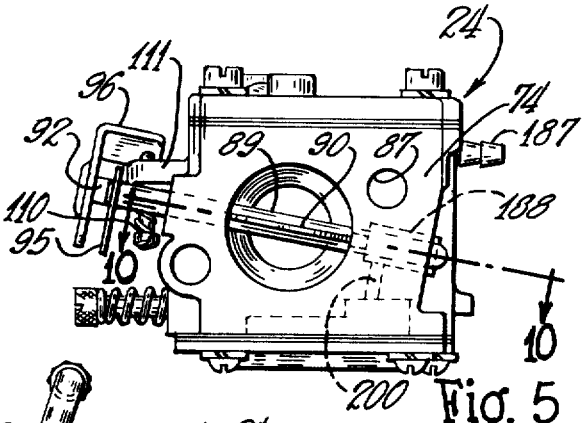
FIG. 5 is a view of the air inlet end of the carburetor and fuel pump construction shown in FIG. 2.

Extending across the air inlet region 77 and journaled in bores in the carburetor body is a shaft 89 equipped with a disc-type choke valve 90, and extending across the mixture outlet 80 and journaled in bores in the body 74 is a shaft 92 equipped with a disc-type throttle valve 94. As shown in FIGS. 5 and 6, the choke valve shaft 89 and the throttle valve shaft 92 are arranged at an angle of about ten degrees with respect to a horizontal plane to accommodate internal fuel passages.

Figure 10:
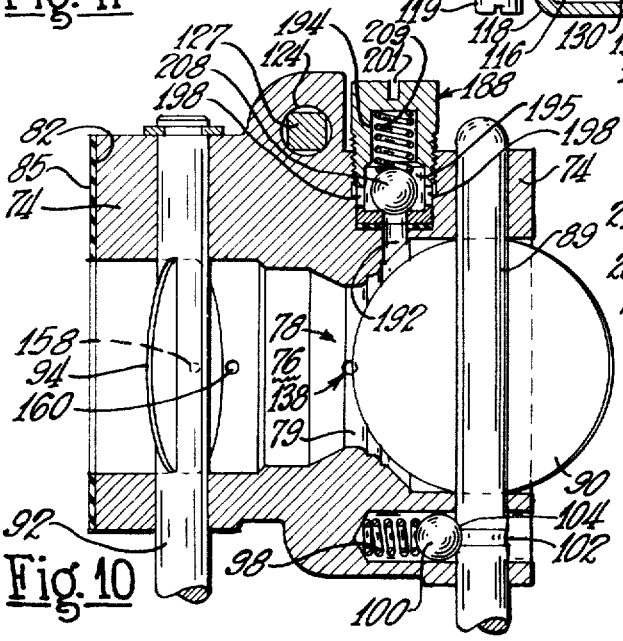
FIG. 10 is an enlarged sectional view taken substantially on the line 10—10 of FIG. 5 illustrating one form of overspeed governor means embodied in the carburetor.

The shaft 89 is provided with an arm 95 for manipulating the choke valve 90, and the shaft 92 provided with an arm 96 for manipulating the throttle valve 94. As shown in FIG. 1, the throttle actuating link 68 is connected with the arm 96. As shown in FIG. 10, the body 74 has a bore accommodating a coil spring 98 which biases a detent or ball 100 into a shallow groove 102 formed in the choke valve shaft 89. As shown in FIG. 10, the shaft 89 at one region of the groove 102 is formed with a recess 104 to accommodate the ball 100 for resiliently retaining the choke valve 90 in open position.

Figure 7:
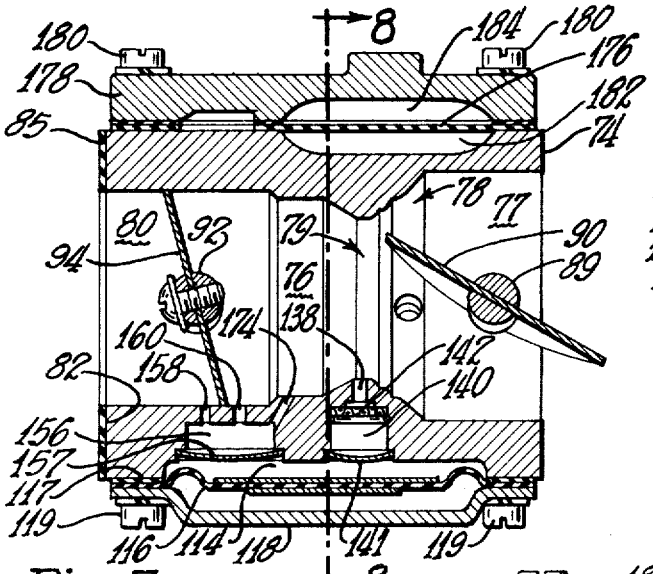
FIG. 7 is an enlarged longitudinal sectional view through the carburetor and fuel pump construction, the section line being taken substantially on the line 7—7 of FIG. 2.

A coil spring 106 surrounds a portion of the shaft 92 exteriorly of the body 74, one end 107 of the spring being anchored to the body, the other end 108 engaging the arm 96, as shown in FIG. 2, the spring biasing the throttle valve 94 toward closed or engine idling position, viz. the position shown in FIG. 7. An abutment screw 110 is threaded into a bore in a lug 111 on the body 74 for adjusting the engine idling position of the throttle valve 94. A coil spring 112 surrounds the screw 110 for frictionally retaining the screw in adjusted position.

Figure 8:
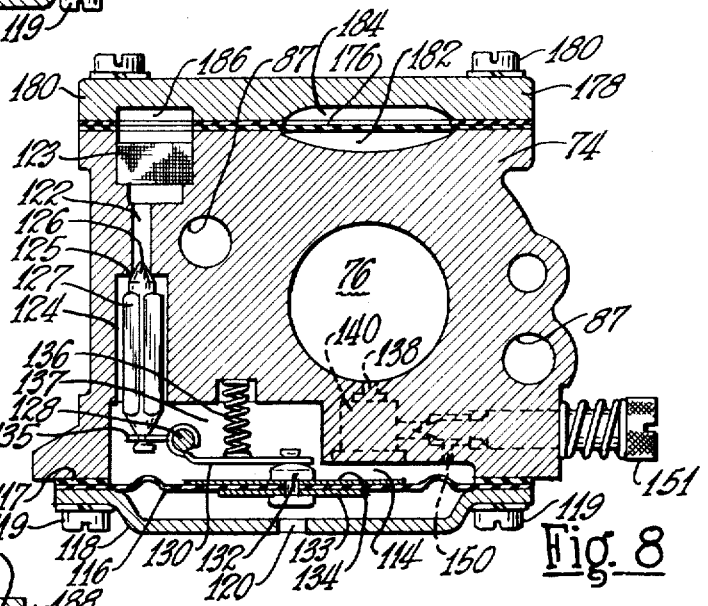
FIG. 8 is an enlarged transverse sectional view taken substantially on the line 8—8 of FIG. 7.

As shown in FIGS. 7 and 8, the body 74 is formed with a circular shallow recess 114, a flexible metering diaphragm 116 extending across the recess, the recess 114 providing a fuel chamber. An annular gasket 117 is disposed between an annular planar surface on the carburetor body and the periphery of the metering diaphragm 116.

A closure plate 118 is secured to the body 74 by screws 119, the latter extending through openings in the periphery of the diaphragm 116 and gasket 117 to secure these parts in assembled relation. The closure plate 118 has a vent opening 120 to facilitate movement of the diaphragm 116.

The diaphragm 116 is adapted to be actuated or flexed by engine aspiration or reduced pressure established in the mixing passage 76 for metering or controlling flow of liquid fuel into the diaphragm fuel chamber 114, the latter being unvented except through the fuel flow channels opening into the mixing passage as hereinafter described. The carburetor body is fashioned with a fuel inlet duct 122 in communication with a delivery passage of a fuel pump hereinafter described, the duct 122 opening into an enlargement containing a fuel filter or screen 123.

A bore 124 of larger diameter than the inlet duct or port 122 is in communication therewith providing a ledge 125 which forms a valve seat for a conically-shaped valve portion 126 of an elongated inlet valve body 127. Fuel from the pump flows through duct 122 and past valve 126 when the latter is open, thence through the bore 124 into the fuel chamber 114. Pivoted upon a fulcrum pin 128 is a motion multiplying lever 130, the long end of the lever being articulately connected with a tenon formed on a metal button 132 carried by the metering diaphragm 116.

Disposed at opposite sides of the metering diaphragm are metal reinforcing discs 133 and 134, the button 132 having a tenon extending through openings in the discs in the metering diaphragm and the ends waged as shown in FIG. 8. The short end 135 of the lever 130 is articulately connected with the inlet valve body 127. An expansive coil spring 136 engages the lever, as shown in FIG. 8, biasing the inlet valve body 127 to close the port 122 by the valve portion 126. The upper wall of the fuel chamber 114 is fashioned with an elongated recess 137 to accommodate movement of the lever 130.

When reduced pressure in the mixing passage is communicated to the fuel chamber 114, the diaphragm 116 is flexed upwardly, swinging the lever 130 about its pivot 128 and withdrawing the valve 126 from closed position to admit fuel from duct 122 into the fuel chamber 114.

The carburetor includes a main or primary fuel delivery system for delivering fuel into the mixing passage for normal engine operation, and a secondary fuel delivery system for engine idling and low speed operation. The main fuel delivery system includes a main orifice 138 which is in communication with a bore or fuel well 140, shown in FIGS. 7, 8 and 9, the lower end being closed by a Welsh plug 141. A fine mesh screen 142 is disposed in the upper end of the well 140 adjacent the main fuel delivery orifice 138, the screen 142 functioning to hold liquid fuel in the well 140 when the engine idling orifice is in operation to prevent uncontrolled back bleeding of air through the main orifice 138 into the fuel being delivered to the engine idling orifice.

Disposed in a threaded bore in the body 74 is a manually operated valve body 144 having a tenon portion extending through a bore 146, the tenon portion being provided with a needle valve 148 which extends into and cooperates with a restricted passage 149 conveying fuel into the well 140. The bore 146 is in communication with the fuel chamber 114 by a fuel supply passage 150 shown in broken lines in FIGS. 8 and 9. The valve body 144 is provided with a knurled head 151 for adjusting the position of the needle valve 148 in the restricted passage 149 for regulating or controlling flow of fuel from the fuel chamber 114 into the mixing passage 76.

The secondary or engine idling and low speed fuel delivery system includes a supplemental chamber 156, one wall of the chamber being a Welsh plug 157. An engine idling orifice 158 and a low speed orifice 160 open into the mixing passage from the chamber 156. As shown in broken lines in FIG. 9, a fuel channel or passage 162 conveys fuel from the fuel chamber 114 into a bore 164, a portion of the bore being threaded to accommodate a valve body 166 equipped with a needle valve portion 168, the latter cooperating with a restricted passage 170 which opens into the supplemental chamber 156.

The valve body 166 is provided with a knurled head 172 for adjusting the position of the needle valve 168. Fuel for the engine idling orifice 158 and the low speed orifice 160 flows from the fuel chamber 114 through passage 162, bore 164, thence through the restricted passage 170 to the supplemental chamber 156 for delivery through the secondary orifices.

The needle valve 168 regulates fuel flow to the engine idling and low speed orifices. An air bleed passage 174, shown in FIG. 7, may be provided for admitting a restricted amount of air into the fuel in the supplemental chamber 156.

The arrangement is inclusive of a pulse-operated diaphragm pump construction comprising a flexible pumping diaphragm 176 secured to the side of the carburetor opposite the metering diaphragm 116 by a plate 178 secured in place by screws 180. Formed in the carburetor body at one side of the pumping diaphragm 176 is a cavity 182 providing a fuel chamber. The plate 178 is fashioned with a recess or cavity 184 forming a pumping or pulse chamber, the cavities being disposed in registration, as shown in FIG. 7. The pumping or pulse chamber 184 is in communication with the engine crankcase through a channel system in the plate 178 and carburetor body 74, the channel system having an opening 185, shown in FIG. 6, which registers with an opening in the crankcase boss 84.

The pump construction is of the general character disclosed in Phillips' U.S. Pat. No. 3,275,306. The pumping diaphragm 176 is provided with inlet and outlet flap valves (not shown) whereby pulsation of the portion of the diaphragm 176 forming a common wall of the cavities 182, 184 is vibrated by varying fluid pressures from the crankcase of the two cycle engine, pumping fuel from the fuel tank into the fuel chamber 182 of the pump construction thence past an outlet flap valve (not shown) into a passage 186, shown in FIG. 8, to the inlet port 122 adjacent the inlet valve 126.

The flap valves cooperate with inlet and outlet ports so that at each vibration of the diaphragm 176, fuel is pumped to the region of the inlet passage 122 so that a comparatively low fuel pressure is maintained in the fuel inlet passage 122. A fuel conveying tube 50 from the fuel tank (not shown) in the housing 42 is connected with a nipple 187, shown in FIGS. 2 and 5, the nipple 187 being in communication with the inlet port (not shown) of the fuel pump construction.

In normal operation of the carburetor, the engine in operation develops aspiration or reduced pressure in the mixing passage 76 when the throttle 94 is in substantially open position. The aspiration in the mixing passage is effective through the main orifice 138, fuel well 140, passages 149, 146 and 150 to establish reduced pressure in the fuel chamber 114. The reduced pressure in the chamber 114 elevates the diaphragm 116 swinging the lever 130 in a counterclockwise direction, as viewed in FIG. 8, about its fulcrum 128 and withdrawing the valve 126 away from its seat whereby fuel in the duct 122 flows into the fuel chamber 114 and is delivered through the main orifice 138 into the air stream moving though the mixing passage to provide a combustible mixture for normal engine operation.

The operation of the fuel pump and carburetor so far described is as follows:

Assuming the engine to be in operation, the varying or pulsating fluid pressures developed in the crankcase 11 of the two cycle engine 12, shown in FIG. 1, are communicated to the pulse chamber 184 through the port 185, the varying pressures vibrating the pumping portion of the pumping diaphragm 176 to convey fuel from the fuel tank, shown in FIG. 1, to the inlet port or passage 122 in the carburetor body, shown in FIG. 8.

With the throttle in a substantially opened position, fuel is delivered through the main orifice 138 into the air stream flowing through the mixing passage 76 under the influence of engine aspiration. The engine aspiration or reduced pressure communicated through the fuel channels to the fuel chamber 114, flexes the diaphragm upwardly withdrawing the inlet valve 126 from its seat to facilitate fuel flow through port 122 into the fuel chamber thence into the mixing passage.

The amplitude of aspiration communicated to the fuel chamber 114 determines the amount of flexure of the metering diaphragm 116 and the extent of opening movement of the inlet valve 126 to effect flow of fuel into the fuel chamber 114 at the rate at which fuel is delivered through the main orifice 138. When the throttle is moved to engine idling position, as shown in FIG. 7, the idling orifice 158 is downstream of the throttle valve 94 and the high aspiration on the engine or downstream side of the throttle 94 aspirates fuel through the idling orifice 158 together with a restricted or controlled amount of air admitted to the chamber 156 through the restricted passage 174.

During delivery of fuel through the idling orifice 158, liquid fuel adhering to the fine mesh screen 142 in the region of the main orifice forms a capillary seal to prevent uncontrolled back bleeding of air from the mixing passage through the main orifice 138 so as not to impair the delivery of fuel through the engine idling orifice 158. The low speed orifice 160, together with the engine idling orifice 158, delivers fuel into the mixing passage when the throttle valve 94 is moved to a slightly open position before aspiration is effective on the main fuel delivery orifice 138.

When the engine is operating under load, as, for example, when a sawing operation is being performed by the chain saw, shown in FIG. 1, the load prevents the engine speed from becoming excessive. When the saw breaks through the log or limb, if the operator does not instantly close the throttle, the engine speed greatly increases in a fraction of a second, a condition increasing the liability of damage to the rapidly moving parts of the engine and the saw chain.

The present invention involves a method of and means for delivering an excess amount of fuel to the engine crankcase through the use of a vibration responsive instrumentality or valve means brought into operation automatically when the engine vibration reaches a frequency at which the instrumentality or valve means is responsive to and is displaced to effect delivery of excess fuel to the engine crankcase.

The vibration responsive instrumentality may be disposed in any position where it will be influenced by engine vibration disturbances to perform its engine governing function of delivering excess fuel to the engine crankcase, enrichening the mixture and rendering the mixture slow burning or nonignitible in the engine cylinder, thereby limiting the speed of the engine by substantially instantly reducing the engine speed.

Figure 11:
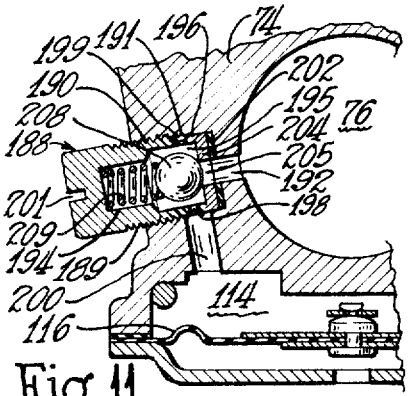
FIG. 11 is an enlarged fragmentary sectional view taken substantially on the line 11—11 of FIG. 4 illustrating the overspeed governor means shown in FIG. 10.

One form of vibration responsive instrumentality, unit or valve means is illustrated in association with the carburetor hereinbefore described, the vibration responsive instrumentality being particularly shown in FIGS. 10 and 11. The engine governing arrangement is inclusive of a cage or fitting 188 having a threaded portion 189 which extends into the threaded portion 190 of a bore 191 fashioned in the carburetor body 74 accommodating a portion of the cage 188.

The bore 191 is in communication with the mixing passage 76 by a port or passage 192 which opens into the mixing passage at the air entrance region of the Venturi 78 between the choke valve shaft 89 and the choke band or most restricted region of the Venturi 78 as shown in FIG. 10. The excess fuel for reducing engine speed is delivered through the port or passage 192. The cage 188 is provided with a bore 194 and a counterbore 195, the counterbore 195 forming a thin walled sleeve or extension 196 of the cage 188. The sleeve portion 196 is fashioned with circumferentially-spaced openings 198, shown in FIGS. 10 and 11, which register with an annular recess 199.

As shown in FIG. 11, a fuel passage or duct 200 has one end opening into the fuel chamber 114, the other end being in communication with the annular recess 199 to facilitate fuel flow from chamber 114 through passage 200, recess 199 and openings 198 into the chamber provided by the counterbore 195. The fitting 188 has a kerf 201 to receive a suitable tool for inserting or removing the fitting.

Disposed in the bore 191 formed in the carburetor is a sealing gasket 202 which may be made of soft copper or the like and contiguous with the gasket is a disc-like annular valve seat 204 fashioned with a central opening, passage or port 205 which registers with the fuel delivery passage 192, as shown in FIG. 11. Disposed in the counterbore or chamber 195 is a vibration responsive body or instrumentality in the form of a ball valve 208, the ball valve 208 being biased to a position closing the port 205 under comparatively light pressure of an expansive coil spring 209.

As shown in FIGS. 10 and 11, the diameter of the vibration responsive body or ball valve 208 is substantially greater than the diameter of the passage 205 whereby the ball valve 208 normally engages the seat 204 and closes the port 205. The ball valve 208, under the influence of the frequency of vibration of the engine at a predetermined speed, will be oscillated, vibrated or displaced relative to or away from engagement with the seat 204 to an extent permitting fuel from the chamber 114 to be delivered, under the influence of engine aspiration, through the registering passages 192 and 205 into the mixing passage 76.

The mass of the valve body or ball 208 and the degree of resilience or pressure of the biasing spring 209 are selected or calibrated whereby the ball valve or body 208 will be displaced from its seat by the frequency of the engine vibrations or disturbances at or near the maximum speed desired for the engine. Assuming that the mass of the ball valve 208 and the biasing pressure of the spring 209 are calibrated so that the ball valve or body 208 will be activated by or rendered out of phase with the engine vibration at an engine speed of 9,000 revolutions per minute, the ball valve 208 will remain in engagement with the valve seat 204 during speeds of the engine up to about 9000 revolutions per minute preventing fuel flow through the passages 205 and 192.

When the engine attains a speed of 9,000 revolutions per minute, the ball valve 208 responds to the engine vibration and is oscillated or displaced, usually sideways in the chamber 195, away from its position blocking the passage 205, whereupon fuel from chamber 114, under the influence of high engine aspiration in the mixing passage due to the high engine speed, effects delivery of liquid fuel through passage 200, annular recess 199, openings 198 and passages 205 and 192 into the mixing passage.

This excess fuel, delivered by way of the mixing passage of the carburetor into the engine crankcase thence to the engine cylinder, provides an overrich fuel and air mixture of a character which is extremely slow burning or may even be nonignitable so that the engine speed is automatically and substantially instantaneously prevented from exceeding the speed of about 9,000 revolutions per minute and is reduced in speed because of the lack of a proper combustible power mixture in the engine cylinder.

While the ball valve 208 may oscillate in a direction lengthwise of the fitting, it is found by stroboscopic tests that the valve or valve body 208 usually tends to oscillate and be displaced sideways of its normal central or port closing position rather than lengthwise of the cage 188. Thus, when the critical speed is reached at which the engine is to be governed, the ball valve 208 will be automatically put into oscillation and displaced from its seat by reason of it being responsive to or out of phase with the engine vibrations or disturbances occurring at or near a speed of 9,000 revolutions per minute. Once the ball valve 208 has been displaced or thrown from its seat, it tends to remain off the seat until the engine speed and hence the vibration frequency are reduced.

The displacement of the ball valve 208 away from its seat whereby excess fuel is delivered through the passage 192 into the mixing passage 76 causes the engine speed to be quickly reduced. Any slight reduction in engine speed changes the frequency of vibration and causes the ball valve to cease oscillation and again seat to close the passage 192. With the throttle valve still open under a no load condition, the engine speed is again increased as soon as the excess fuel delivered through the passage 192 is exhausted by the engine.

It is found that an appreciable reduction in engine speed changes the frequency of vibration and permits the ball valve to be reseated at the reduced frequency of vibration.

This condition may be only momentary because upon the interruption of delivery of excess fuel through the passage 192, the engine again speeds up, and the engine vibration to which the ball valve is responsive is again established and the ball valve again oscillated away or displaced from its seat and excess fuel delivered into the mixing passage. Thus, the governing action of the vibration responsive ball valve or body is, in effect, intermittent but is effective to prevent the engine from appreciably exceeding the speed at which the ball valve will be displaced by engine vibration.

While it may be desired to govern a particular engine at about 9,000 revolutions per minute, it found that the ball valve may be displaced from its seat at an engine speed slightly greater or less than 9,000 revolutions per minute, due probably to movements or vibrations of several components of the engine, and these movements or frequencies of vibrations of the components may vary between substantially identical engines. It is found that for a desired governed speed of 9,000 revolutions per minute, the ball valve will usually be displaced within an engine speed range of 8,700 and 9,300 revolutions per minute. This fluctuation in ball valve displacement within an engine speed range may vary for other maximum speeds at which it may be desired to govern an engine.

As a typical example of the characteristics of the vibration responsive instrumentality or unit for a comparatively small, low horsepower chain saw of conventional construction where a maximum or governed speed of 9,000 revolutions per minute is desired, a ball valve 208 fashioned of stainless steel of a diameter of five thirty-seconds of an inch engaging the seating rim of the seat 204 of a passage or opening 205 of a diameter of three thirty-seconds of an inch, in conjunction with a spring exerting about 12 grams pressure against the ball has been found to function satisfactorily to govern such chain saw engine at a speed not exceeding 9,000 revolutions per minute. Chain saws of different sizes and characteristics usually require different calibration viz. a ball valve of different mass or size, a port of different size or different spring pressure bias on the ball valve.

There are many factors or variables bearing upon the effectiveness or critical frequency of the vibration responsive instrumentality to govern an engine as various engines have different vibration or disturbance characteristics. The pressure of the spring biasing the ball valve 208 toward closed position may be varied depending upon the vibration characteristics of the engine with which it is used. It is found that spring pressures between about 5 grams and 50 grams pressure against a stainless steel ball enables a range of calibration for satisfactory governor operation for most sizes and types of chain saw engine.

Another variable factor bearing upon the calibration of the vibration responsive valve arrangement for satisfactory engine governing purposes involves the amount of excess fuel in addition to the normal mixture admitted into the engine. Some two cycle engines require a comparatively substantial amount of added fuel to prevent them from overspeeding while other engines are sensitive to a comparatively small amount of excess fuel for governing an engine. Thus, in addition to varying the pressure of the spring 209, the valve seat diameter viz. the diameter of the entrance of the fuel passage 205 and the size of the ball 208 may be varied in order to render the overspeed governor effective with engines having particular vibration characteristics.

Another factor involved in the method of governing the engine is the size of the fuel channels or passages of the excess fuel delivery system. For example, the governor arrangement used with a comparatively small engine having low fuel consumption characteristics may be fashioned with a fuel passage 205 in the seat 204 of lesser diameter which, when used with the ball 208, without changing the ball size renders the ball more sensitive to dislodgement from its seat by engine vibration.

In providing the overspeed governor means for engines to be governed at higher speeds, such as speeds of 12,000 revolutions per minute or higher, the size or mass of the valve body 208 is usually reduced. In such governing arrangement, a ball valve or body 208 of lighter weight material may be used, such as a ball of aluminum, nylon or other resinuous plastic material may be employed which will remain on its seat until the engine attains a speed having vibration characteristics effective to dislodge the valve of lesser mass.

Another factor involved in the overspeed governor arrangement of the invention is the diameter of the chamber or counterbore 195 with respect to the diameter of the ball valve 208. In certain installations of the overspeed governor arrangement it is found desirable to restrict the extent of lateral or sidewise movement of the ball 208 by reducing the diameter of the chamber 195 containing the ball valve 208.

For example, in the use of the governor arrangement with certain engines having particular vibration characteristics, it is found that the diameter of the chamber 195 should be in a range of from twelve thousandths to sixteen thousandths of an inch greater than the diameter of the ball 208 to provide satisfactory governing action at the limit of speed desired for the engine.

It is further imperative that where the overspeed governor arrangement is embodied in the carburetor, the carburetor must be securely anchored to the engine crankcase or other mounting on the engine so that the ball valve 208 is rendered responsive solely to vibrations of the engine by eliminating possible independent vibrations of the carburetor body.

Figure 12:
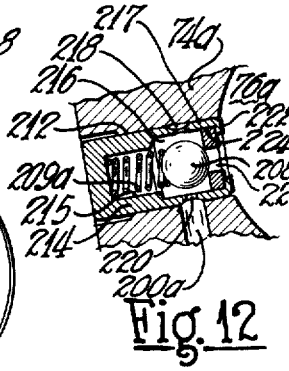
FIG. 12 is a detail sectional view of a modified form of overspeed governor instrumentality.

FIG. 12 illustrates a modified form of overspeed governor means of the invention associated with or embodied in a carburetor of the character shown in FIG. 11. In this form the carburetor body 74a is fashioned with a smooth bore 212 which opens into the mixing passage 76a. The overspeed governor unit includes a cage or hollow fitting 214 provided with a bore 215 and a counterbore 216, the counterbore 216 providing a thin-walled sleeve or extension 217 of the cage 214. The sleeve portion 217 is fashioned with a circumferential shallow groove or recess 218 and circumferentially-spaced openings 220 in communication with the recess.

The carburetor is fashioned with a fuel passage or duct 200a to faciliatate fuel flow from the fuel chamber of the character shown at 114 in FIG. 11 through the circumferential recess 218 and spaced openings 220 into the chamber provided by the counterbore 216.

An annular valve seat 224 is positioned within the sleeve portion 217, and, in assembly, the end region of the sleeve portion is flanged inwardly as at 222, the flange providing an abutment for positioning an annular valve seat 224 in the sleeve 217. The annular valve seat is fashioned with a central opening, passage or port 226 which opens directly into the mixing passage 76a.

In this form of overspeed governor construction, the cage or fitting 214, having a smooth cylindrical exterior surface, is pressed or snugly fitted into the smooth bore 212 to position the flange 222 adjacent or contiguous with the wall of the mixing passage. In the event that the overspeed governor unit requires replacement or service, the fitting 214 and the components assembled therein may be forced into the mixing passage and removed thus facilitating easy replacement or repair.

Disposed in the chamber provided by the counterbore 216 is a vibration responsive body or element in the form of a ball valve 208a, the ball valve being normally biased to a position wherein the ball closes the port or passage 226 under comparatively light pressure of an expansive coil spring 209a. The ball 208a is of lesser diameter than the diameter of the counterbore 216. The mass of the ball 208a is selected or calibrated whereby the ball is responsive to the frequency of vibrations or disturbances of the engine at or near the maximum speed for which the engine is to be governed.

The ball will be vibrated or oscillated at such frequency to a position opening the port 226 for delivery of fuel into the mixing passage to thereby overenrichen the fuel and air mixture and effecting a reduction in engine speed as in the use of the form of the invention shown in FIG. 11. The spring 209a is calibrated to exert sufficient pressure to normally maintain the valve 208a in closed position at engine speeds below that at which it is desired to govern the engine.

It is found that for governing most two cycle engines at desired maximum speeds, a spring pressure in the range hereinbefore mentioned of five grams to fifty grams is usually effective to secure the desired governing action. It is to be understood that while it is desirable to govern most chain saw engines at a maximum speed of about 9,000 revolutions per minute, engines of various sizes are utilized and in larger engines, the maximum speed may be substantially less than 9,000 revolutions per minute, some engines being governed at speeds of about 6,000 revolutions per minute. However, lightweight, high speed engines of low horsepower may be governed at speeds in excess of nine thousand revolutions per minute.

Figure 13:
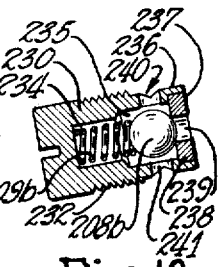
FIG. 13 is a detail sectional view illustrating another form of overspeed governor instrumentality similar to that shown in FIG. 11.

FIG. 13 illustrates a modified form of overspeed governor unit or construction similar to that shown in FIG. 11. In this form the cage or fitting 230 is threaded as at 232 to be received in a threaded bore in the carburetor in the manner shown in FIG. 11. The fitting 230 is fashioned with a bore 234 accommodating a spring 209b, and a counterbore 235 accommodating a ball valve or vibration responsive body 208b.

The fitting 230 is fashioned with a sleeve portion 236. The sleeve portion 236 accommodates an annular valve seat 237 which is pressed or snugly fitted into the sleeve 236 and engages an annular ledge 238, the valve seat 237 having a central port or passage 239 through which fuel is admitted into the mixing passage in the same manner as the construction shown in FIG. 12.

In the arrangement shown in FIG. 13, the metal valve seat 237 is held by friction within the sleeve 236. The arrangement shown in FIG. 13 is associated in assembly in the carburetor with a gasket similar to the gasket 202, shown in FIG. 11, to effect a fluid tight seal between the carburetor body and the annular valve seat 237. The fitting 230 is fashioned with a circumferential groove 240 which is in communication with the chamber provided by the bore 235 through circumferentially spaced passages or openings 241.

The construction shown in FIG. 13 functions in the same manner as the arrangements shown in FIGS. 11 and 12. When the engine, with which the overspeed governor construction is used, reaches a particular speed at which it is to be governed and hence a vibration frequency which effects vibration of the ball 208b, the ball will be dislodged, either sideways or lengthwise of the fitting 230 to open the port 239 and admit excess fuel into the mixing passage to automatically limit or reduce the speed of the engine.

Upon slight reduction in engine speed, the frequency of engine vibration falls below the vibration frequency at which the ball 208b is responsive whereby vibration of the ball ceases and, under the comparatively low pressure of the spring 209b, the ball 208b is again engaged with the seat 237 to close the port 239. The governing action is automatically repeated at short intervals as the engine speed increases when the ball valve 208b is in port closing position and is reduced when the ball valve 209b is oscillated or displaced from port closing position.

Figure 14:
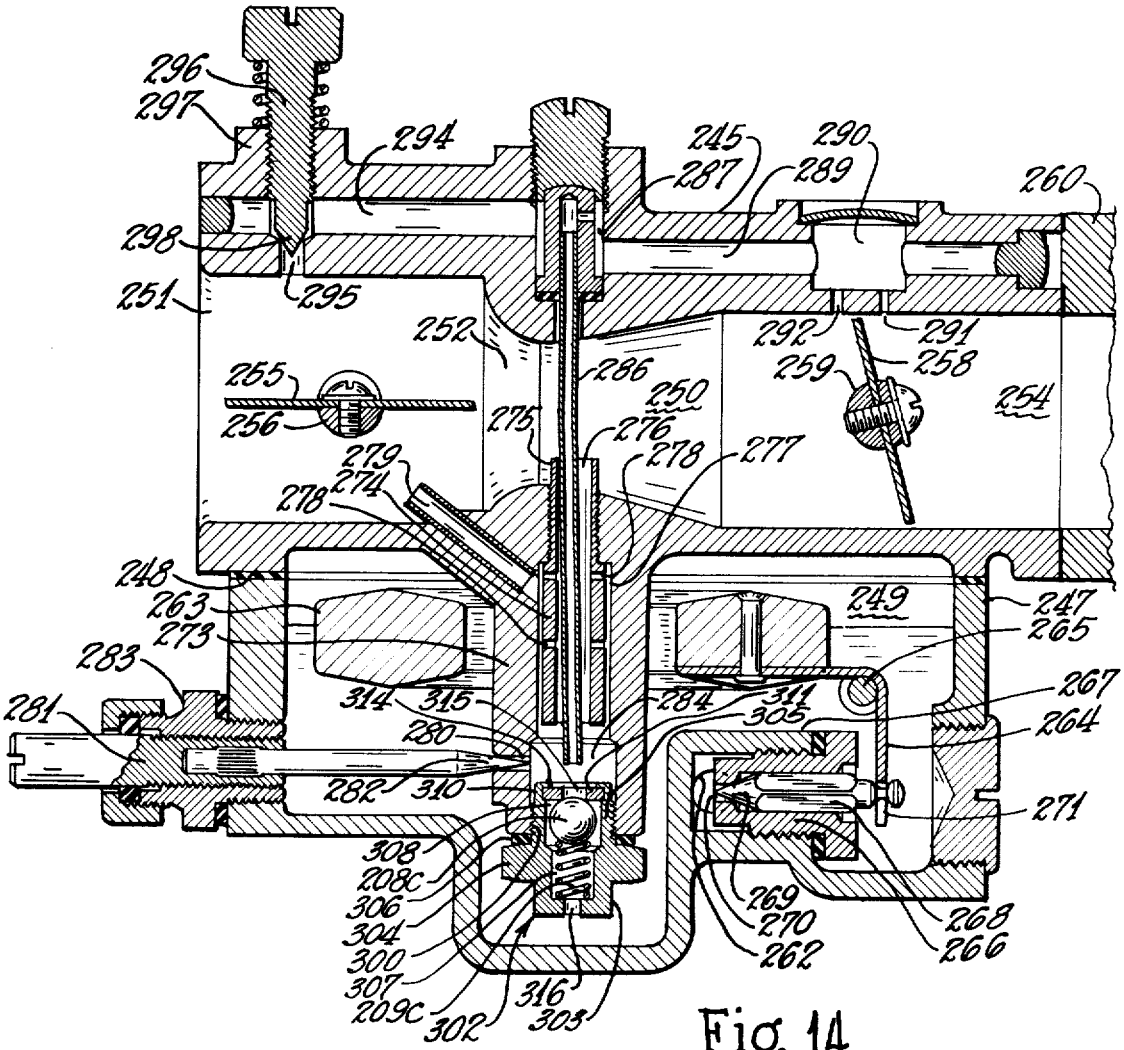
FIG. 14 is an enlarged longitudinal sectional view of a charge forming apparatus or carburetor of the float-controlled type embodying a form of overspeed governor instrumentality of the invention.

FIG. 14 illustrates on an enlarged scale a float-type carburetor embodying an overspeed governor arrangement of the invention. The carburetor construction shown in FIG. 14 comprises a body 245 and a bowl or receptacle 247 providing a fuel chamber 249, the receptacle being secured to the body 245 by screws (not shown), an annular sealing gasket 248 being disposed between the body 245 and the fuel bowl 247, the fuel bowl 247 being preferably of circular shape.

The carburetor body is fashioned with a mixing passage 250 having an air inlet region 251, a Venturi construction 252 and a mixture outlet region 254. A conventional choke valve 255 mounted upon a rotatable shaft 256 is disposed in the air inlet region and provides means to reduce the air admitted to the mixing passage 250 for engine starting purposes. Disposed in the mixture outlet region is a throttle valve 258 mounted upon a rotatable shaft 259 for controlling delivery of mixture into an engine crankcase 260 of a two cycle engine or, if the engine is a four cycle engine, the throttle valve controls the mixture delivered into an intake manifold.

The chamber 249 provided by the bowl 247 is adapted to contain liquid fuel admitted from a tank or supply (not shown) through an inlet passage 262. Disposed in the bowl 247 is a float 263 of conventional construction carried by a bracket or member 264, the latter being pivoted or fulcrumed on a pin 265 supported by openings in bosses (not shown) formed interiorly in the bowl 247. A tubular fitting 266 is threaded into a hollow boss portion 267 within the bowl.

Slidably mounted within the fitting 266 is an inlet valve body 268 of polygonal cross section having a cone-shaped valve portion 269 extending into a port 270 in the fitting, the port being in communication with the inlet 262. The bracket 264 has a bifurcated end portion 271 which is articulately connected with the end of the inlet valve 268 in a conventional manner.

The float 263 controls the inlet valve 268 to admit fuel into the bowl when the fuel level falls in the bowl and interrupts fuel flow into the bowl when the fuel level supports the float in a position closing the inlet valve 268.

The carburetor includes means for delivering fuel from the chamber 249 into the mixing passage at the region of the Venturi 252 for normal and high speed engine operation, and additional means for delivering fuel into the mixing passage for engine idling and low speed operation. The carburetor body 245 has a central hollow boss portion 273 accommodating a tubular fitting 274 having a nozzle portion 275 opening into the Venturi of the mixing passage providing a main fuel delivery orifice or outlet 276. The fitting 274 is of lesser diameter than a bore 277 in the boss 273, the tubular fitting 274 having transverse openings 278.

A tube 279 admits air from the air inlet region 251 into the bore 277 for mixing with the fuel delivered from the main orifice 276 into the mixing passage. The boss 273 is fashioned with a restricted passage 280. A valve member 281 has a needle valve portion 282 extending into the restricted passage 280. The valve body 281 is threadedly supported in a fitting 283 which, in turn, is threaded into a bore in the wall of the fuel bowl 247. The valve body 281 and the valve portion 282 are adjustable by reason of the threaded connection with the fitting 283 to regulate or meter fuel flow from the bowl 247 into a well 284 in communication with the bore 277.

The engine idling and low speed fuel delivery system includes a tube 286 of small diameter extending through the tubular fitting 274 into the well 284, the upper end of the tube 286 having communication with an annular chamber 287. A channel 289 is in communication with the annular passage 287 and a supplemental chamber 290. An engine idling orifice 291 and low speed orifice 292 are arranged to deliver fuel from the chamber 290 into the mixing passage depending upon the relative position of the throttle valve.

A second channel 294 is in communication with the annular passage 287 and with a passage 295 opening into the air inlet region 251 of the mixing passage. A valve body 296 threaded into a bore in a boss 297 has a cone-shaped valve portion 298 cooperating with a passage 295 for admitting a restricted amount of air into the channel 294 for admixing with the fuel in the passage 287 so that an emulsion is delivered through the engine idling and low speed orifices 291 and 292.

The normal operation of the carburetor of FIG. 14 is as follows: Under partial or full open position of the throttle 258 the engine operates at normal or high speed on fuel delivered through the orifice 276 and mixed with air entering the air inlet region 251. The fuel from the bowl 247 flows past the needle valve 282 through passage 280 into the well 284 and is drawn upwardly through the interior of the tubular fitting 274. Air from the tube 279 is mixed with the fuel in the fitting 274 through the transverse passages 278 so that an emulsion of fuel and air is delivered through the main orifice 276.

When the throttle valve 258 is moved to near closed or engine idling position, as shown in FIG. 14, fuel from the well 284 flows upwardly through the tube 286 by engine aspiration effective on the orifice 291 whereby fuel from the tube 286 is delivered into the annular passages 287 and therein mixed with air from channel 294, the emulsion of fuel and air flowing through channel 289 and chamber 290 and through the orifice 291 to supply fuel for engine idling purposes. When the throttle is opened a small amount, the low speed orifice 292 additionally delivers fuel from the chamber 290 through the orifice 292 for low speed engine operation.

The carburetor illustrated in FIG. 14 embodies a form of overspeed governor arrangement of the invention. The lower region of the cylindrical wall defining the well 284 is threaded as at 300 to receive the threaded portion of a fitting 302. The fitting 302 has a depending portion 303, an enlarged portion 304 and a sleeve portion 305. The portion 304 is polygonally-shaped as, for example, hexagonal to accommodate a tool for assembling the fitting with the depending portion 273. A sealing gasket 306 is disposed between the portion 304 and the end of the depending portion 273.

The fitting 302 is fashioned with a bore 307 and a counterbore 308, the counterbore providing a chamber accommodating a vibration responsive body or ball valve 208c, the bore 307 accommodating a comparatively small expansive coil spring 209c.

The portion 305 of the fitting is fashioned with a sleeve-like extension 310 in which is seated an annular valve seat 311.

In assembly, the ball 208c, spring 209c and the annular valve seat 311 are assembled in the fitting 302 and, after assembly, the end region of the extension 310 is swaged inwardly forming a flange 314 securing the annular seat 311 in the extension, as shown in FIG. 14. The annular valve seat 311 provides a passage or port 315 opening into the fuel well 284. The lower end of the fitting is fashioned with a passage or opening 316 admitting fuel from the fuel chamber 249 to the bore 307 and the chamber provided by the counterbore 308.

The functioning and operation of the overspeed governor device shown in FIG. 14 is the same as in the other forms hereinbefore described. The mass or size of the vibration responsive body or valve 208c and the comparatively light spring 209c are calibrated so as to be responsive to vibrations of the engine occurring at a particular engine speed at which it is desired to govern the engine and prevent overspeed of the engine. The pressure of spring 209c is sufficient to maintain the ball valve 208c seated against the annular valve seat 311 normally closing the port 315.

In operation, engine vibration, occurring at the speed at which it is desired to govern the engine, causes vibration or disturbance of the ball valve 208c whereby the ball valve is dislodged or displaced from its seat, thus opening the port 315.

During the period that the ball valve 208c is vibrated away from its seat, fuel from the chamber 246 flows through the passage 316, bores 307 and 308 and through the port 315 into the well 284.

The additional fuel thus introduced into the well 284 is quickly aspirated through the main nozzle 276 into the Venturi 252 of the mixing passage and past the open throttle valve 258 into the engine. The excess fuel aspirated into the mixing passage provides an overrich, slow burning or nonignitible mixture which reduces the speed of the engine in a time period of from approximately one tenth to one fifth of a second.

As soon as the critical engine vibration is obviated by slightly reduced engine speed, the body or ball valve 208c, under the influence of the spring 209c is again seated to close the port 315 and the engine again operates under a normal mixture. When the engine exceeds the governed speed, the overspeed governor is again brought into operation at the critical engine vibration. The arrangement illustrated in FIG. 14 may be used with two cycle engines, whether stationary or portable, the arrangement providing an inexpensive means of governing an engine to prevent overspeeding.

Figure 15:
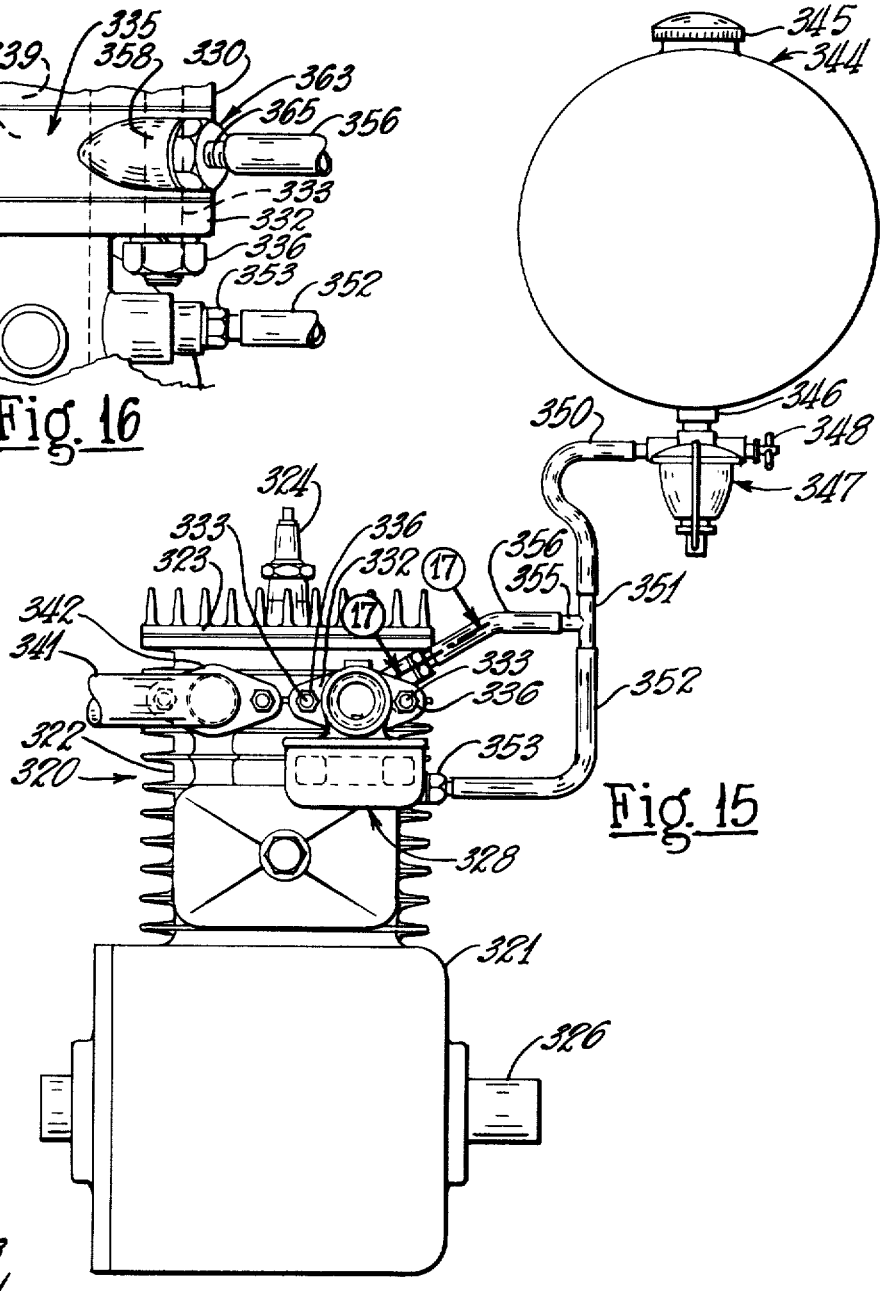
FIG. 15 is an elevational view illustrating a reciprocating-piston internal combustion engine of the four cycle type illustrating a form of overspeed governor instrumentality of the invention associated therewith.

FIGS. 15 through 18 illustrate the use of an overspeed governor of the invention in the introduction system of an engine independently of the carburetor or charge forming device. Referring to FIG. 15, there is illustrated an internal combustion engine 320 of the four cycle, reciprocating piston type having a crankcase 321, a cylinder 322 provided with a cylinder head 323, the latter equipped with a spark plug 324.

A piston (not shown) is reciprocable in the cylinder and is connected by a connecting rod (not shown) with a crankshaft 326 journaled in the crankcase 321.

A charge forming device or carburetor 328 normally supplies a combustible fuel and air mixture to the engine. The carburetor 328 illustrated in FIGS. 15 and 16 may be of the float-type of the character shown in FIG. 14, but without the overspeed governor device shown in FIG. 14. The cylinder 322 is fashioned with an intake manifold 330 and the carburetor 328 provided with a mounting flange 332.

Figure 16:
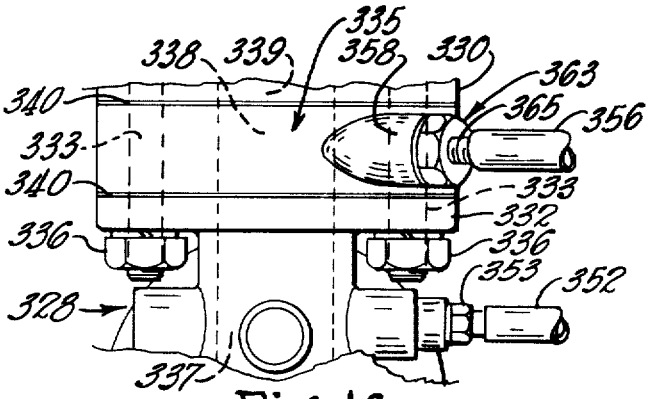
FIG. 16 is a top plan view of a portion of the carburetor or charge forming apparatus of FIG. 15 illustrating the position of the overspeed governor means of the invention.

Extending into threaded openings in the manifold 330 are threaded studs 333. Disposed between the manifold 330 and the mounting flange 332 is an element or spacer 335. The mounting flange 332 and the spacer element 335 and have aligned openings to accommodate the threaded studs 333, the ends of the studs accommodating nuts 336 for securing the carburetor and spacer element 335 to the engine manifold 330 as shown in FIG. 16.

Sealing gaskets 340 are disposed at each side of the spacer element 335. The carburetor mixing passage 337 is aligned with passages 338 and 339 in the element 335 and manifold 330 respectively whereby fuel and air mixture from the carburetor is delivered into the combustion chamber in the cylinder under control of a poppet valve (not shown) which is conventional in a four cycle engine. An exhaust manifold 341 has a mounting flange 342 secured to a side wall of the engine cylinder 322 in a conventional manner.

FIG. 15 illustrates a fuel tank 344 having a filler cap 345, the tank containing liquid fuel. An outlet pipe 346, secured to the lower part of the tank, is connected with a conventional fuel filter construction 347 equipped with a manual fuel cutoff valve 348. A fuel conveying tube 350 connects the filter 347 with one branch of a T-shaped fitting 351. A second branch of the fitting 351 is connected with a second fuel conveying tube 352, which, in turn, is connected with an inlet fitting 353 mounted on the side of the carburetor 328 providing fuel flow into the carburetor.

The third branch 355 of the T-shaped fitting 351 is connected with a tube 356 for conveying fuel to an overspeed governor arrangement associated with or carried by the spacer element 335. A form of overspeed governor construction associated with the fuel induction system for an engine is shown in detail in FIGS. 17 and 18. The spacer element 335 is fashioned with a boss portion 358, shown in FIG. 16, which is provided with a central passage 359 opening into the induction passage 338. An interior wall of the passage 359 is threaded to receive a threaded portion 361 of a tubular projection 362 integrally formed on a fitting 363.

The fitting or housing 363 has an enlarged hexagonally-shaped portion 364 to accommodate a wrench or tool for assembling the fitting with the boss 358. A sealing gasket 360 is disposed between the portion 364 of the fitting and the end surface of the boss 358.

The fitting 363 is fashioned with a tubular nipple 365 connected with the fuel conveying tube 356. The fitting 363 has a bore 366 and a counterbore 367, the latter providing a chamber accommodating a vibration responsive body or ball valve 208d.

A comparatively light spring 209d is disposed in the bore 366 and rests against a ledge 369, the spring normally biasing the ball valve 208d into seating engagement with an annular valve seat 370. The annular valve seat 370 is embraced within a thin-walled sleeve portion 371 of the fitting. After assembly of the ball valve 208d, the spring 209d and the annular seat 370 within the fitting, the end of the thin-walled sleeve 371 is formed or swaged inwardly providing a flange 372 for securing the annular seat 370 in fixed position within the fitting.

The central passage or port 373 in the annular valve seat 370 is in communication with the passage 338 in the element 335. The passage 374 in the nipple portion 365 opens into the bore 366. In the arrangement shown in FIGS. 15 and 17, the overspeed governor means is adapted to supply excess fuel for engine governing purposes into the passage 338 in the element 335 of the induction system of the engine, this arrangement being independent of the carburetor or charge forming apparatus 328.

In normal engine operation with the throttle valve (not shown) of the carburetor in open position, fuel flows from the fuel supply in tank 344 through the filter 347, tubes 350 and 352 and the T-shaped fitting 351 into the carburetor 328, the fuel flowing through an inlet passage in the carburetor 328 corresponding with the fuel inlet passage 262 in the carburetor shown in FIG. 14 to supply fuel in the normal manner to the engine 320.

The mass of the vibration responsive body or ball valve 208d and the pressure of the spring 209d are calibrated so that under the influence of engine vibration or disturbance occurring at the maximum engine speed at which it is desired to govern or limit the engine speed, the ball valve 208d will be oscillated or dislodged by such vibration and moved away from the port 373. This action opens the port 373 and, under the influence of engine aspiration in the induction passage 338 of the spacer element 335, fuel from the supply in the tank 344 flows through the branch 355 of the T-shaped fitting 351 through the tube 356, passage 374, bore 366, counterbore 367, thence through the port or passage 373 into the passage 338 in the element 335.

This excess fuel superimposed on the normal fuel mixture in the induction system provides a temporary overrich mixture which is slow burning or nonignitible in the combustion chamber of the engine, hence rapidly reducing the engine speed below the critical speed at which the engine is to be governed. As the ball valve 208d ceases to vibrate when the reduced engine speed changes the engine vibration below the frequency or vibration at the critical governed speed, the ball valve is again closed under the influence of the spring 209d and the normal fuel and air mixture again delivered to the engine.

Figure 17:
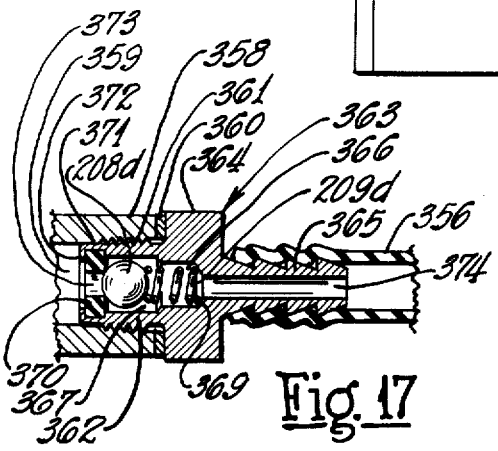
FIG. 17 is an enlarged fragmentary detail sectional view of a form of overspeed governor means of FIG. 15, the view being taken substantially on the line 17—17 of FIG. 15.
Figure 18:
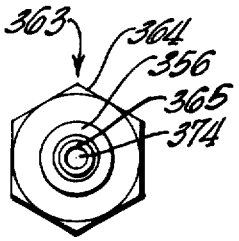
FIG. 18 is an end view of the construction shown in FIG. 17.

The overspeed governor valve arrangement shown in FIGS. 17 and 18 may be employed with two cycle engines. In such installation, the portion 362 is threaded into a threaded opening in the crankcase wall of a two cycle engine and the fuel conveying tube 356 connected with a fuel tank, such as the fuel tank 344 shown in FIG. 15, or the tube 356 connected with the fuel chamber of a diaphragm type carburetor or which a float-controlled carburetor.

Figure 19:
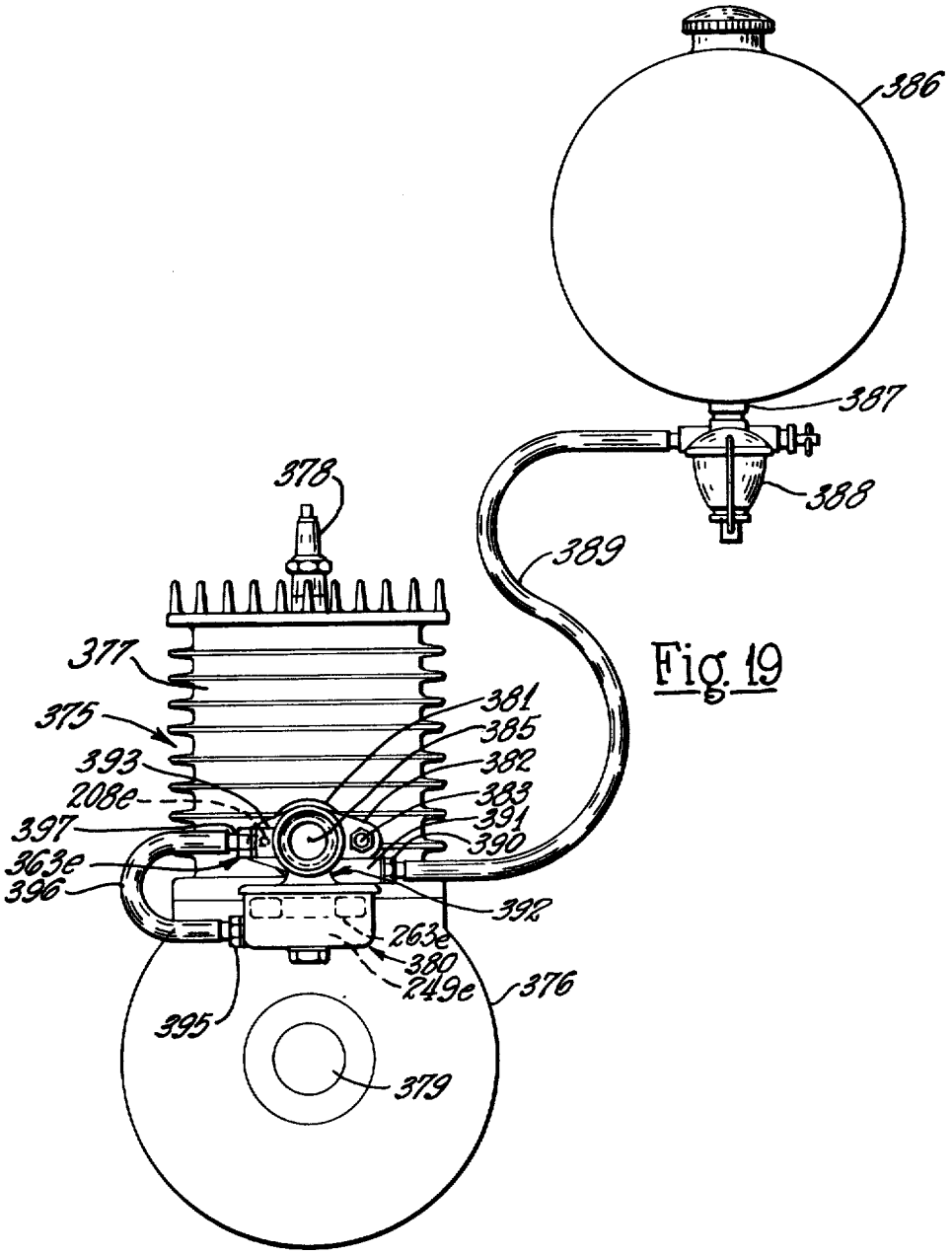
FIG. 19 is an elevational view of a two cycle engine associated with a float type carburetor and embodying a form of overspeed governor instrumentality of the invention.

FIG. 19 illustrates the use of an overspeed governor of the invention disposed in the induction system of the engine wherein the fuel controlled by the governor means is obtained from the fuel reservoir or chamber in the carburetor.

The internal combustion engine 375 is of a conventional reciprocating piston, three port two cycle type having a crank-case 376, a cylinder 377, the head of the cylinder being equipped with a spark plug 378. A piston (not shown) is reciprocable in the cylinder and is connected by a conventional connecting rod (not shown) with a crankshaft 379 journaled in bearings in the wall of the crankcase 376.

A charge forming device or carburetor 380 supplies a combustible fuel and air mixture to the engine. The carburetor 380 may be of the float type of the character illustrated in FIG. 14 or it may be of the diaphragm type. The cylinder is equipped with an intake manifold 381 and the carburetor 380 provided with a mounting flange 382 which is secured to the manifold by threaded studs 383, one of which is shown in FIG. 19, accommodating securing nuts. The carburetor body 392 is fashioned with a conventional mixing passage 385 for delivery of combustible fuel and air mixture through the manifold 381 into the engine crankcase 376.

A fuel tank 386 has an outlet fitting 387 provided with a conventional fuel filter 388 which is connected by a tube 389 with an inlet fitting 390 mounted in a hollow boss 391 on the carburetor body 392, this arrangement providing fuel flow from the tank 386 into the fuel chamber 249e of the carburetor. A fuel inlet valve (not shown) is controlled by a float 263e disposed in the fuel chamber 249e.

The carburetor body 392 has a hollow boss portion 393 accommodating an overspeed governor construction 363e, this overspeed governor unit being of the character shown in FIG. 17 and hereinbefore described.

The port the overspeed governor unit controlled by the vibration responsive body or ball valve 208e opens into the mixing passage 385 preferably in the region of a Venturi in the mixing passage. In the arrangement illustrated in FIG. 19, the fuel for the chamber of the overspeed governor unit is taken from the carburetor fuel chamber 249e. A tubular fitting 395 is threaded into an opening in the side of the fuel bowl of the carburetor, the fitting 395 being connected by a tube 396 with a tubular nipple 397 forming a part of the overspeed governor unit of the character shown in FIG. 17.

The operation of the overspeed governor unit 363e is the same as the operation of the overspeed governor unit shown in FIG. 17. When the speed of the engine 375 reaches a frequency of vibration for which the overspeed governor unit 363 is calibrated, the ball valve or vibration responsive body 208e is vibrated away from its seat, opening the port into the mixing passage whereby fuel is aspirated past the ball valve 208e into the mixing passage thereby providing an excess of fuel in the mixture delivered to the engine preventing overspeeding of the engine.

Figure 20:
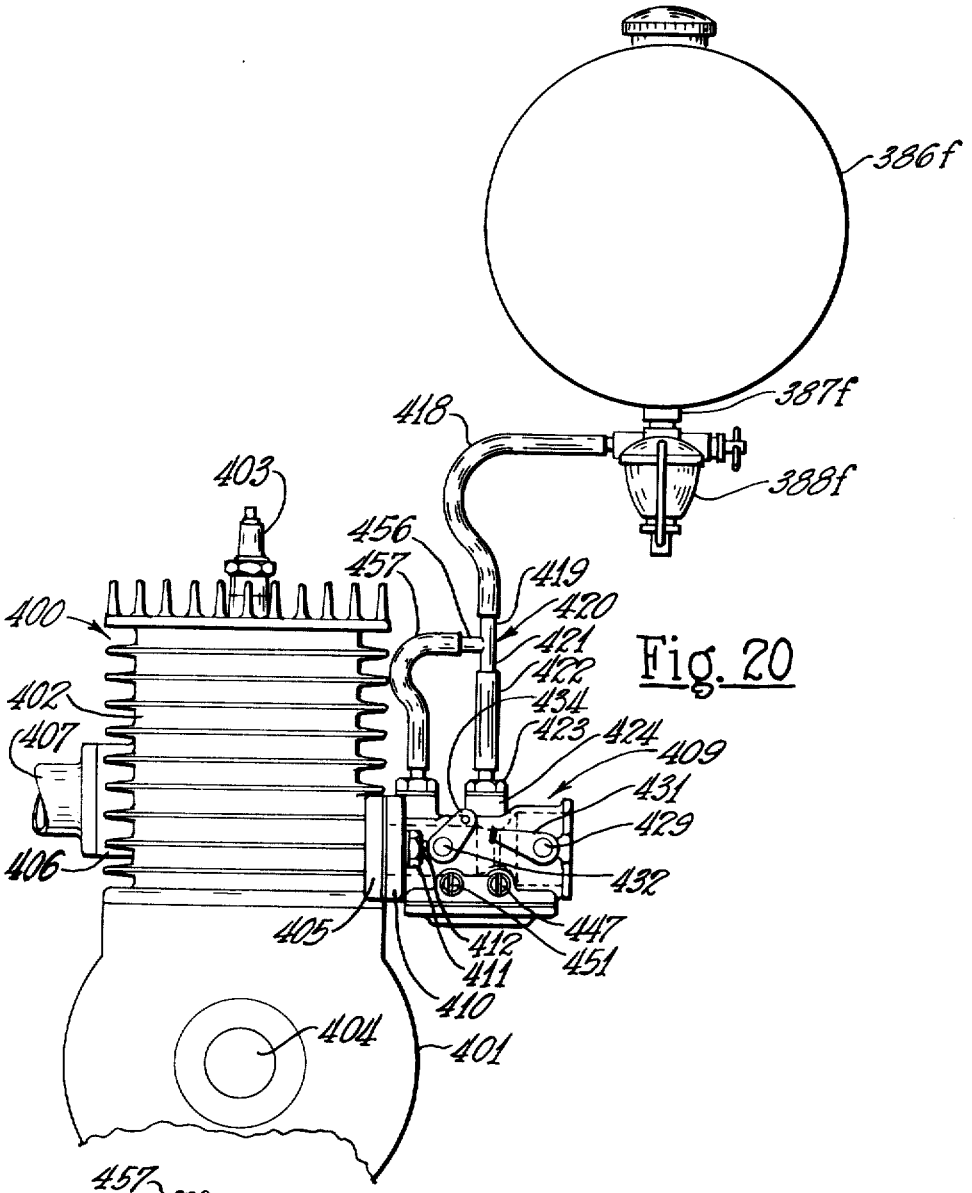
FIG. 20 is an elevational view of a two cycle engine associated with a diaphragm type carburetor and embodying a form of overspeed governor instrumentality of the invention.
Figure 21:
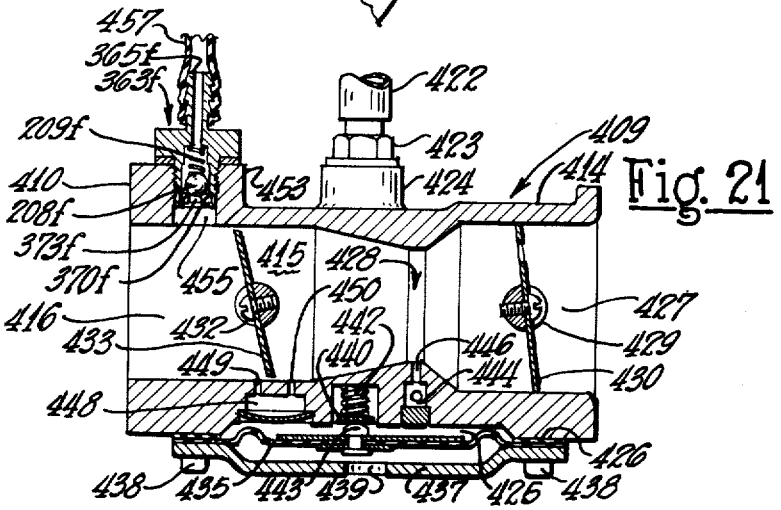
FIG. 21 is a longitudinal sectional view of the diaphragm type carburetor illustrated in FIG. 20.

FIGS. 20 and 21 illustrate the use of an overspeed governor device embodied in a diaphragm type carburetor 409 associated with a two cycle engine of the character shown in FIG. 19. The internal combustion engine 400 is a reciprocating piston engine of the conventional two cycle, three port type and includes a crankcase 401, a cylinder 402 having a cylinder head equipped with a spark plug 403. A piston (not shown) reciprocable in the cylinder is connected by a conventional connecting rod (not shown) with a crankshaft 404 journaled in the crankcase 401.

The two cycle engine is of the three port type having a mixture inlet port in a boss portion 405. The cylinder has a boss portion 406 fashioned with an exhaust port connected with an exhaust manifold 407. The carburetor or charge forming device 409 has a mounting flange 410 which is secured to the boss 405 by securing nuts 411 threaded onto studs 412. As shown in FIG. 21, the carburetor body 414 is fashioned with a mixing passage 415, the mixture outlet 416 of the passage registering with the inlet port in the boss 405 for admitting fuel and air mixture from the carburetor into the crankcase of the engine.

The carburetor receives liquid fuel from a fuel tank or supply 386f. The tank has an outlet pipe 387f connected with a conventional fuel filter 388f, a tube 418 connecting the fuel filter with one branch 419 of a T-shaped fitting 420.

A second branch 421 of the fitting is connected by a tube 422 with an inlet fitting 423 threaded into a hollow boss 424 on the carburetor body 414 whereby fuel is conveyed by gravity from the tank to the carburetor. A fuel inlet control valve arrangement of the character shown in FIG. 8 is embodied in the carburetor body 414 for controlling delivery of fuel into a fuel chamber 425 in the carburetor.

The charge forming device or carburetor illustrated in FIGS. 20 and 21 includes an air inlet region 427 and a Venturi configuration 428. A shaft 429, extending across the air inlet region, supports a choke valve 430, the shaft 429 being journaled in bores in the carburetor body. An arm 431, shown in FIG. 20, is secured on the shaft 429 for manipulating the choke valve. Journally mounted in bores in the body 414 at the downstream side of the Venturi 428 is a throttle shaft 432 supporting a disc-type throttle valve 433 which is manipulated by an arm 434 fixed on the throttle shaft 432.

A spring (not shown) engages the arm 434 normally biasing the throttle valve 433 toward near closed or engine idling position. A throttle actuating rod (not shown) is connected with the arm 434 for convenience of the operator in controlling the throttle valve. Extending across the circular fuel chamber 425 is a flexible metering diaphragm 435 forming a wall of the fuel chamber 425. An annular gasket 426 is disposed between a planar surface on the carburetor body 414 and the peripheral region of the metering diaphragm.

A closure plate 437 is secured to the body by screws 438, the screws 438 extending through registering openings in the periphery of the diaphragm 435 and the gasket 436 to secure these components to the carburetor body. The closure plate 437 has a vent opening 439 to facilitate flexure of the diaphragm 435. Fulcrumed within the fuel chamber 425 is a lever 440 which controls an inlet needle valve (not shown) of the character illustrated at 126 in FIG. 8.

A coil spring 442, engaging the lever 440, biases the lever in a direction normally closing the inlet valve and engaging the lever with a button 443 carried by the diaphragm 435. A fuel well 444 in the carburetor body is in communication with the fuel chamber 425, and a passage 446, in communication with the fuel well, opens into the Venturi of the mixing passage providing a main fuel delivery orifice. A threaded needle valve member 447, shown in FIG. 20, cooperates with a fuel channel (not shown) to regulate fuel flow from a fuel chamber 425 through a main orifice or passage 446 providing high speed adjustment.

A supplemental chamber 448 in the carburetor body is in communication with the mixing passage 415 through an engine idling orifice 449 and a low speed orifice 450. A fuel channel (not shown) supplies fuel from the fuel chamber 425 to the supplemental chamber 448, the fuel for engine idling and low speed being metered or controlled by a threaded needle valve 451, shown in FIG. 20.

The carburetor illustrated in FIGS. 20 and 21 is equipped with an overspeed governor device for delivering excess fuel into the induction system to prevent overspeed operation of the engine. The carburetor body 414 is fashioned with a hollow boss 453 interiorly threaded to accommodate an overspeed governor device or unit 363f, the overspeed device being of the character shown at 363 in FIG. 17. The overspeed governor device 363f includes a vibration-responsive body or ball valve 208f normally closing a port 373f, provided by the annular seat 370f, under the influence of a coil spring 209f.

The port 373f in the annular seat 370f is in registration with a passage 455 in the wall of the mixture outlet region 416 of the mixing passage. The fuel for the overspeed governor device is delivered from a fuel tank 386f. A third branch 456 of the T-shaped fitting 420 is connected by a tube 457 with a nipple 365f of the overspeed governor device. In this arrangement the fuel from the tank 386f flows by gravity to both the carburetor and the overspeed governor device 363f.

The operation of the overspeed governor device 363f is the same as the operation of the overspeed governordevice shown in FIG. 17 hereinbefore described. When the engine reaches a period or frequency of vibration to which the body or ball valve 208f is responsive, the ball is vibrated away from the port 373f and excess fuel aspirated into the mixture outlet region 416 of the induction system enrichening the mixture and thereby reducing the engine speed below the vibration responsive frequency of the ball valve 208f whereby the ball again closes the port 373f until the critical or governed speed is again attained by the engine and the ball vibrated from its seat.

Figure 22:
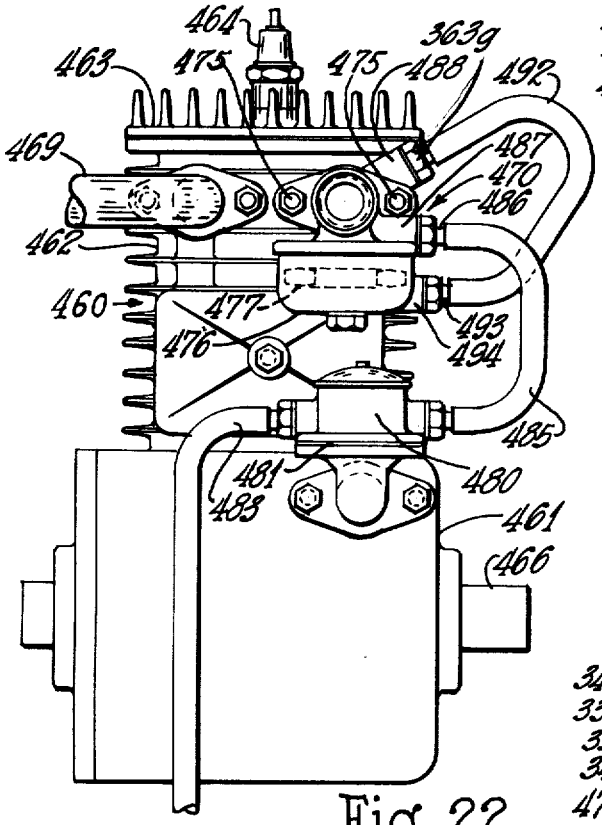
FIG. 22 is an elevational view of a reciprocating piston four cycle engine equipped with a float-controlled type carburetor in combination with an engine-driven fuel pump and an overspeed governor means of the invention associted with the mixture intake manifold.
Figure 23:
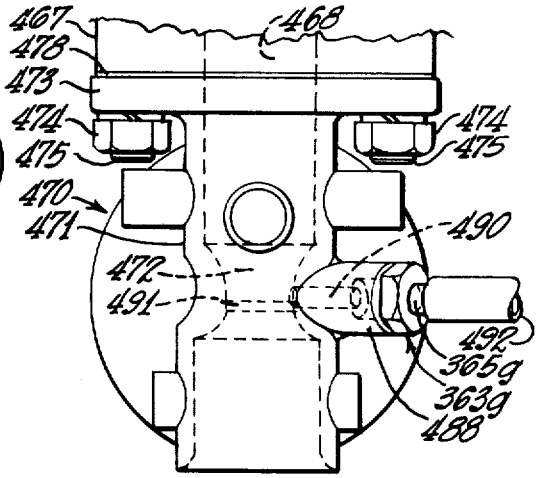
FIG. 23 is a top plan view of the carburetor shown in FIG. 22 embodying an overspeed engine governor instrumentality.

FIGS. 22 and 23 illustrate the utilization of an overspeed governor device with a four cycle internal combustion engine provided with a float bowl type carburetor or charge forming device, the fuel for the carburetor and for the overspeed governor device being supplied under low pressure by an engine-actuated fuel pump. FIG. 22 illustrates an internal combustion engine 460 which is similar to the engine illustrated in FIG. 15. The engine 460 is of the four cycle, reciprocating piston type having a crank case 461, a cylinder 462 provided with a cylinder head 463, the latter equipped with a spark plug 464.

A piston (not shown) is reciprocable in the cylinder 462, the piston being connected by a connecting rod (not shown) with a crankshaft 466 journaled in the crankcase 461. Intake and exhaust valves (not shown) are cam operated from a camshaft driven by the engine in a well-known conventional manner. The cylinder is fashioned with a boss portion 467 providing a mixture passage or manifold 468, the engine being equipped with an exhaust manifold 469 of conventional construction.

The carburetor or charge forming device 470 illustrated is of the character shown in FIG. 15. The carburetor includes a body 471 provided with a mixing passage 472 and with a mounting flange 473 which is secured to the boss 467 on the cylinder by means of nuts 474 cooperating with studs 475 threaded into openings in the boss 467, a sealing gasket 478 being disposed between the mounting flange and the boss 467. The mixing passage 472 registers with the intake manifold or passage 468.

The carburetor includes a bowl 476 containing a float 477 for controlling a fuel inlet valve (not shown) of conventional construction in the carburetor.

Mounted upon the engine crankcase is a diaphragm type fuel pump 480 of conventional construction, the pump embodying a pumping diaphragm 481 which is flexed or actuated by means (not shown) driven by the engine camshaft. A fuel supply pipe 483 connects the fuel pump with a fuel supply tank (not shown) which may be disposed below the fuel pump.

The outlet of the pump is connected by a tube 485 with an inlet fitting 486 threaded into a hollow boss 487 on the carburetor body, the body having channel means in communication with the inlet fitting for conveying fuel to the region of a fuel inlet valve (not shown) which is controlled by the position of the float 477. The fuel from the bowl or chamber containing the float 477 is delivered into the mixing passage through channels and passages of the character shown in FIG. 14 for normal engine operation and for idling and low speed operation.

The carburetor body is fashioned with a second hollow boss 488 disposed at an angle to a vertical axis through the carburetor, as shown in FIG. 22. The hollow boss is threaded to receive and support an overspeed governor unit or device 363g of the character shown in FIG. 17 and hereinbefore described. The port 490 of the overspeed governor device 363g preferably opens into a Venturi construction 491 in the mixing passage 472 of the carburetor. However, the port may open into another region of the mixing passage or mixture induction system, if desired.

The nipple portion 365g of the overspeed governor unit is connected by a tube 492 with a tubular fitting 493 extending into a hollow boss 494 formed on the lower region of the carburetor bowl 476. During engine operation, the fuel pump delivers fuel from a supply tank through the tube 485 to the region of the float controlled inlet valve in the carburetor. Fuel in the carburetor bowl 476 is aspirated through a fuel channel system of the character illustrated in FIG. 14 into the Venturi of the mixing passage for normal and high speed engine operation.

The carburetor 470 includes a low speed and engine idling channel and orifice system of the character shown in FIG. 14, when the engine reaches a speed setting up vibration of a frequency at which the body or ball valve in the overspeed governor unit 363g is responsive, the ball valve is agitated or vibrated away from its seat whereby excess fuel is delivered by aspiration through the port 490 into the region of the Venturi 491 in the mixing passage 472. The overrich mixture is slow burning or nonignitible in the engine cylinder and hence causes an immediate reduction in engine speed.

The reduction in engine speed changes the frequency of vibration below that effective to cause vibration or agitation of the ball valve in the unit 363g, the ball again closing the port 490 whereby the engine again gains speed and the cycle is quickly repeated.

The aspiration or reduced pressure in the mixing passage is comparatively high at high engine speed and is amply sufficient to aspirate fuel from the fuel in the carburetor through tube 492 thence through the port 490 into the mixing passage.

Figure 24:
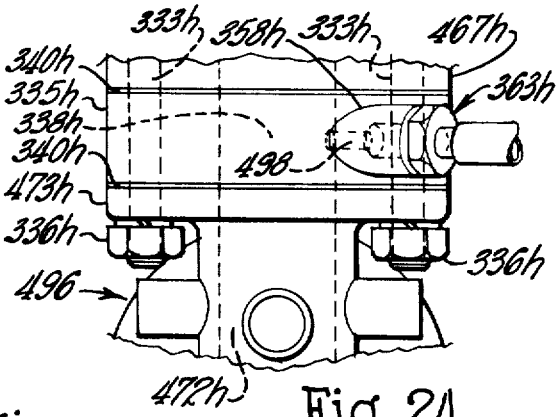
FIG. 24 is a view similar to FIG. 23 illustrating a fitting between the carburetor and the intake manifold equipped with an overspeed governor means of the invention.

FIG. 24 illustrates a modification of the arrangement shown in FIGS. 22 and 23. In this form a spacer element 335h, of the character shown in FIG. 16, is disposed between the boss 467h on the engine cylinder and the mounting flange 473h on the carburetor 496. The carburetor and spacer element are fixedly secured to the boss 467h by studs 333h and securing nuts 336h threaded onto the studs.

The carburetor 496 is of a construction similar to the carburetor shown at 470 in FIG. 23 but without the boss 488. Gaskets 340h are disposed at each side of the spacer element 335h. The spacer element is fashioned with a hollow boss 358h threaded to receive an overspeed governor unit 363h of the character shown in FIG. 17. The overspeed governor unit 363h embodies a vibration responsive ball valve normally spring biased against an annular valve seat as shown in FIG. 17.

The port 498 in communication with the port in the annular valve seat of the overspeed governing unit 363h opens into the induction passage or mixture conveying passage 338h for delivering excess fuel into the induction passage when the ball valve is vibrated from its seat to enrichen the mixture flowing from the carburetor mixing passage 472h into the engine cylinder.

As in the other forms of the invention, the overrich mixture is slow burning or nonignitible and hence quickly reduces the engine speed below the governed speed and thereby prevents operation of the engine above a predetermined speed.

Figure 25:
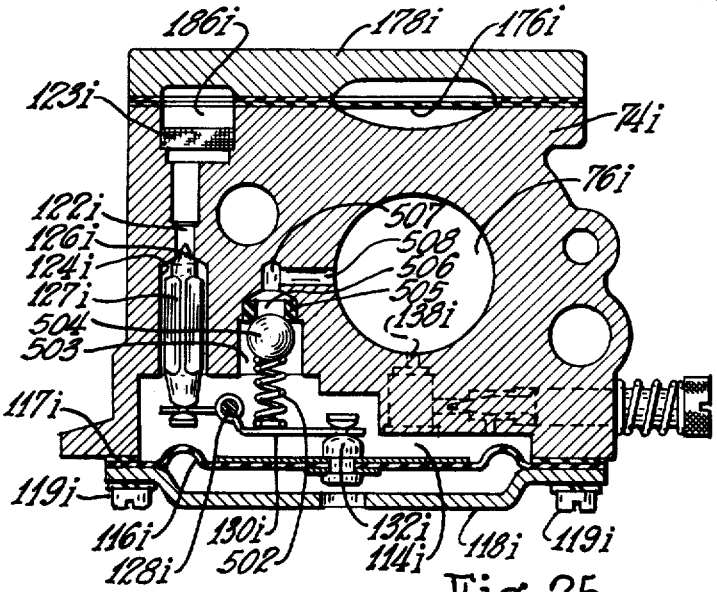
FIG. 25 is a sectional view of a diaphragm type carburetor and fuel pump construction similar to the form shown in FIG. 8 and embodying a form of overspeed engine governor means of the invention.

FIG. 25 illustrates another form of engine overspeed governor of the invention. In this form of the invention, the bypass or passage for delivering excess fuel into the mixing passage for engine governing purposes derives fuel from the fuel chamber in a diaphragm type carburetor of the character shown in FIGS. 7 through 9 and hereinbefore described. The carburetor body 74i includes a mixing passage 76i, a fuel chamber 114i and a flexible diaphragm 116i, the diaphragm forming a flexible wall of the fuel chamber 114i. A cover 118i is disposed beneath the diaphragm 116i, and the diaphragm, the cover 118i and a gasket 117i, are secured to the carburetor body by screws 119i.

A pumping diaphragm 176i of a fuel pump construction is secured to the carburetor body by a cover plate 178i, the pumping diaphragm 176i being actuated or vibrated by varying fluid pressure from the crankcase of a two cycle engine with which the carburetor is used. Flap valves (not shown) are provided on the diaphragm 176i for effecting the pumping of fuel from a supply tank (not shown) to a chamber 186i containing a fuel filter 123i. An inlet valve body 127i is slidably disposed in a bore 124i, the valve body having a needle valve portion 126i cooperating with a port 122i.

Pivoted on a fulcrum 128i is a lever 130i having one end engaging a member 132i carried by the diaphragm 116i and the other end engaging the lower end of the inlet valve body 127i. The fuel channel system for effecting delivery of fuel into the mixing passage for engine idling and low speed operation and for normal and high speed operation is the same as the channel system shown in the carburetor illustrated in FIGS. 7 through 9, the fuel for normal and high speed engine operation being delivered through a main orifice 138i. A comparatively weak expansive coil spring 502 engages the long arm of the lever 130i to bias the fuel inlet valve 126i toward closed position.

Upon the transmission of engine aspiration through the fuel channel system to the fuel chamber 114i, the diaphragm 116i is elevated, swinging the lever 130i so that the valve 126i opens the inlet port 122i and admits fuel from a supply into the chamber 114i. Disposed in a recess 503 is a vibration responsive body or ball valve 504. Fitted in a counterbore adjacent the recess 503 is an annular valve seat 505 providing a port 506 which is normally closed by the ball valve 504 under the slight pressure of the spring 502. The port 506 is in communication with interconnected channels 507 and 508, the latter opening into the mixing passage 76i.

In this form of the invention the coil spring 502 biases the lever 130i in a clockwise direction to urge the inlet valve 126i toward closed position and biases the vibration responsive body or ball valve 504 to close the port 506.

The mass of the ball valve 504 is calibrated and the spring 502 fashioned to exert slight pressure against the ball valve 504 so that when the engine, with which the carburetor is used, reaches a predetermined speed, the ball valve responds to the frequency of vibration of the engine, causing the ball valve 504 to be vibrated away from port closing position whereby fuel is quickly aspirated from the fuel chamber 114i through the port 506 and passages 507, 508 into the mixing passage 76i.

This excess fuel provides an overrich mixture for the engine, the mixture being nonignitible or very slow burning so that the speed of the engine is substantially instantly reduced. The reduced speed of the engine changes the frequency of vibration so that the ball valve 504 ceases to be responsive to the vibration and is again closed under the biasing pressure of the spring 502.

The character and amplitude of engine vibration varies with different engines and to render the governor means or ball valve 504 responsive to different frequencies, a ball valve of different mass may be used or a spring 502 employed which exerts a greater or lesser biasing pressure against the ball valve 504 in order to attain the desired engine governing action at a predetermined engine speed.

Figure 26:
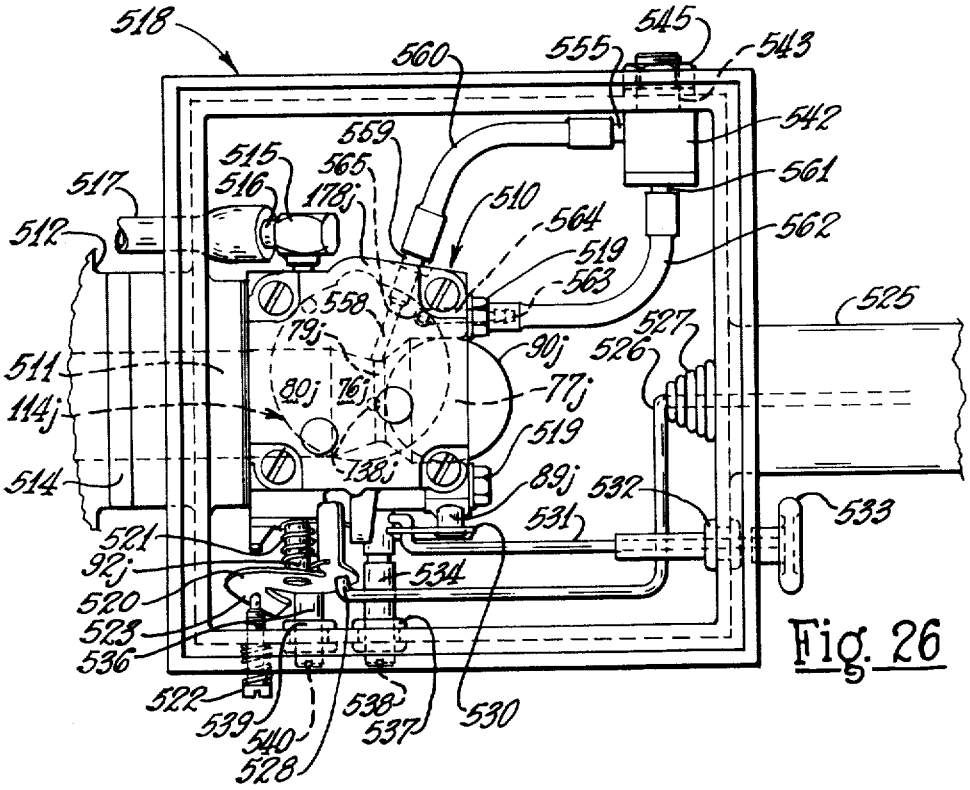
FIG. 26 is a top plan view of a diaphragm type carburetor and fuel pump disposed within an air filter enclosure, the arrangement embodying a form of overspeed governor of the invention.
Figure 27:
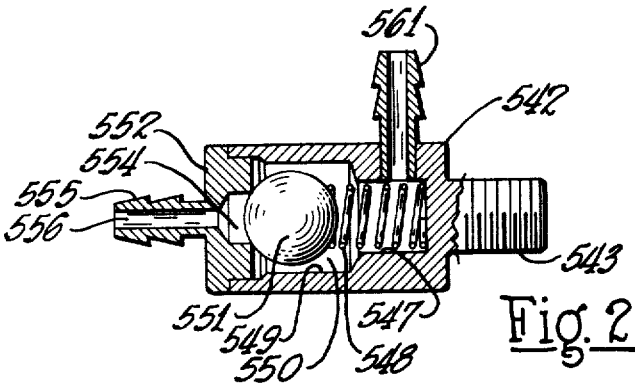
FIG. 27 is an enlarged detail sectional view of a form of overspeed governor device embodied in the arrangement shown in FIG. 26.

FIG. 26 illustrates the positioning of the vibration responsive body or valve means in spaced relation with the carburetor but mounted upon an enclosure for the carburetor, the vibration responsive means being shown in FIG. 27.

The carburetor 510 is of the general character shown in FIGS. 2 through 8. The body of the carburetor 510 includes a mixing passage 76j, an air inlet region 77j and a mixture outlet region 80j. The mixture outlet region 80j registers with a manifold passage 511 which opens into an opening in the engine crankcase 512.

A fitting 514 is disposed between the carburetor and the engine crankcase and is equipped with the conventional one-way valve or reed valve construction for admitting fuel and air mixture into the engine crankcase but preventing reverse flow of gases from the crankcase into the mixing passage. The air inlet region of the mixing passage is provided with a choke valve 90j mounted upon a rotatable shaft 89j. The mixture outlet 80j is equipped with a throttle valve of the character shown at 94 in FIG. 7, mounted upon a rotatable shaft 92j.

The carburetor 510 includes a fuel pump arrangement of the character shown in FIG. 7, the pump plate 178j being shown in FIG. 26. An L-shaped fitting 515 has a threaded portion extending into the carburetor body, a nipple 516 of the fitting being connected by a tube 517 with a fuel supply tank (not shown).

In the arrangement shown in FIG. 26 the carburetor is enclosed in a box-like housing 518 preferably fashioned of case metal having a sheet metal air-filter cover (not shown) the box-like housing and the carburetor being secured to the engine crankcase by suitable bolts 519 extending through bores in the carburetor body and threaded into threaded openings in the wall of the crankcase 512. The housing 518, being secured to the engine crankcase 512, is subject to vibrations of the engine.

The housing 518 is provided with a filter of conventional construction (not shown) for filtering atmospheric air admitted into the air inlet 77j of the carburetor. The controls for the carburetor are accessible exteriorly of the housing 518. Secured to the throttle shaft 92j is a member 520, a coil spring 521 engaging the member normally biasing the throttle valve toward engine idling position. An adjustable screw 522, supported by a wall of the housing 518, has its inner end arranged for engagement with an inclined ramp-like portion 523 of the member 520. By adjusting the screw 522 with respect to the inclined ramp 523, the engine idling position of the throttle valve may be controlled.

The housing 518 is fashioned with an extension 525 providing a handle for manipulating the chain saw driven by the engine. The wall of the housing 518 adjacent the extension 525 is fashioned with an opening accommodating a throttle operating rod 526, a flexible accordian-like sleeve 527 providing a sealing means for the opening. An end portion 528 of the throttle operating rod is engaged in an opening in the member 520 carried by the throttle operating shaft.

The throttle operating rod 526 is connected with an actuating member of the character shown in FIG. 1 by which the operator manipulates the throttle operating rod to vary the speed of the engine. The choke valve shaft 89f is equipped with a member 530 to which is connected an operating rod 531.

A wall of the housing 518 is fashioned with an opening accommodating a flexible tubular grommet 532. The choke valve operating rod 531 extends through the tubular grommet 532 and is equipped with a manipulating knob 533 for manipulating the choke valve 90j.

Figure 9:
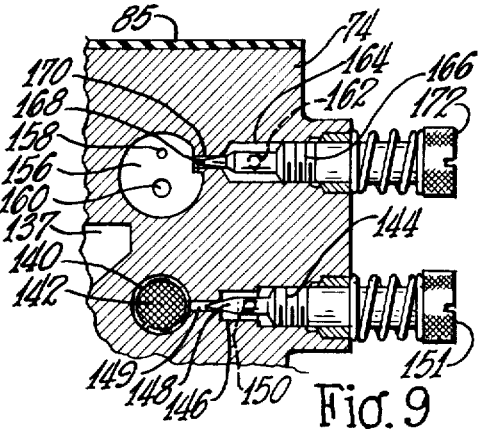
FIG. 9 is an enlarged fragmentary sectional view taken substantially on the line 9—9 of FIG. 3.

The carburetor 510 is equipped with a needle valve construction 534 which corresponds with the needle valve construction shown at 144 in FIG. 9. The carburetor is also equipped with a needle valve construction 536 which corresponds with the needle valve construction 166 shown in FIG. 9. The needle valve construction 534 has a cylindrical portion extending through a grommet 537 in an opening in a wall of the housing 518, the end of the needle valve construction having a kerf 538 to receive a tool for adjusting the valve construction for regulating deiivery of fuel from a main orifice 138j.

The needle valve construction 536 has a body portion extending through a grommet 539 disposed in an opening in a wall of the housing 518, the construction 536 being fashioned with a kerf 540 to receive a tool for adjusting the valve construction 536. The valve construction 536 regulates the delivery of fuel from the fuel chamber in the carburetor for delivery through engine idling and low speed orifices of the character shown at 158 and 160 in FIG. 9.

In the embodiment of the invention illustrated in FIG. 26, the vibration responsive governor valve means is mounted upon the box-like housing 518. A preferred form of vibration responsive valve means embodied in the arrangement of FIG. 26 is shown in detail in FIG. 27.

The overspeed governor construction is inclusive of a housing 542 fashioned with a threaded tenon 543, the tenon 543 extending through an opening in a wall of the housing 518 for mounting the construction, the tenon receiving a nut 545. Through this arrangement the housing 542 is securely held to the box-like housing 518 and is responsive to vibrations of the engine communicated to the housing 542 through the box-like housing 518.

As shown in FIG. 27, the housing or fitting 542 is fashioned with a bore 547 which accommodates a comparatively light pressure expansive coil spring 548. The bore 547 is in communication with a counterbore 549, the latter providing a chamber 550 in which is movably disposed a vibration responsive body or ball valve 551. A cover member 552 is pressed into the open end of the housing 542, the cover member having a port 554. The cover member 552 is fashioned with nipple 555 having a passage 556 therein in communication with the port 554.

The body of the carburetor is fashioned with a passage or channel 558 opening into the restricted region of the Venturi 79j of the mixing passage. The carburetor body is provided with a tubular fitting 559 threaded into the carburetor body, the passage in the fitting 559 being in communication with the channel 558. A flexible tube 560 connects the nipple portion 555 of the housing 542 with the fitting 559. The housing 542 is fashioned with a second nipple portion 561 connected by a tube 562 with a nipple fitting 563 mounted in a bore in the body of the carburetor 510.

The passage in the tubular nipple 563 registers with a channel 564 which is in communication with a passage 565 opening into the fuel chamber 114j in the carburetor body. As the housing 518 is secured to the engine crankcase 512, and as the housing 542 enclosing the vibration responsive valve or body 551 is supported by the housing 518, the housing 542 and the body 551 are responsive to engine vibration. The vibration responsive body 551 and the biasing pressure of the spring 548 are calibrated so that the ball valve 551 is vibrated and moved away from its seat by engine vibration occurring at a speed at which it is desired to govern the engine.

When the ball valve 551 is displaced from its seat, aspiration in the mixing passage is effective to deliver additional fuel into the mixing passage from the fuel chamber 114j. The excess fuel, providing the overrich mixture, flows from the fuel chamber 114j through passages 565, 564, nipple 563, tube 562, nipple 561 through the chamber 550 in the housing 542, past the ball valve 551 thence through the nipple passage 556, tube 560, nipple 559 and channel 558 into the region of the Venturi 79j in the mixing passage 76j. The overrich mixture is either nonignitible or slow burning in the engine and thereby quickly reduces the speed of the engine.

As the engine speed is slightly reduced, the frequency of the engine vibration is reduced and the ball valve 551, being nonresponsive to a lower frequency of vibration, moves to engage its seat and close the port 554 preventing further delivery of excess or bypassed fuel into the mixing passage.

The engine resumes speed until the engine vibration frequency again attains a value at which the ball valve or body 551 is responsive and the ball again vibrated or displaced from its seat and the engine spaced again reduced by the excess fuel superimposed on the normal fuel and air mixture.

FIGS. 28 through 31 illustrate a diaphragm type carburetor embodying another form of overspeed governor construction. In this form of construction, the engine overspeed governor arrangement is associated with the main fuel delivery system for delivering excess fuel through the main orifice into the mixing passage. The carburetor is of the general character illustrated in FIG. 21 and is inclusive of a carburetor 409k having a mounting flange 410k adapted to be secured to an engine crankcase 568 by nuts 411k threaded onto studs carried by the crankcase 568 of a two cycle engine, or secured to the intake manifold of a four cycle engine.

The carburetor body 414k is fashioned with a mixing passage 415k having a Venturi configuration 428k, mixture outlet 416k and an air inlet 427k. The air inlet is equipped with a choke valve 430, mounted on a rotatable shaft 429k. A rotatable shaft 432k extends across the mixture outlet and is equipped with a throttle valve 433k. The carburetor body is fashioned with a circular recess providing a fuel chamber 425k. A flexible metering diaphragm 435k forms a wall of the fuel chamber, a sealing gasket 426k being disposed between the diaphragm and the portion of the carburetor body defining the fuel chamber 425k.

A closure plate 437k is secured by screws 438k to the carburetor body which extend through openings in the diaphragm and the gasket 426k to secure these components to the carburetor body. The closure has a vent opening 439k. Fulcrumed within the fuel chamber 425k is a lever 440k engaging a fuel inlet valve 570 to regulate fuel flow from a supply through a port 571 into the fuel chamber 425k. The inlet port is in communication with an inlet passage 572 which is connected with a fuel tank by a tube 574. A coil spring 442k biases the lever to normally close the inlet valve 570, the long arm of the lever engaging a member 575 carried by the diaphragm 435k.

Figure 31:
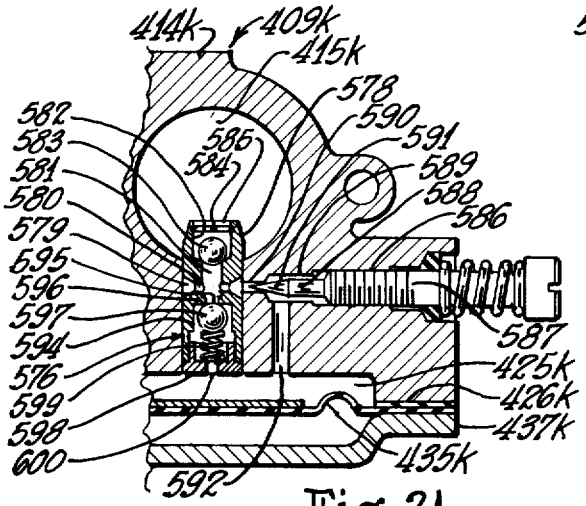
FIG. 31 is an enlarged fragmentary transverse sectional view taken substantially on the line 31—31 of FIG. 28.
Figure 30:
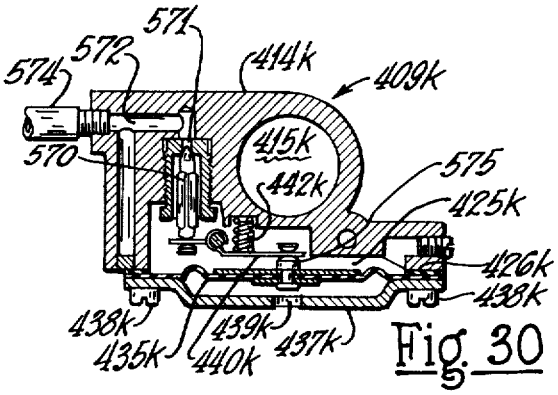
FIG. 30 is a transverse sectional view taken substantially on the line 30—30 of FIG. 28.

The fuel channel system for conveying fuel from the fuel chamber 425k into the mixing passage 415k embodies a form of engine governor. Referring to FIG. 31, the carburetor body has a bore 576 into which is snugly fitted a cylindrically-shaped fitting or housing 578. The fitting 578 is fashioned with a circumferential groove 579 and transverse passages 580 in communication with the circumferential recess 579 and a central passage or well 581. The fitting is fashioned at its upper end with a counterbore 582 accommodating a check ball 583 maintained against dislodgement by a wire grid 584.

The outlet of the counterbore 582 constitutes a main orifice 585 through which fuel is delivered into the mixing passage for normal and high speed engine operation. The carburetor body is fashioned with a threaded bore 586 in which is threaded a manually adjustable valve body 587.

A tenon portion 588 of the valve body 587 is disposed in a bore 589. The bore is in communication with a restricted passage 590 in registration with the circumferential recess 579. A needle valve portion 591 regulates or meters fuel flow through the restriction 590 for delivery through the main orifice 585.

A passage 592, opening into the fuel chamber 425k, admits fuel into the bore 589 for delivery past the needle valve 591 into the passage 581 and past the check ball 583 into the mixing passage. The check ball 583 is normally seated at the exit of the passage 581 so that when fuel is being delivered through the engine idling or low speed orifices, back bleeding of air through the main orifice is prevented by the check ball 583. Fuel flow to the main orifice is metered or controlled by adjusting the needle valve 591.

The engine governor construction is associated with the fitting 578. Formed in the fitting below the circumferential recess 579 in a counterbore 594, the upper end of which is in communication with the passage or well 581 by a restricted passage or port 595. The passage 595 is defined by a circular ledge 596, the latter forming a seat for a vibration responsive body or ball valve 597. Pressed into the lower end of the fitting 578 is a plug 598 having a recess accommodating an expansive coil spring 599.

A restricted passage 600, in communication with the fuel chamber 425k and the chamber 594, admits fuel from the fuel chamber 425k into the ball chamber 594. The vibration responsive ball valve 597, under the influence of the spring 599, normally closes the port 595.

The carburetor is fashioned with an idling orifice 449k and a low speed orifice 450k. A supplemental fuel chamber 448k receives fuel from the fuel chamber 425k through channel means (not shown) for supplying fuel to the mixing passage through the orifices 449k and 450k for engine idling and low speed purposes. The fuel supplied to the supplemental chamber is manually regulated by a threaded needle valve (not shown) of a character similar to the needle valve 591.

Figure 28:
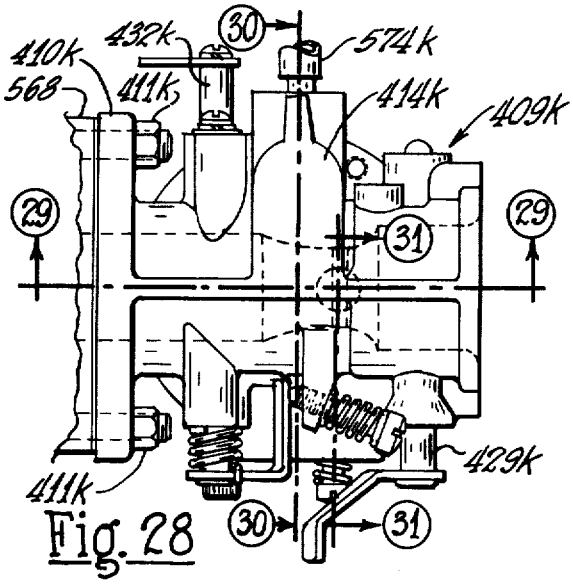
FIG. 28 is a top plan view of a diaphragm type of charge forming apparatus or carburetor equipped with an overspeed governor means of the invention.
Figure 29:
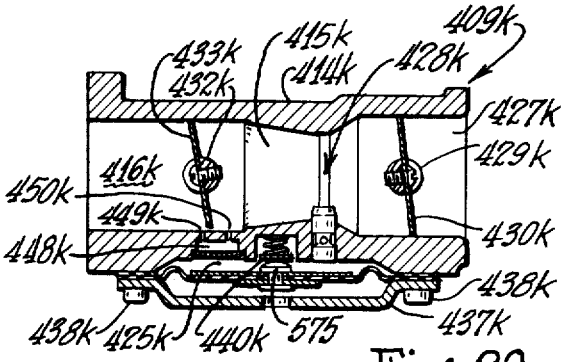
FIG. 29 is a longitudinal sectional view through the carburetor, the view being taken substantially on the line 29—29 of FIG. 28.

The operation of the carburetor and engine overspeed governor arrangement of FIGS. 28 and 31 is as follows: The choke valve 430k is open except when starting the engine. During engine idling, the throttle valve 433k is in near closed position, as shown in FIG. 29 and engine aspiration in the mixture outlet region 416k aspirates fuel from the supplemental chamber 448k through the idling orifice 449k into the mixing passage. When the throttle is partially opened fuel is delivered from the low speed orifice 450k. During engine idling and low speed engine operation, the check ball 583 engages its seat in the fitting 578 and prevents air back bleeding from the mixing passage through the main orifice into the secondary fuel delivery system.

Under normal and high speed engine operation, aspiration in the mixing passage effects fuel flow through channel 592, bore 589, restricted passage 590 and passage 581 past the check ball 583 and through the main orifice into the mixing passage. The carburetor, being secured to the engine crankcase, is subjected to engine vibrations. The body or ball valve 597 and the spring 599 are calibrated whereby the ball valve is responsive to or in resonance with the frequency of vibration of the engine at the speed for which the engine is to be governed.

When the critical engine speed is reached and the ball valve 597 vibrated away from its seat, fuel is aspirated into the mixing passage from the fuel chamber 425k through the restricted passage 600 around the ball 597 through the passage 595 and passage 581 past the check ball 583 and into the mixing passage. This arrangement provides excess fuel delivered through the main orifice into the mixing passage so that the fuel enrichened charge admitted to the engine is nonignitible or slow burning and hence the speed is quickly reduced thereby preventing overspeeding of the engine.

Upon reduced speed of the engine, the frequency of vibration of the engine is changed so that the ball 597 is uneffected by engine vibration and is biased by the spring 599 to close the port or channel 595 and thus restore engine operation under normal fuel mixture conditions. Should the engine speed reach the point at which vibration moves the ball valve 597 away from its seat, the excess fuel in the mixture reduces the engine speed and thus provides an automatic governor for the engine.

Figure 32:
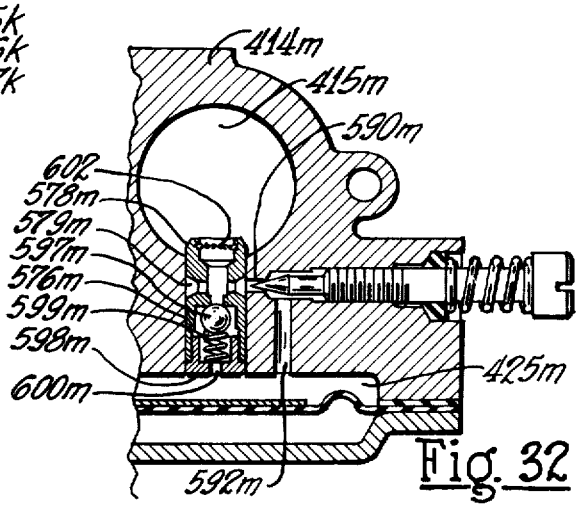
FIG. 32 is a view similar to FIG. 31 illustrating a form of capillary seal arrangement for a main fuel delivery orifice associated with the overspeed governor device of the invention.

FIG. 32 is a view similar to FIG. 31 in which a capillary seal is associated with the main orifice for preventing back bleeding of air into the secondary fuel delivery system when the latter is delivering fuel for engine idling and low speed operation. The overspeed governor arrangement is substantially the same as that shown in FIG. 31. The carburetor body 414m is fashioned with a bore 576m into which is press fitted a housing 578m. The ball valve 597m, spring 599m and the cap 598m are of the same construction as in FIG. 31.

The fitting 578m has a peripheral recess 579m which receives fuel through a restricted passage 590m and a fuel channel 592m in communication with the fuel chamber 425m. Mounted in the upper end of the fitting 578m is a fine mesh screen 602 or foraminous body at the outlet region of the main orifice. The capillary action of the fine mesh screen holds liquid fuel in contact therewith when the engine idling or low speed fuel feed system is in operation, the fuel at the screen 602 forming a capillary seal to prevent back bleeding of air from the mixing passage 415m into the engine idling and low speed channel system. Fuel is admitted from the chamber 425m to the chamber containing the ball valve 597m through a passage 600m in the cap 598m.

The functioning of the vibration responsive ball valve 597m is the same as that of the ball valve 597 shown in FIG. 31.

When the engine reaches a predetermined speed at which it is to be governed, the body or ball valve 597m vibrates out of phase with or responds to the engine vibration at such speed and is moved away from its seat to admit excess fuel to flow from the fuel chamber 425m past the ball valve 597m and through the capillary seal screen 602 into the mixing passage, the excess fuel providing an overrich mixture which substantially instantly reduces the engine speed thereby preventing overspeeding of the engine.

Figure 33:
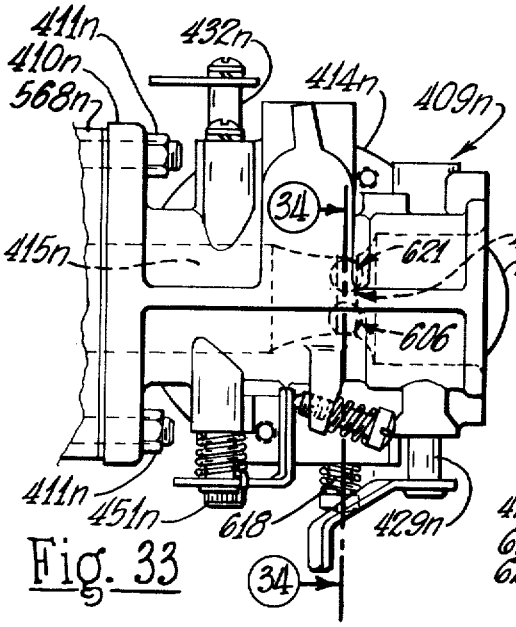
FIG. 33 is a top plan view of a carburetor similar to FIG. 28 embodying a modified form of overspeed governor device.
Figure 34:
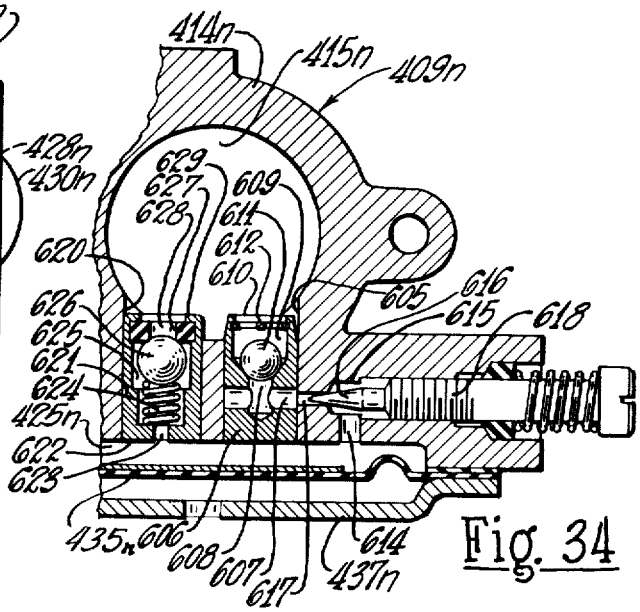
FIG. 34 is an enlarged detail sectional view taken substantially on the line 34—34 of FIG. 33.

FIGS. 33 and 34 illustrate a modified arrangement of engine overspeed governor control in a carburetor or charge forming apparatus. The carburetor 409n is of the character illustrated in FIGS. 28 through 30 and includes a carburetor body 414n provided with a mounting flange 410n adapted to be secured to a crankcase 568n of a two cycle engine by means of nuts 411n engaging studs threaded into openings in the crankcase wall. The carburetor is fashioned with a mixing passage 415n which includes a Venturi construction 428n.

The carburetor is equipped with a rotatable shaft 429n mounting a choke valve 430n, and a throttle shaft 432n supports a throttle valve (not shown) both being of the character illustrated in FIG. 29. The carburetor has a fuel chamber 425n, a wall of the chamber being a metering diaphragm 435n which, through the medium of a lever (not shown) controls a fuel inlet valve for the carburetor as in the arrangement illustrated in FIG. 30. The carburetor 409n embodies a secondary or engine idling and low speed fuel delivery system of the character illustrated in FIG. 29.

FIG. 34 illustrates a main fuel delivery orifice system and the engine overspeed governor control, the latter being a unit construction disposed adjacent the unit providing the main fuel delivery orifice. The diaphragm 435n is enclosed by a vented cover 437n. The flow of fuel into the fuel chamber is regulated by the inlet valve which is controlled by movements of the diaphragm 435n under the influence of engine aspiration in the mixing passage.

The carburetor body has a bore 605 opening into the mixing passage into which is snugly fitted a cylindrically-shaped fitting 606, the fitting having transverse openings 607 opening into a central passage 608, the latter being in communication with a counterbore 609, the outlet of the counterbore being the main orifice 610 for delivering fuel into the mixing passage for normal and high speed engine operation. The chamber provided by the counterbore 609 accommodates a check ball 611 which prevents back bleeding of air from the mixing passage into the secondary fuel delivery system when the latter is delivering fuel for engine idling and low speed operation.

Dislodgment of the check ball 611 is prevented by a gridlike retainer 612. Fuel for delivery through the main orifice 610 flows from the chamber 425n through a passage 614, bore 615, past a needle valve 616 through a restricted passage 617 and a transverse passage 607 into the central passage 608 in the fitting or housing 606.

The needle valve 616 is fashioned on a valve body 618, the latter having a threaded portion engaging in a threaded bore in the carburetor body whereby the valve body 618 may be manually adjusted to vary the position of the needle valve portion 616 relative to the restricted passage 617 to control fuel flow to the main orifice.

The carburetor body 414n is fashioned with a second bore 620 opening into the mixing passage for accommodating the overspeed governor unit, the bore 620 being preferably parallel with the bore 605 as shown in FIG. 34. The overspeed governor construction or unit illustrated in FIG. 34 includes a fitting or housing 621 of cylindrical shape which is pressed or snugly fitted into the bore 620 to the position shown in FIG. 34. The housing 621 has a bottom wall 622 provided with a restricted passage 623 opening directly into the fuel chamber 425n.

The fitting or housing 621 has a bore accommodating an expansive coil spring 624 and a counterbore 625, the latter providing a chamber accommodating a vibration responsive ball valve or body 626. An annular member 627, providing a seat for the valve 626, is contained in the fitting 621, the annular member being preferably of nonmetallic material, such as synthetic rubber or the like. The port 628, provided by the annular seat member, opens into the mixing passage 415n for delivering excess fuel into the mixing passage when the valve body 626 is displaced from a position closing the port 628.

A thin wall portion of the fitting 621 is flanged inwardly as at 629 to secure the annular seat 627 in the fitting. The main fuel delivery orifice 610 and the port or delivery orifice 628 for providing excess fuel to the mixing passage are preferably arranged to deliver fuel into the restricted or choke band region of the Venturi 428n of the mixing passage 415n. The carburetor is fashioned with an engine idling and low speed orifice arrangement of the character shown in FIG. 29, the fuel for delivery through these orifices being regulated or controlled by an adjustable needle valve 451n of a construction similar to the valve 616.

The function and operation of the overspeed governor arrangement is substantially the same as in other forms hereinbefore described. The mass of the ball 626 and the biasing pressure of the spring 624 are calibrated whereby the ball is responsive to the vibration frequency of the engine occurring at the speed at which the engine is to be governed. At this frequency of vibration the ball valve 626 is displaced from its seat and, under the influence of engine aspiration in the mixing passage 415n, fuel flows from the chamber 425n through the passage 623, the bore accommodating the spring 624, counterbore 625, past the ball valve 626, thence through the port 628 into the mixing passage.

Such excess fuel, superimposed on the normal fuel and air mixture, provides a nonignitible or slow burning mixture to substantially instantly reduce the engine speed and prevent overspeeding of the engine.

When the frequency of vibration in the engine is changed due to reduced engine speed, the ball valve 626 under the comparatively small pressure of the spring 624 is again engaged with the annular seat 627 closing the port 628, thus restoring normal engine operation by reason of the continued delivery of fuel through the main orifice providing a normal power mixture for the engine.

Figure 35:
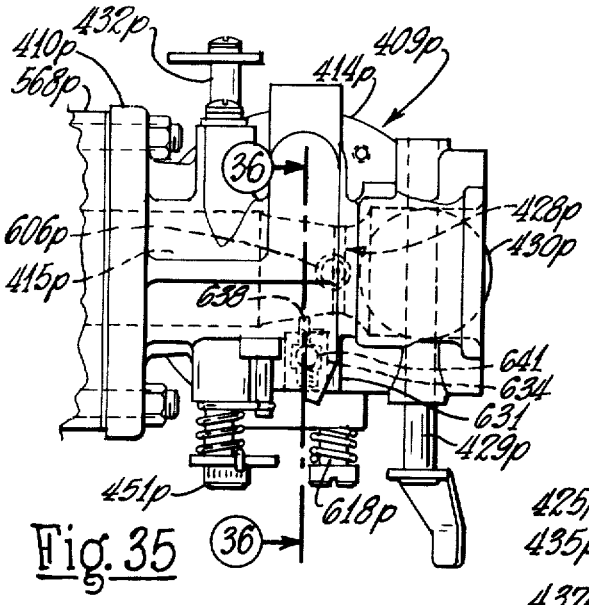
FIG. 35 is a top plan view of a charge forming apparatus similar to FIG. 33 embodying a form of overspeed governor means of the invention.
Figure 36:
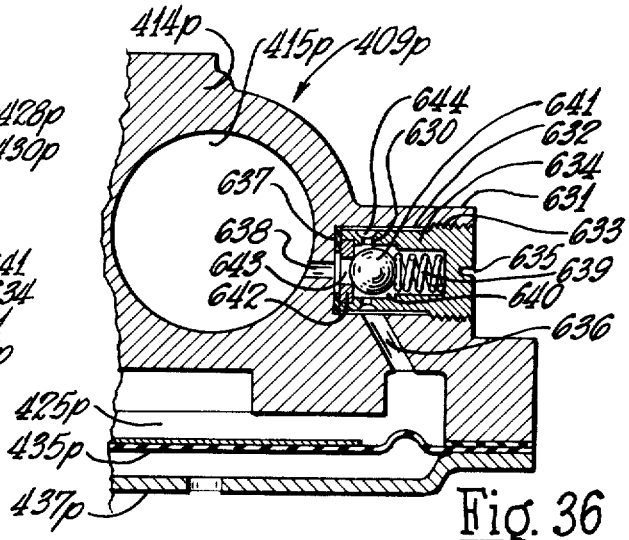
FIG. 36 is an enlarged detail sectional view taken substantially on the line 36—36 of FIG. 35.

FIGS. 35 and 36 illustrate a carburetor embodying an engine overspeed governor means arranged to deliver excess fuel into the mixing passage of the carburetor at a region downstream of the Venturi construction of the mixing passage. The carburetor illustrated in FIG. 35 is of the character shown in FIG. 33. The carburetor 409p includes a body 414p having a mounting flange 410p secured to the crankcase 568p of an engine. The carburetor body has a mixing passage 415p which includes a Venturi construction 428p.

A rotatable shaft 429p supports a choke valve 430p at the air inlet region of the mixing passage, and a second rotatable shaft 432p at the mixture outlet region supports a throttle valve (not shown). The carburetor has a main fuel delivery system of the character shown in FIG. 34, the fitting 606p being disposed with respect to the Venturi 428p as indicated in broken lines in FIG. 35. Fuel flow to the main orifice is regulated by a needle valve 618p of the character illustrated in FIG. 34. The carburetor embodies engine idling and low speed orifices (not shown) of the character illustrated in FIG. 29, fuel flow to these orifices being controlled by a needle valve 451p.

The carburetor body 414p has a circular recess forming a fuel chamber 425p, an imperforate flexible diaphragm 435p providing a flexible wall of the fuel chamber. The diaphragm is enclosed by a vented cover 437p. The body 414p embodies a fuel inlet valve (not shown) and an actuating lever (not shown) of the character illustrated in FIG. 30 whereby the inlet valve is controlled by flexing movements of the diaphragm 435p under the influence of engine aspiration in the mixing passage.

The body 414p has a boss 631 having a bore 632, a portion of which is threaded as at 633. A fitting or housing 634 extends into the bore 632 and has a threaded portion engaging the threads 633 whereby the housing 634 is secured in the bore. The outer end of the housing has a kerf 635 to accommodate a tool for threading the housing into the bore. A fuel channel 636 connects the fuel chamber 425p with the bore 632. Arranged in the end of the bore 632 is a sealing gasket 637 and a fuel delivery passage 638 in the carburetor body 414p opens into the mixing passage 415p.

The housing 634 has a bore accommodating an expansive spring 639 and a counterbore 640 accommodating a vibration responsive ball valve or body 641. Fitted in the open end of the housing 634 is an annular seat member 642 for the ball valve 641. The opening or port 643 provided by the annular seat 642 is in communication with the bore 640 and the fuel delivery passage 638. A circumferential groove or recess 644 in the exterior cylindrical surface of the housing 634 is in registration with the fuel channel 636.

Transverse passages 630 establish communication between the chamber provided by the counterbore 640 and the peripheral recess 644.

The operation of the overspeed governor arrangement illustrated in FIG. 35 is substantially the same as in the other governor units hereinbefore described. When the engine reaches the speed at which is is to be governed, the vibration-responsive ball valve 641 is vibrated by the engine vibration at the said speed, the vibration of the ball 641 displacing it from engagement with the annular seat 642 whereby fuel, under the influence of engine aspiration in the mixing passage, flows from the fuel chamber 425p through the channel 636, peripheral recess 644, transverse passage 630, chamber or bore 640, port 643 and outlet passage 638 into the mixing passage.

The excess fuel delivered under these conditions, superimposed on the normal fuel and air mixture, provides a non-ignitible or slow burning mixture which substantially instantly reduces the engine speed and thereby prevents overspeeding of the engine. Reduced speed of the engine changes the frequency of vibration and the ball valve 641 ceases to vibrate, the ball again closing the port 643 under the influence of the light pressure of the spring 639 until the engine again reaches the critical speed at which it is to be governed. As shown in broken lines in FIG. 35, the fitting 606p is disposed whereby the excess fuel for engine governing purposes is delivered into the mixing passage downstream of the restricted region or choke band of the Venturi 428p.

Figure 37:
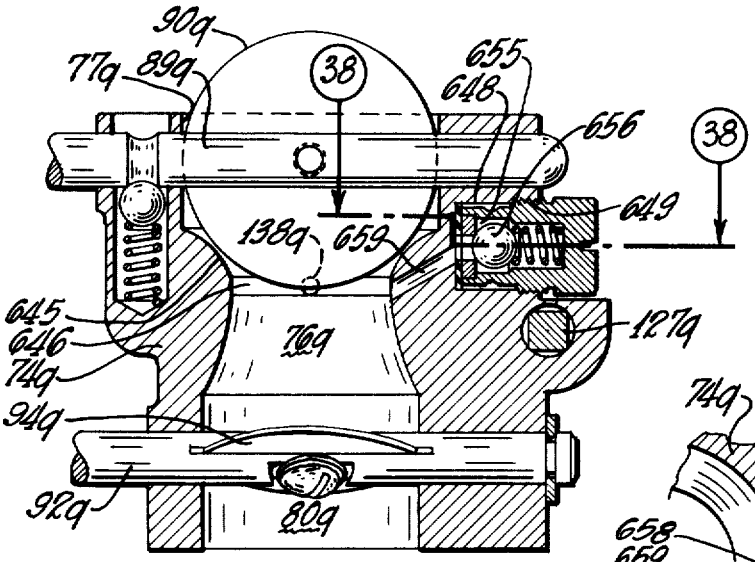
FIG. 37 is a longitudinal sectional view through a carburetor similar to FIG. 10 illustrating a modified fuel channel arrangement for the overspeed governor device.
Figure 38:
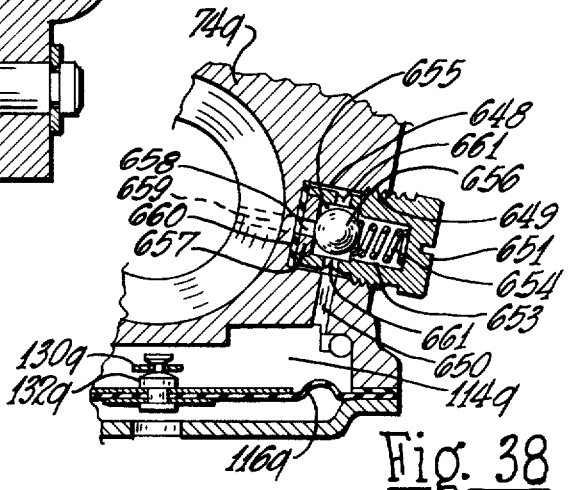
FIG. 38 is an enlarged detail sectional view taken substantially on the line 38—38 of FIG. 37.
Figure 39:
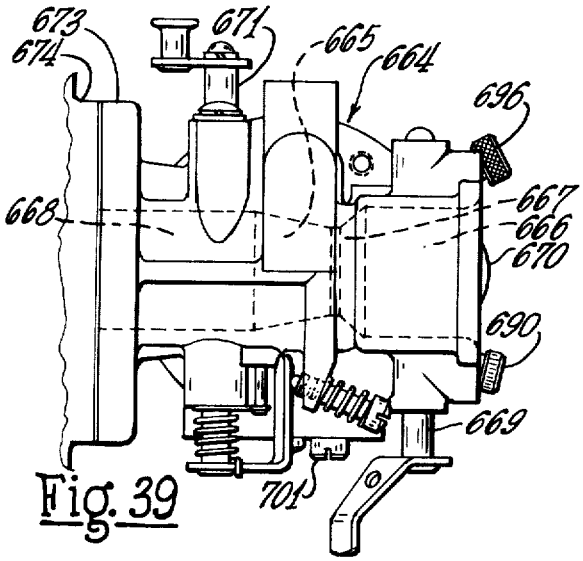
FIG. 39 is a top plan view of a diaphragm type carburetor embodying a form of overspeed governor of the invention.
Figure 40:
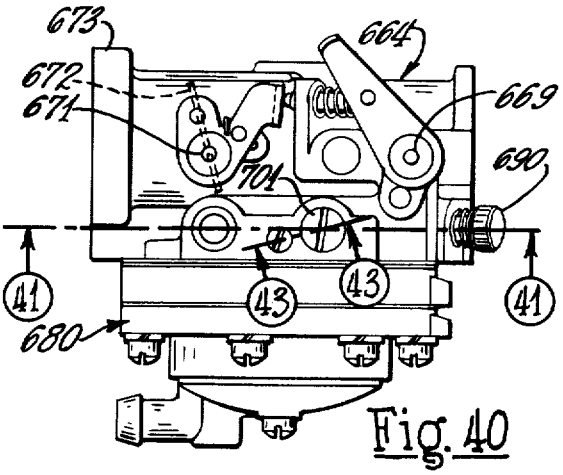
FIG. 40 is a side elevational view of the construction shown in FIG. 39.

FIGS. 37 and 38 illustrate a carburetor construction, similar to that shown in FIGS. 10 and 11, embodying a form of overspeed governor arrangement wherein the excess fuel controlled by the overspeed governor is delivered into the restricted zone or choke band of the Venturi in the mixing passage. The carburetor body 74q has a mixing passage 76q, including a Venturi construction 645 having a restricted zone 646. The mixing passage has an air inlet region 77q and a mixture outlet region 80q.

A rotatable shaft 89q at the air inlet 77q supports a choke valve 90q, and a rotatable shaft 92q at the mixture outlet region 80q and is equipped with a throttle valve 94q. The carburetor has a fuel chamber 114q, one wall of which is provided by a flexible diaphragm 116q. A member 132q mounted on the diaphragm is engaged with one end of a lever 130q fulcrumed in the fuel chamber.

A fuel inlet for the carburetor is equipped with a slidably mounted valve body 127q having an inlet valve portion of the character shown in FIG. 8 for controlling fuel flow from a supply into the fuel chamber 114q, the lever 130q having operative connection with the inlet valve body 127q of the character illustrated in FIG. 8. The fuel passage arrangement for delivering fuel from the fuel chamber 114q to a main orifice 138q and secondary orifices is of the character illustrated in FIGS. 7 through 9 hereinbefore described, the main fuel delivery orifice 138q opening into the restricted region 646 of the Venturi 645.

The engine governor or overspeed arrangement is mounted in the carburetor body 74q. The body is fashioned with a bore 648 having a threaded portion 649, the bore being in communication with the fuel chamber 114q by a passage 650. The overspeed governor arrangement includes a housing 651 having a bore 653 enclosing a coil spring 654 and a counterbore providing a chamber 655 accommodating a vibration responsive member or ball valve 656. Pressed in the open end of the housing 651 is an annular seat 657 providing a port or passage 658 which registers with a passage 659, the latter opening into the restricted region 646 of the Venturi 645.

A gasket 660 is disposed between the housing and the bottom of the bore 648. The wall of the housing is fashioned with transverse passages 661 for admitting fuel from the fuel passage 650 into the chamber 655. In this arrangement, when the ball valve 656 is vibrated away from its seat to open the port 658, fuel is delivered into the restricted region 646 of the Venturi. As engine aspiration is highest at this region of the mixing passage, rapid delivery of excess fuel occurs when the ball valve 656 is vibrated out of port closing position.

The operation of the governor arrangement is substantially the same as hereinbefore described in connection with other forms of the invention. The ball valve 656 is normally biased to port-closing position by the light pressure of spring 654. The ball valve 656 is calibrated so as to be responsive to the frequency of vibration of the engine at the speed at which it is to be governed and is vibrated away from port-closing position at such vibration frequency.

With the ball valve 656 away from port-closing position, fuel is aspirated through the delivery passage 659 into the restricted region 645 of the Venturi in the mixing passage. This excess fuel superimposed on the normal fuel and air mixture provides a nonignitible or slow burning mixture delivered to the engine with the result that the speed of the engine is quickly reduced thereby limiting or governing the maximum speed of the engine.

FIGS. 39 through 43 illustrate a diaphragm carburetor embodying a so-called dependent idling system and an overspeed governor arrangement wherein excess fuel from the fuel chamber for engine governing purposes is delivered through the main fuel orifice in addition to the normal delivery of fuel through the main orifice. The carburetor is similar to the carburetor illustrated in FIGS. 33 and 35 and includes a body 664 having a mixing passage 665, the latter having an air inlet region 666, a Venturi construction 667 and a mixture outlet region 668. A rotatable shaft 669 at the air inlet region supports a choke valve 670, and a rotatable shaft 671 at the mixture outlet region supports a throttle valve 672.

The body 664 has a mounting flange 673 for attachment to the crankcase 674 of a two cycle engine. The carburetor is fashioned with a fuel chamber 675, one wall of the chamber being a flexible diaphragm 676. The carburetor is provided with an elongated fuel inlet valve 677 controlled by movements of the diaphragm through the medium of a lever 678 fulcrumed in the fuel chamber on a fulcrum pin 679.

A pulse-actuated diaphragm pump construction 680 is secured to the carburetor body, the pump being of conventional construction for delivering liquid fuel from a supply to the region of the inlet control valve 677.

Figure 41:
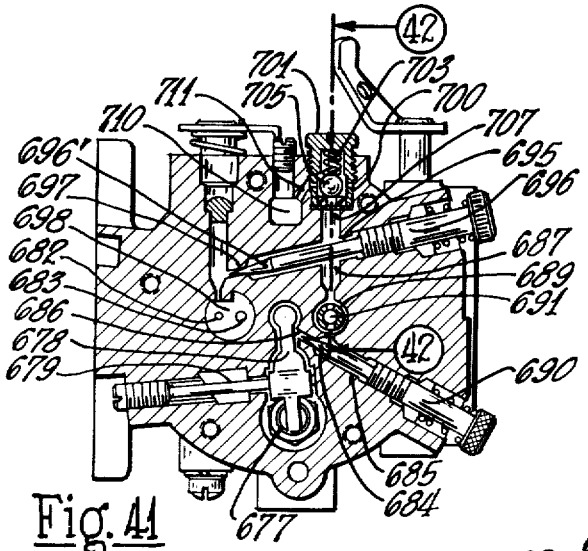
FIG. 41 is a horizontal sectional view taken substantially on the line 41—41 of FIG. 40.
Figure 42:
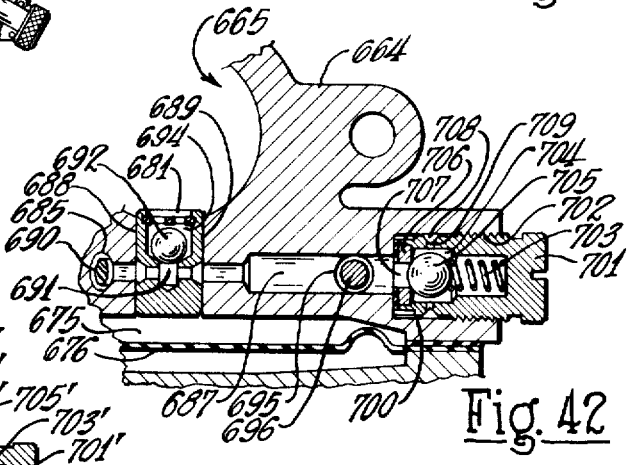
FIG. 42 is an enlarged detail sectional view taken substantially on the line 42—42 of FIG. 41.

The channel system for conveying fuel from the chamber 675 to the main orifice 681 and engine idling and low speed orifices 682 and 683 is particularly illustrated in FIGS. 41 and 42. A main or high speed fuel adjusting needle valve 684 on a valve body 690 is disposed in a bore 685 in communication with the fuel chamber 675 through a restricted passage 686. Pressed into a bore 688 is a fitting or member 689 which provides a main fuel delivery orifice 681, the fuel from bore 685 flowing through transverse passages in the fitting into a well 691 past a check ball 692 in a chamber 694 thence through the orifice 681 into the mixing passage 665.

The check ball 692 prevents back bleeding of air through the main orifice 681 into the secondary fuel delivery system when the latter is delivering fuel through one or both secondary orifices 682 and 683. The carburetor body is fashioned with a bore 695 containing an adjustable valve body 696 having a needle portion 696' which cooperates with a restricted fuel passage 697 for regulating fuel flow into a supplemental chamber 698 for the secondary orifices 682 and 683.

This fuel channel system is usually referred to as a dependent idling system as fuel for both the main orifice and the secondary orifices is derived from the fuel chamber 675 through the passage 686, the fuel for both main and secondary orifices being metered or regulated by the needle valve 684. The fuel for the secondary orifices flows through the transverse passages and the well 691, shown in FIG. 42, and through the channels or passages 687, 695 and 697 to the secondary orifices. The fuel for the secondary orifices is metered or controlled by the needle valve 696'.

Figure 43:
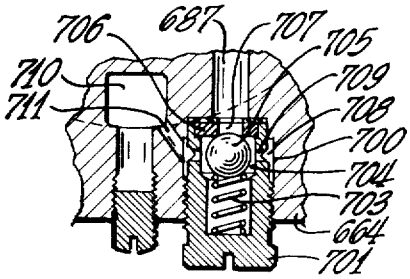
FIG. 43 is an enlarged detail sectional view taken substantially on the line 43—43 of FIG. 40.

The means for governing the engine is incorporated in the carburetor body and is particularly illustrated in FIGS. 41 through 43. The carburetor body is fashioned with a bore 700 to receive a housing 701, the housing having a threaded portion 702 threaded into a threaded portion of the bore 700. The housing 701 has a bore accommodating an expansive coil spring 703 and a counterbore 704 providing a chamber accommodating a vibration responsive body or ball valve 705. An annular seat 706 preferably fashioned of metal is pressed in an end of the housing providing a port 707 normally closed by the ball valve 705 as shown in FIGS. 42 and 43. A gasket is disposed between the annular member 706 and the bottom of the bore 700.

The housing 701 is fashioned with a peripheral recess 708 in communication with the ball chamber 704 by transverse passages 709. As shown in FIGS. 41 and 43, a recess 710 in the carburetor body is in communication with the fuel chamber 675 and a passage 711 is in communication with the bore 700 and the recess 710.

The mass of the ball valve 705 and the pressure of spring 703 are calibrated to be responsive to the frequency of vibration of the engine developed at the speed at which it is to be governed. When the ball valve 705 is responsive to the engine frequency, the ball valve is vibrated to a position opening the port 707. Engine aspiration in the mixing passage is effective through the port 707 to cause rapid fuel flow from the fuel chamber 675 through recess 710, passage 711, peripheral recess 708, transverse passages 709, chamber 704, port 707 into the bore 687, thence through the well 691 in the fitting 689, past the ball valve 692 and into the mixing passage through the main orifice 681.

The excess fuel, superimposed on the normal mixture being delivered to the engine, provides a nonignitible or slow burning mixture for the engine which quickly reduces the speed of the engine and overspeeding prevented. The reduction in engine speed changes the frequency of vibration and the ball valve 705 is again seated to close the port 707 and normal engine operation restored. This functioning of the vibration-responsive ball valve 705 is automatic whenever the engine reaches the frequency of vibration at the governed speed.

Figure 44:
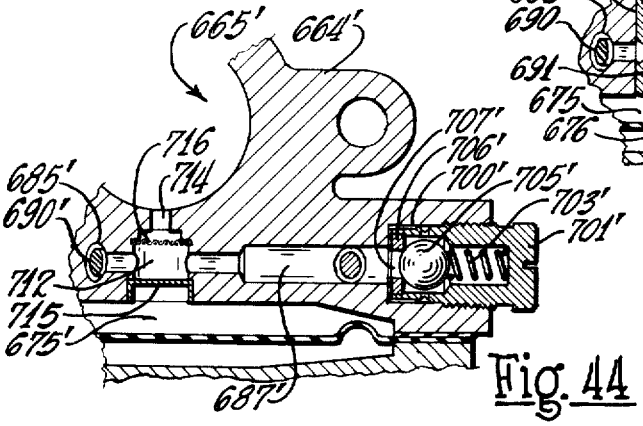
FIG. 44 is an enlarged fragmentary sectional view similar to FIG. 42 illustrating a capillary seal anti-back bleed means in the main fuel delivery orifice.

FIG. 44 illustrates the overspeed governor arrangement shown in FIG. 42 with a modified means for preventing back bleeding of air through the main orifice into the secondary fuel delivery system when the latter is delivering fuel into the mixing passage.

As shown in FIG. 44, the carburetor 664' is fashioned with a bore 700' which accommodates the housing 701' of the overspeed governor unit which is of substantially the same construction as that shown in FIG. 42. The port 707' in the annular seat 706' is in communication with a fuel passage or channel 687'.

In this form, the carburetor body is fashioned with a bore 712 providing a well beneath the main fuel delivery orifice 714. The lower end of the bore 712 is closed by a cap or plug 715. Disposed in the upper region of the bore or well 712 is a fine mesh screen 716 which provides, with the liquid fuel adhering to the screen, a capillary seal of strength sufficient to prevent back bleeding of air from the mixing passage 665' to the secondary fuel delivery system of the character shown in FIG. 41 when the secondary fuel delivery system is delivering fuel into the mixing passage.

The fuel for the main fuel orifice and the secondary orifices is obtained from the fuel chamber 675' through the bore 685', the fuel being metered or controlled by the needle valve portion of the valve body 690'. The overspeed governor unit includes a vibration responsive ball valve 705' which is biased toward portclosing position by slight pressure of the coil spring 703'.

the operation of the arrangement shown in FIG. 44 is substantially the same as the operation of the arrangement shown in FIG. 42. Fuel is delivered through the main orifice 714 from the well 712 during normal engine operation.

When the engine reaches a speed at which it is to be governed, the ball valve 705', being calibrated so as to be responsive to the frequency of engine vibration at such speed, is vibrated or moved away from port-closing position so that excess fuel, derived from the fuel chamber through the arrangement shown in FIG. 43, will flow through the port 707' thence through the main orifice 714 into the mixing passage.

The excess fuel, superimposed on the fuel being normally delivered through the main orifice 714, provides an overrich nonignitible or slow burning mixture effective to quickly reduce the engine speed whereby the engine does not exceed a predetermined speed.

The open area of the capillary seal screen 716 is sufficient to accommodate fuel flow for normal and high speed engine operation and to accommodate the excess fuel delivered through the port 707' for engine governing purposes when the ball valve 705' is vibrated away from port-closing position. It is found that a metal screen of about 200 mesh size provides with the liquid fuel a capillary seal of a strength to prevent back bleeding of air through the main orifice when the secondary orifice system is delivering fuel for engine idling or low speed operation.

Figure 45:
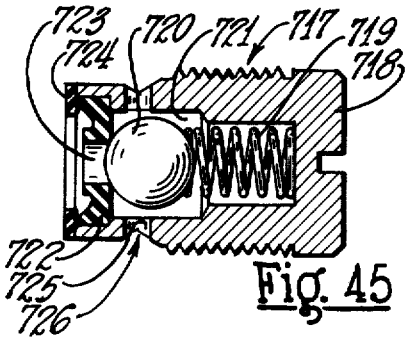
FIG. 45 is an enlarged sectional view illustrating a modified form of overspeed governor instrumentality.

FIG. 45 is a greatly enlarged sectional view of an overspeed governor unit 717 which includes a housing 718 having a threaded portion for insertion into a threaded bore in a carburetor body. The housing is fashioned with a bore accommoda-ting a coil spring 719 of light pressure engaging a vibration responsive body or ball valve 720 contained in a chamber provided by a counterbore 721.

The annular seat 722 for the ball valve may be fashioned of rubber, synthetic rubber or plastic material. The seat 722 is snugly fitted in a recess at the open end of the housing 718 and provides a port 723 normally closed by the ball valve 720.

A sealing gasket 724 is disposed to engage the end of the housing 718 and the bottom of the bore in the carburetor receiving the overspeed governor unit. The chamber 721 receives fuel from the fuel chamber in the carburetor through transverse passages 725 and a peripheral recess 726 in the manner illustrated in FIG. 38. The rubber or plastic valve seat is of advantage in that the ball seats tightly against the seat under light spring pressure. The rubber or plastic material has high wear resistant characteristics to withstand the vibration of the ball valve or body 720.

Figure 46:
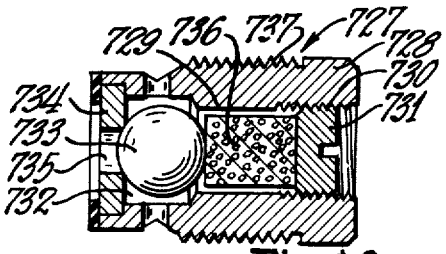
FIG. 46 is an enlarged sectional view illustrating another modification of overspeed governor means.
Figure 47:
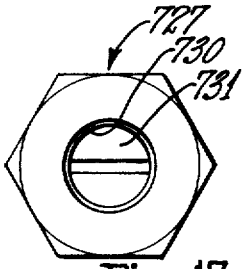
FIG. 47 is an end view of the construction of FIG. 46.

FIG. 46 is an enlarged sectional view illustrating another form of overspeed governor construction. The overspeed governor unit 727 includes a housing 728 having a bore 729 fashioned with a threaded portion 730 receiving an adjustable plug 731. The housing has a counterbore 732 accommodating a vibration responsive body or ball valve 733 which normally engages an annular valve seat 734.

Disposed between the plug 731 and the ball valve 733 is a resilient means provided by a body 736 of foam rubber or the like, the foam rubber yieldably biasing the ball valve 733 into engagement with the seat 734 closing the port 735.

The threaded plug 731 is adjustable to vary or regulate the pressure of the foam rubber body 736 exerted against the ball valve 733. The unit 727 shown in FIG. 46 is adapted to be assembled in a threaded bore in a carburetor in the manner illustrated in FIGS. 37 and 38 and hereinbefore described, the housing 728 having a threaded portion 727 which is received in a threaded portion of the bore in a carburetor body.

The operation of the overspeed governor unit 727 is substantially the same as the unit shown in FIG. 45. The ball valve 733 is calibrated to a proper mass and the plug 731 adjusted to establish a biasing pressure of the foam rubber against the ball so that when the engine reaches the speed at which it is to be governed, the ball valve 733 responds to the frequency of vibration of the engine at the governed speed and is vibrated away from port-closing position whereby excess fuel is admitted from the fuel chamber of the carburetor through the port 735 and through a channel (not shown) into the mixing passage of the carburetor. The excess fuel, superimposed on the normal fuel and air mixture, provides a nonignitible or slow burning charge which quickly reduces the speed of the engine.

Figure 48:
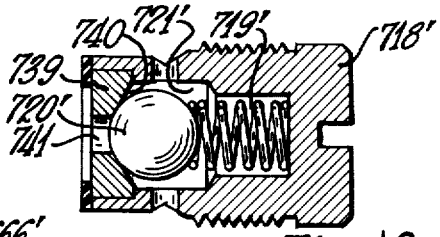
FIG. 48 is an enlarged sectional view illustrating another modified form of overspeed governor means.

FIG. 48 is an enlarged sectional view illustrating a form of overspeed governor having a valve seat of modified construction. The housing 718' is substantially the same as the housing 718 shown in FIG. 45. The housing 718' has a bore accommodating a coil spring 719', the latter engaging a vibration responsive body or ball valve 720' contained in a chamber provided by a counterbore 721'.

The arrangement includes an annular valve seat 739 fitted into a recess in the open end of the housing 718'. The valve seat 739 is fashioned with a frusto-conically shaped seat portion 740 adapted to be engaged by the ball valve 720'.

The included angle of the frusto-conically shaped seat 740 is preferably greater than 120°. The frusto-conically shaped seat is of advantage in controlling the extent of lateral movement of the ball valve 720' when it is vibrated away from a position closing the port 741 the port being in registration with a passage (not shown) for conveying excess fuel into the mixing passage of a carburetor. This special configuration of valve seat assists in the seating of the ball valve as the angularity of the seating surface is effective to guide the ball valve to a central port-closing position. The operation of the form shown in FIG. 48 in governing an engine is the same as the arrangement shown in FIG. 45.

Figure 49:
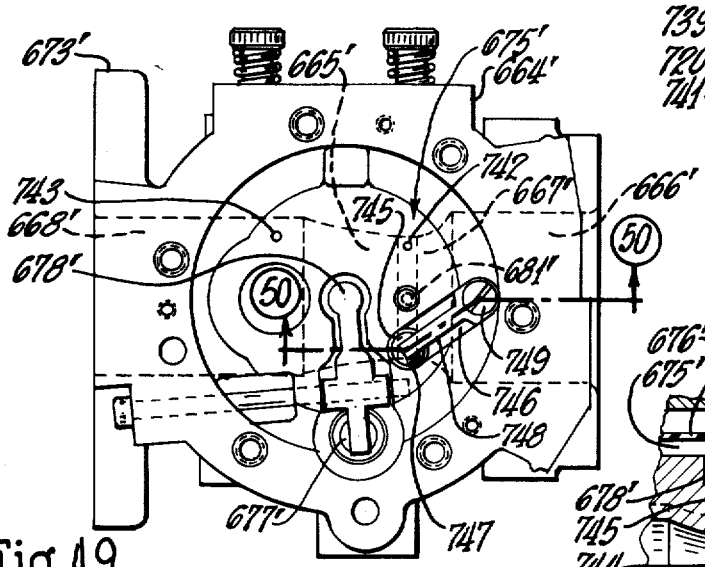
FIG. 49 is a bottom plan view of a carburetor with the diaphragm removed showing the fuel chamber, the carburetor being of the general character shown in FIGS. 39 and 40 and embodying a further modification of overspeed governor means of the invention.
Figure 50:
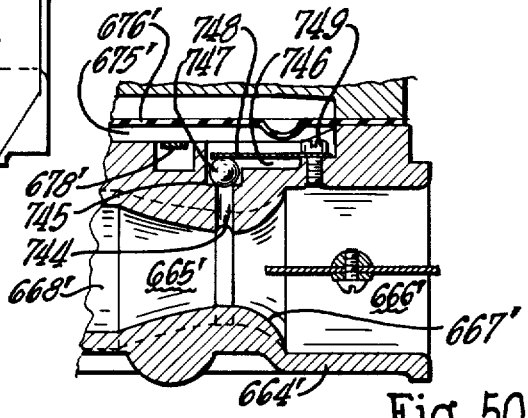
FIG. 50 is a sectional view taken substantially on the line 50—50 of FIG. 49 illustrating the overspeed governor means.

FIGS. 49 and 50 illustrate a carburetor embodying another arrangement for preventing overspeeding of an engine through the delivery of excess fuel into the normal fuel and air mixture for the engine. The carburetor shown in FIG. 49 is similar to the carburetor illustrated in FIGS. 39 through 41. The carburetor body 664' is fashioned with a mixing passage 665' having an air inlet region 666', a Venturi construction 667' and a mixture outlet region 668'. The carburetor is equipped with conventional choke valve and throttle valve constructions. The body is provided with a mounting flange 673' for mounting on a crankcase of a two-cycle engine.

The carburetor body is fashioned with a circular fuel chamber 675', a diaphragm 676' forming one wall of the chamber. The diaphragm 676' controls an inlet valve 677' through the medium of a lever 678' in the manner hereinbefore described in connection with the construction shown in FIG. 41. The carburetor includes a main fuel delivery system and secondary fuel delivery system, the main fuel delivery system including a main orifice 681' which opens into the restricted zone of the Venturi 667'. Fuel for delivery through the main orifice is derived from the fuel chamber 675' through a channel 742, and for the secondary orifice system through the channel 743.

The carburetor shown in FIGS. 49 and 50 embodies another form of engine governing means by delivering excess fuel into the engine when it has reached the speed at which it is to be governed. As shown in FIG. 50, the carburetor body is fashioned with a channel 744 opening into the restricted region of the Venturi 667'. Fashioned at the end of the channel is a circular recess 745 which opens into an elongated recess 746. Disposed in the circular recess 745 is a vibration responsive body or ball valve 747 adapted to normally close the port provided by the channel 744.

Disposed in the elongated recess 746 is a resilient means or plate spring 748, one end region of the plate spring 748 engaging the ball valve 747, the other end region of the plate spring being anchored to the carburetor body by a screw 749.

The plate spring 748 is calibrated to exert slight pressure biasing the ball valve 747 to close an end of the channel or port 744. The recess 746 is in direct communication with the fuel chamber 675' so that it is filled with liquid fuel.

The ball valve 747 and the biasing pressure of the plate spring 748 are calibrated so that when the engine reaches a speed at which it is to be governed, the frequency of vibration of the engine at such speed causes vibration of the ball valve 747 whereby the latter moves away from the entrance to the channel 744 so that fuel from the chamber 745 is aspirated from the recess 746 through the channel 744 into the Venturi 677' of the mixing passage. This excess fuel, superimposed on the normal fuel and air mixture, provides a nonignitible or slow burning mixture which quickly reduces engine speed thereby preventing overspeed of the engine.

When the engine frequency changes due to the reduced speed, the ball valve 747 ceases to vibrate out of phase with the engine and again closes the port or channel 744 under the slight biasing pressure of the plate spring 748. The spring 748 may be calibrated to exert a biasing force against the ball valve in a pressure range of from five grams to about fifty grams, depending upon the size of the engine, the governor speed desired for the engine and the vibration characteristics of the particular type of engine with which the carburetor is used.

For the average size carburetor used with chain saw engines, the body or ball valve 747 may be about five thirty-seconds of an inch in diameter and is preferably made of steel or stainless steel. If a smaller ball valve is used, then less pressure is required of the spring 748 and, if a larger ball of increased mass is used, the biasing pressure of the spring 748 is increased. While a metal plate spring 748 is preferred, this spring may be made of fuel-resistant plastic or glass reinforced plastic if desired.

Figure 51:
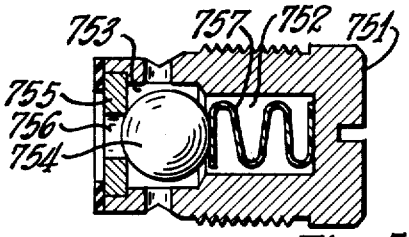
FIG. 51 is an enlarged detailed sectional view illustrating another modified form of overspeed governor means.
Figure 52:
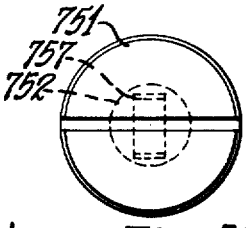
FIG. 52 is an end view of the construction of FIG. 51.

FIGS. 51 and 52 illustrate on an enlarged scale another modification of governor construction for engine governing action through the delivery of excess fuel into the normal fuel and air mixture for the engine. The housing 751, which is similar to the housing 718, is fashioned with a bore 752 in communication with a counterbore 753, the latter providing a chamber accommodating a vibration responsive body or ball valve 754 which is adapted to engage an annular seat 755 providing a port 756.

Disposed in the bore 752 is a resilient means or spring 757 which may be a ribbon of spring metal fashioned into undulated shape as shown in FIG. 51, one end region of the spring engaging the ball valve 754 and biasing it to a position closing the port 756. The undulated spring 757 may be made of material other than metal such as Teflon (polytetrafluoroethylene) or the spring may be fashioned of other plastic material reinforced with glass fibers.

The engine governing function of the arrangement shown in FIGS. 51 and 52 is the same as the function and operation of the engine governing units hereinbefore described. The unit is installed in a threaded bore in a carburetor in the manner shown, for example, in FIG. 38, or mounted so as to deliver excess fuel into the mixing passage or other region of the engine induction system, the mounting being such that the ball valve 754 is responsive to vibration of the engine at the speed at which it is desired to govern the engine.

Figure 53:
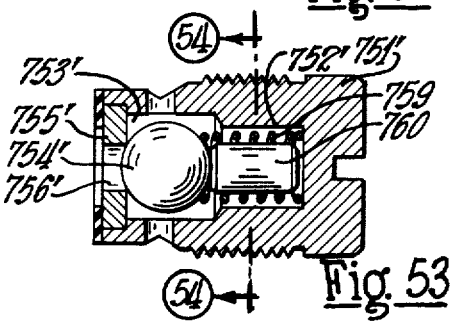
FIG. 53 is an enlarged sectional view of a further modification of overspeed governor means.
Figure 54:
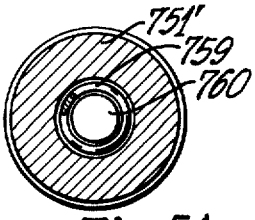
FIG. 54 is a sectional view taken substantially on the line 54—54 of FIG. 53.

FIGS. 53 and 54 illustrate on an enlarged scale another modification of means for governing an engine by delivering excess fuel into the normal fuel mixture when the engine reaches a speed at which it is to be governed. In this form the housing 751' is fashioned with a bore 752' and a counterbore 753', the latter accommodating a vibration responsive body or ball valve 754'. An annular seat 755' provides a fuel flow passage or port 756' which is normally closed by the ball valve 754'.

An expansive coil spring 759 is arranged to exert slight biasing pressure on the ball valve 754' to bias the ball valve to port closing position. Loosely mounted within the convolutions of the coil spring 759 is a relatively movable body or member 760 of cylindrical shape, the body may be made of metal or plastic material. The diameter of the cylindrical member 760 is slightly less than the inside diameter of the convolutions of the spring 759. The member 760 is of lesser length than the distance between the bottom of the bore 752' and the ball 754' so as to facilitate opening movement of the ball for fuel delivery through the port 756'.

The function of the member or body 760 is to lightly contact or engage convolutions of the spring and thereby dampen longitudinal and transverse vibrations of the spring 759, particularly under high frequency conditions where the engine is to be governed at very high speeds upwards of ten thousand revolutions per minute or more. The governor unit shown in FIG. 53 is threaded into a bore in a carburetor, for example, similar to the mounting arrangement shown in FIG. 38.

As in the other forms of the invention the ball valve 754' is calibrated so as to be responsive to the frequency of vibration developed by an engine at the speed at which it is to be governed. When the engine attains such speed, the ball valve 754' is vibrated away from its seat thereby opening the port 756' to facilitate flow of excess fuel into the mixing passage and enrichen the mixture so that it is nonignitible or slow burning in the engine, this condition causing the speed of the engine to be quickly reduced and overspeeding prevented.

Figure 55:
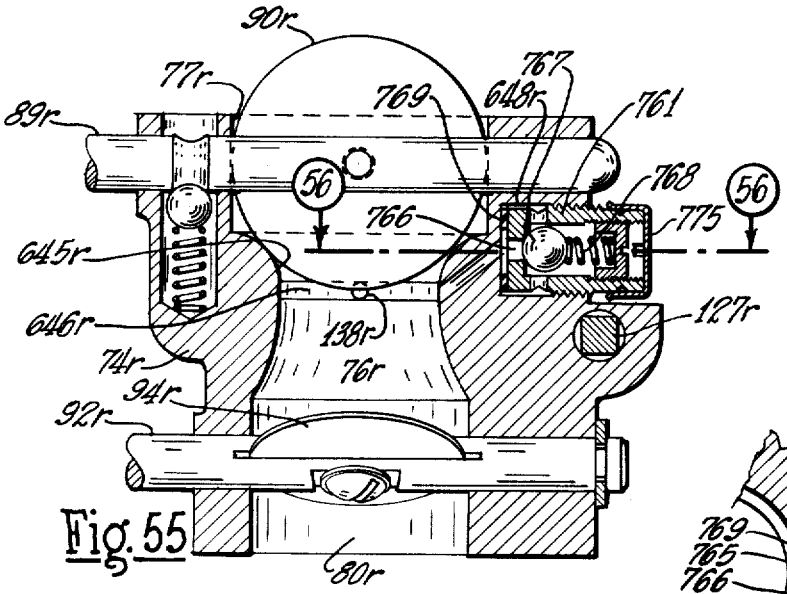
FIG. 55 is a view similar to FIG. 10 illustrating a modified form of overspeed governor construction of the invention.
Figure 56:
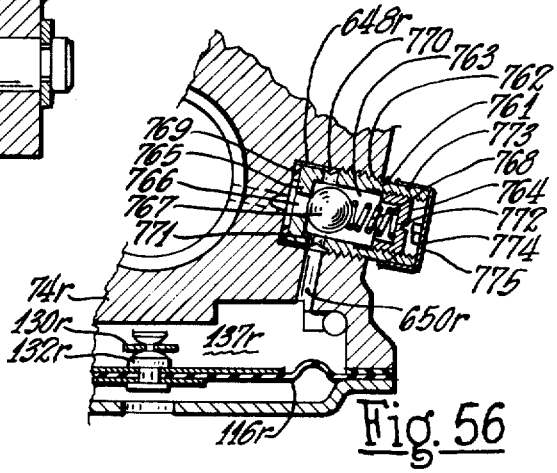
FIG. 56 is a sectional view taken substantially on the line 56—56 of FIG. 55.
Figure 57:
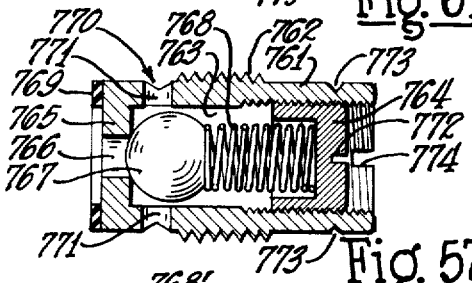
FIG. 57 is an enlarged detail sectional view of the overspeed governor construction shown in FIGS. 55 and 56.
Figure 59:
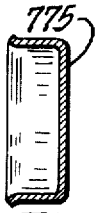
FIG. 59 is a sectional view of a closure member for the construction shown in FIG. 57.
Figure 58:
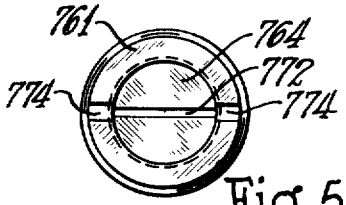
FIG. 58 is an end view of the construction shown in FIG. 57.

FIGS. 55 and 56 illustrate on an enlarged scale a carburetor construction similar to that shown in FIGS. 37 and 38 and embodying a modified form of overspeed governor arrangement, the latter being particularly illustrated in FIGS. 57 through 59 wherein excess fuel is delivered into the mixing passage when the engine attains a predetermined speed. The carburetor body 74r has a mixing passage 76r including a Venturi construction 645r having a restricted zone or choke band 646r. The mixing passage has an air inlet region 77r and a mixture outlet region 80r.

A rotatable shaft 89r supports a choke valve 90r at the air inlet region, and a rotatable shaft 92r supports a throttle valve 94r at the mixture outlet region. The carburetor body has a fuel chamber 137r, one wall of which is provided by a flexible diaphragm 116r. A member 132r mounted on the diaphragm is engaged with one end of a lever 130r fulcrumed in the fuel chamber. A fuel inlet for the carburetor is equipped with a slidably mounted valve body 127r having an inlet valve portion of the character shown in FIG. 8 for controlling fuel flow from a supply into the fuel chamber 137r.

The lever 130r has operative connection with the inlet valve body 127r of the character illustrated in FIG. 8. The fuel passage arrangement for delivering fuel from the fuel chamber 137r to a main orifice 138r and to the secondary orifices is of a character illustrated in FIGS. 7 through 9. The main fuel delivery orifice 138r preferably opens into the restricted zone 646r of the Venturi construction. The governor means or overspeed arrangement for delivering excess fuel to the engine is mounted in the body 74r. The body is fashioned with a bore 648r, the bore being in communication with the fuel chamber 137r by a passage 650r.

The overspeed governor arrangement includes a housing 761 having an exterior threaded portion 762 threaded into the bore 648r. An interior bore 763 has a threaded portion to accommodate a threaded adjustable plug or member 764. An end wall 765 of the housing is fashioned with a central opening or port 766.

Disposed in the chamber provided by the bore 763 is a vibration responsive body or ball valve 767. The plug 764 is fashioned with a recess accommodating an expansive coil spring 768 which engages the ball valve 767 and provides comparatively light pressure biasing the ball valve into engagement with the end wall 765 closing the port 766.

By adjusting the relative position of the plug 764 through its threaded connection with the housing, the pressure of the spring 768 on the ball valve may be varied. A gasket 769 is disposed between the end walls 765 and the bottom of the bore 648r. The wall of the housing is fashioned with a circumferential recess 770 and transverse passages 771 for admitting fuel from the passage 650r into the bore 763. The plug 764 is provided with a kerf 772 to receive a tool for adjusting the relative position of the plug to provide the desired spring pressure acting against the ball valve 767.

After this adjustment has been effected, the wall of the housing is indented as at 773 to secure the plug 764 permanently in adjusted position. The end of the housing at the threaded portion is provided with diametrically opposed slots or kerfs 774 to receive a suitable tool for threading the housing into the bore 648r. After the final adjustment of the plug 764 and the impression of the indentations 773 have been affected, a circular cap 775 of sheet metal or other material is frictionally driven onto the portion of the housing extending exteriorly of the carburetor body as shown in FIG. 55.

The arrangement shown in FIGS. 55 through 58 functions in the same manner as the other forms of the invention hereinbefore described. The ball valve is vibrated from its seat by engine vibration at the speed at which it is to be governed, admitting excess fuel to the mixing passage 76r thereby reducing the engine speed.

Figure 60:
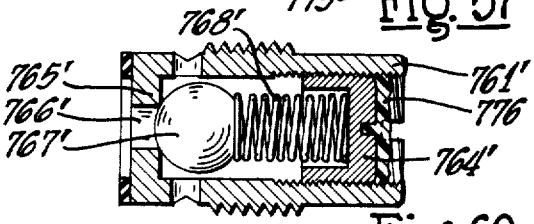
FIG. 60 is a view of the construction shown in FIG. 57 with a sealing means for sealing the adjustment in fixed position.

FIG. 60 is a view similar to FIG. 57 embodying another means for holding the adjustable member in a permanently adjusted position. The housing 761' encloses an adjustable member or plug 764' which is adjustable to vary the pressure exerted by the expansive spring 768' against the ball valve 767' to bias the latter into engagement with the seat 765' closing the port 766'. The plug or member 764' is adjusted so that the body or valve 767', under slight biasing pressure of the spring 768', is responsive to engine vibration occurring at the speed of the engine at which it is to be governed.

When these conditions of adjustment are attained, a sealing compound 776 in softened condition is inserted in the open end of the housing 761' to engage in the threads within the housing and contact the plug 764'. The sealing compound, upon hardening, provides a means securing the plug in adjusted position and prevents tampering with the adjustment. The sealing compound may be Glyptol, an epoxy resin or other suitable hardening compound. If desired, in addition to the sealing compound 776, the wall of the housing may be indented in the same manner as in the construction shown in FIG. 57.

Figure 61:
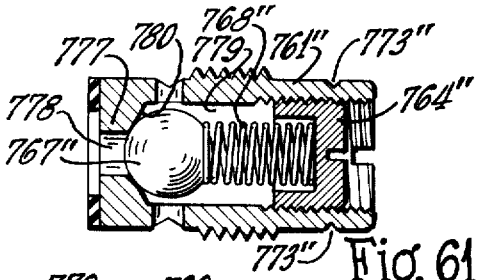
FIG. 61 is a view similar to FIG. 57 illustrating a modified form of seat configuration for the vibration responsive ball valve.

FIG. 61 illustrates on an enlarged scale an overspeed governor unit similar to that shown in FIG. 57 with a modified seat construction for the vibration responsive body or ball valve. In this form, the housing 761", the adjustable plug 764", the ball valve or vibration responsive body 767" and the spring 768" are of the same construction as shown in FIG. 57. The end wall 777 of the housing 761" is fashioned to provide a port 778 through which fuel is delivered into the mixing passage of a carburetor when the ball valve 767" is vibrated away from its seat by engine vibration. The interior surface 780 of the bottom wall of the bore 779 is of frusto-conical shape serving as a seat for the ball valve 767", the latter being under the slight pressure of the spring 768".

The frusto-conical shaped seat provided by the surface 780 is of advantage in installations with certain engines in that the ball valve 767" on its return to port closing position, after having been opened by engine vibration, is readily guided to port-closing position under the influence of the angular surface 780. The included angle of the frusto-conically shaped valve seat surface should be greater than 90° and it has been found that an included angle of 120° or more enhances the centering of the ball valve 767" in its seat.

As in the construction shown in FIG. 57, the ball valve is calibrated as to size and density and the plug 764" adjusted to the proper spring pressure to cause the ball valve to vibrate away from its seat under the influence of the frequency of vibration of the engine at the speed at which it is to be governed.

The plug 764" may be permanently held in adjusted position by forming indentations 773" in the wall of the housing 761" or by applying a sealing compound in the end of the housing as illustrated in the arrangement shown in FIG. 60.

Figure 62:
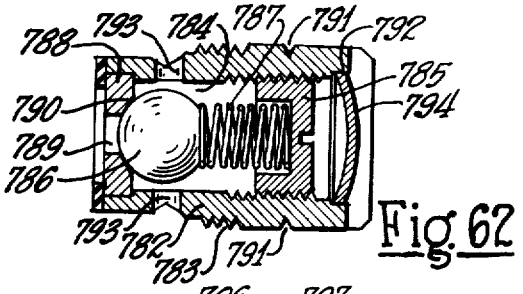
FIG. 62 is an enlarged sectional view similar to FIG. 57 illustrating a closure means for the adjustable member.
Figure 63:
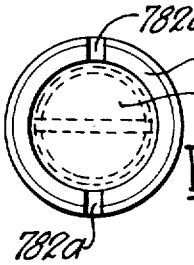
FIG. 63 is an end view of the construction shown in FIG. 62.

FIGS. 62 and 63 illustrate on an enlarged scale a form of the invention similar to FIG. 61, the arrangement embodying a closure means for the housing. The housing 782 is fashioned with external threads 783 for threading into a bore in a carburetor as, for example, in the manner shown in FIG. 55. The housing is provided with a bore 784 having a threaded portion to accommodate an adjustable member 785, the bore 784 providing a chamber in which is movably disposed a vibration responsive body or ball valve 786.

The adjustable member 785 is recessed to accommodate an expansive coil spring 787 which exerts slight pressure biasing the ball valve into its seat. Pressed or snugly fitted into one end of the housing 782 is an annular seat member 788, the central opening in member 788 providing a fuel delivery port 789 for delivering excess fuel into a mixing passage of a carburetor or other region of the engine induction system. The seat member 788 is fashioned with a frusto-conically shaped seating surface 790 for the ball valve 786. This form of valve seat is of advantage in facilitating the biasing of the ball valve toward a centered port closing position.

The member or spring seat 785 is adjustable to vary the pressure of the spring seat 787 on the ball valve 786 to assist in rendering the body or valve 786 responsive to a critical frequency of vibration of the engine at the speed at which the engine is to be governed. After this adjustment of member 785 is made, the housing is indented as at 791 to lock the member 785 in adjusted position. The housing 782 is fashioned with transverse passages 793 for admitting fuel from a fuel chamber in the carburetor into the chamber 784.

In this form of engine governor construction, the exterior end of the valve housing 782 is fashioned with a circular recess 792 into which is fitted a Welsh plug 794 which is permanently seated in the recess under impact applied to the Welsh plug in a well-known conventional manner. The end of the housing adjacent the Welsh plug is fashioned with diametrically opposed slots or kerfs 782a to accommodate a suitable tool for threading the housing 782 into a threaded bore in a carburetor.

The functioning of the ball valve is the same as in other forms of engine governing means. When the ball valve 786 is vibrated away from its seat 790 under the influence of engine vibration, fuel flows from a fuel chamber in the carburetor or other supply through chamber 784 past the ball valve 786 through the port 789 into the mixing passage or engine induction system to superimpose excess fuel on the normal fuel and air mixture to render the mixture nonignitible or slow burning in the engine, a condition which quickly reduces the engine speed thereby preventing overspeeding of the engine. The use of the Welsh plug 794 assures against tampering with or changing the adjustment of the member 785.

Figure 64:
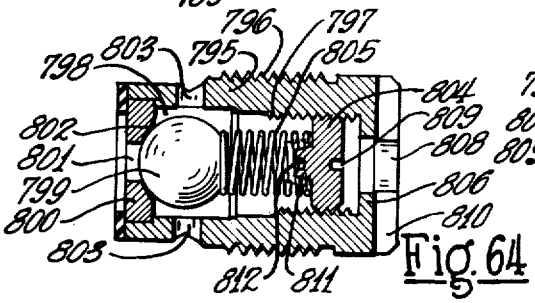
FIG. 64 is an enlarged sectional view illustrating a modified form of adjustable overspeed governor construction.
Figure 65:
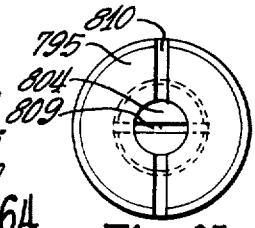
FIG. 65 is an end view of the construction shown in FIG. 64.

FIGS. 64 and 65 illustrate on an enlarged scale another form of arrangement for preventing overspeeding of an internal combustion engine, the arrangement embodying an adjustable means for regulating the pressure of a spring for biasing a vibration responsive body or ball valve toward port-closing position. The arrangement includes a housing 795 having external threads 796 for threading into a bore in a carburetor in the manner, for example, as shown in FIGS. 55 and 56. The housing 795 is fashioned with an interiorly threaded bore 797 and a counterbore 798, the counterbore 798 providing a chamber accommodating a vibration responsive body or ball valve 799 of lesser diameter than that of the counterbore.

Fitted into a circular recess in the end of the housing adjacent the counterbore is an annular seat member 800 providing a port 801 through which excess fuel is delivered from the bore 798 into the induction system of an internal combustion engine or into the mixing passage of a carburetor. The annular member 800 is fashioned with a frusto-conically shaped surface 802, similar to that shown in FIG. 61, which forms a seat for the ball valve 799. Fuel is admitted from a carburetor fuel chamber into the chamber or bore 798 through transverse passages 803.

The threaded interior bore 797 in the housing accommodates a threaded member or plug 804, an expansive coil spring 805 being disposed between the plug 804 and the ball valve 799, the spring exerting slight pressure of a few grams normally urging the ball valve into seating engagement with the surface 802.

The end wall 806 of the housing is fashioned with a central opening 808 to accommodate a tool for engagement in the kerf or slot 809 in the member 804 for manipulating or threadedly adjusting the member with respect to the housing 795 to vary the pressure of the spring against the ball valve 799.

The opening 808 is comparatively small to accommodate a tool such as a small screwdriver for engagement in the kerf 809 to adjust the member. The outer end of the housing 795 is fashioned with a diametrically arranged slot 810 for accommodating a tool for inserting the housing 795 and the assembled components into a threaded bore in a carburetor. The opposite face of the member 804 is fashioned with a raised portion 811 fashioned with a kerf or slot 812.

In assembling the components within the housing 795, the plug 804 is first inserted through the counterbore 798 and threaded to a position adjacent the end wall 806 of the housing. The kerf 812 in the raised portion 811 is provided to receive a suitable tool inserted through the counterbore in order to thread the plug 804 to the position shown. The spring 805 and the ball 799 are then inserted within the housing and the annular seat 800 snugly fitted into the recess in the inner end of the housing.

In the use of this means for supplying excess fuel to a mixing passage or other region of the induction system of an engine, the member 804 is adjusted so that the vibration responsive ball valve 799 will be critically responsive to the vibration of the engine occurring at the speed at which the engine is to be governed.

Figure 66:
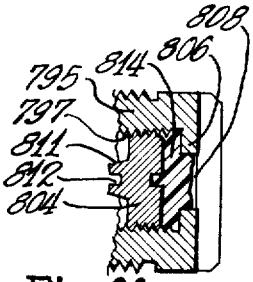
FIG. 66 is a fragmentary sectional view of a portion of the construction shown in FIG. 64 illustrating a sealing means for the adjustment.

It is desirable, when the final adjustment of the member 804 has been effected, to render this adjustment of the plug substantially permanent. FIG. 66 illustrates a means of preventing further adjustment of the member 804. A quantity of sealing material 814 in softened condition is inserted through the opening 808 in the end wall 806 of the housing to fill the space between the housing end wall and the member of plug 804 as shown in FIG. 66. The sealing material 814, upon hardening, forms an effective locking or sealing means to prevent tampering with the member 804.

The operation and functioning of the arrangement shown in FIGS. 64 through 66 is the same as the other forms of engine overspeed governing arrangements hereinbefore described. The vibration responsive ball valve 799 is vibrated away from its seat when the frequency of vibration of the engine at the speed to be governed is attained and excess fuel delivered from the bore or chamber 798 through the port 801 and into the mixing passage under the influence of engine aspiration. The excess fuel, superimposed upon the normal fuel and air mixture, provides a nonignitible or slow burning mixture in the engine which quickly causes a reduction in engine speed and prevents overspeeding of the engine.

Figure 67:
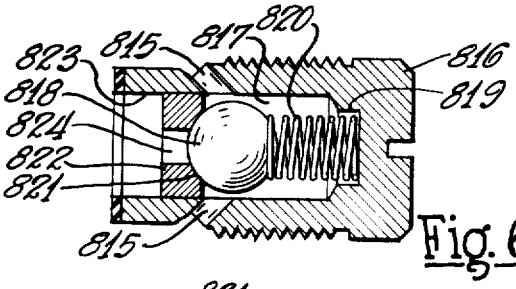
FIG. 67 is an enlarged sectional view illustrating another form of overspeed governor construction of the invention.
Figure 68:
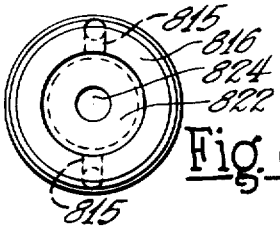
FIG. 68 is an end view of the construction shown in FIG. 67.

FIGS. 67 and 68 illustrate on an enlarged scale another form of means for delivering excess fuel into an engine induction system for preventing overspeeding of the engine.

In this form of the invention, the seat for the ball valve is slidably adjustable in order to vary the pressure of the resilient means or spring for biasing the ball valve to port-closing position. The valve housing 816 is fashioned with a counterbore 817 accommodating a vibration responsive body or ball valve 818. The bore or chamber 817 is adapted to receive fuel from a fuel chamber in a carburetor through the laterally arranged passages 815 provided in the wall of the housing.

A closed end region of the housing is fashioned with a recess 819 accommodating a coil spring 820, the latter being disposed between the bottom of the recess and the ball valve 818, the spring normally biasing the ball valve into engagement with a valve seat surface 821 of an annular seat member 822. In this form of construction, the smooth exterior cylindrical surface of the annular seat member 822 is snugly fitted or pressed into the smooth cylindrical surface 823 defining the bore 817.

The relative position of the annular seat member 822 in the bore in the housing determines the extent of initial compression of the spring 820 and hence the force biasing the ball valve 818 into engagement with the seating surface 821 of the seat member. By slidably adjusting the position of the annular seat member 822 lengthwise in the bore 817 and thus regulating the spring pressure biasing the ball valve to a position closing the port 824 in the seat member, the ball valve 818 may be rendered more critically responsive to a frequency of vibration of an engine occurring at the speed at which the engine is to be governed.

Thus when the engine vibration reaches a frequency with which the ball valve 818 is responsive, the ball valve 818 is vibrated away from its seat 821 and permits delivery of excess fuel from the bore 817 through the open port 824 into the mixing passage of the carburetor or other region of the engine passage to effect an overrich mixture for the engine and thereby reduce the speed of the engine. The annular seat 822 has a snug fit in the cylindrical surface 823 so that the annular seat when pressed into the housing to a certain position will remain in such a position without additional anchoring means.

Figure 69:
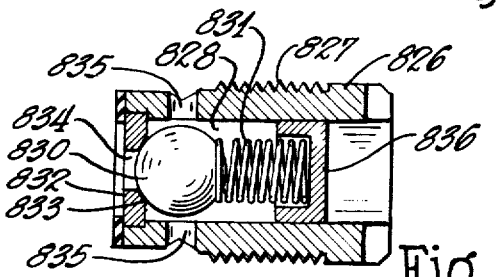
FIG. 69 is an enlarged sectional view illustrating another form of overspeed governor construction.
Figure 70:
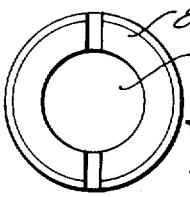
FIG. 70 is an end view of the construction shown in FIG. 69.

FIGS. 69 and 70 illustrate on an enlarged scale another modification of means for preventing overspeeding of an internal combustion engine. This arrangement includes a housing 826 fashioned with exterior threads 827 for threading the housing into a threaded bore in a carburetor such as in the arrangement shown in FIGS. 55 and 56. The valve housing 826 has an interior smooth walled bore 828 in which is disposed a vibration responsive body or ball valve 830 and an expansive coil spring 831.

An annular seat member 832 is pressed or snugly fitted into a circular recess in one end region of the housing, the annular member preferably having a frusto-conically shaped surface 833 which is engaged by the ball valve 830 normally closing a port 834 provided by the annular seat member 832. A wall of the housing is fashioned with transverse passages 835 which are in communication with the fuel chamber of the carburetor to convey fuel into the bore 828.

In this form of construction, a cup-shaped plug 836 has a smooth cylindrical exterior surface of a dimension to be snugly fitted or pressed into the smooth cylindrical wall of the bore 828, the spring 831 being received in the recess in the plug 836. The plug 836 is driven or forced into the bore 828 a sufficient distance to compress the spring 831 so as to exert slight pressure against the ball valve 830 biasing the latter into engagement with the seating surface 830 closing the port 834 in the seat member 832.

By regulating the biasing pressure of the spring 831 by forcing the plug 836 into the bore to a particular position, the ball valve 830 may be rendered responsive to the frequency of vibration of an engine at the speed at which the engine is to be governed. When the engine attains such frequency, the ball valve 830 is vibrated away from its seat 833 to open the port 834 whereby fuel is aspirated into the mixing passage from the bore 828 through the port 834 providing excess fuel in the mixing passage which, superimposed upon the normal fuel and air mixture, results in overrich mixture delivered to the engine causing the engine to be quickly reduced in speed and overspeeding of the engine prevented.

Figure 71:
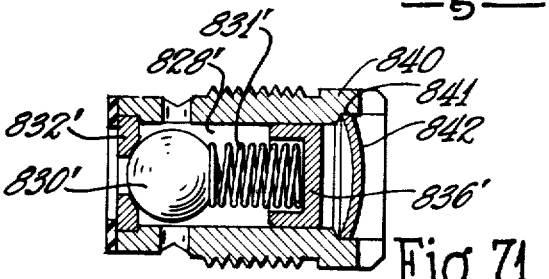
FIG. 71 is an enlarged sectional view similar to FIG. 69 illustrating a closure for the housing of the overspeed governor construction.
Figure 72:
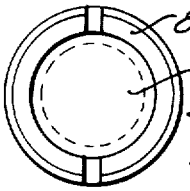
FIG. 72 is an end view of the construction shown in FIG. 71.

FIGS. 71 and 72 illustrate a form of construction similar to that illustrated in FIGS. 69 and 70. In this form the ball valve 830', the spring 831', the annular seat 832' and the plug or member 836' are substantially the same as the corresponding components in the form shown in FIG. 69.

The valve housing 840 is fashioned with a counterbore 841 to receive a Welsh plug 842, the latter closing the entrance to the bore 828' in the housing. By closing the end of the housing 840 with the Welsh plug 842, the member 836' cannot be moved or tampered with by an operator so that the arrangement will properly perform its governing function at all times.

In the forms of the invention hereinbefore described, the vibration responsive body is of substantially spherical or ball shape. A ball-shaped body is responsive to vibration irrespective of the relative position of the engine with which it is used. Primary vibrations of an engine of the reciprocating type are caused by movements of the engine piston at different rates during each cycle of reciprocation. This condition is inherent by reason of the different rectilinear distances of travel of the piston at changing angularities of the connecting rod with respect to the piston and the crankshaft.

Such nonuniformity of linear increments of distances traversed by the piston for uniform angular positions of the crankshaft cause vibrations of the engine primarily in the direction of reciprocation of the engine piston. Hence, the spherically-shaped body or ball valve, being capable of transverse and lengthwise movements, is responsive to the frequency of vibrations of the engine at a particular speed irrespective of the relative position of the housing enclosing the ball valve with respect to the engine.

Figure 73:
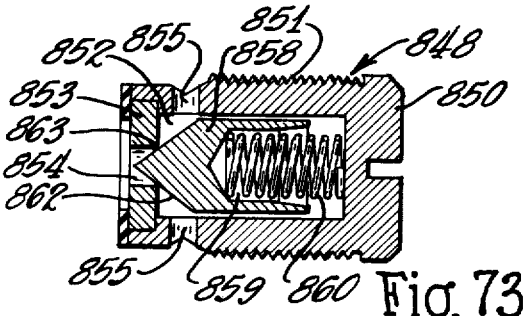
FIG. 73 is an enlarged longitudinal sectional view illustrating another form of overspeed governor means.
Figure 74:
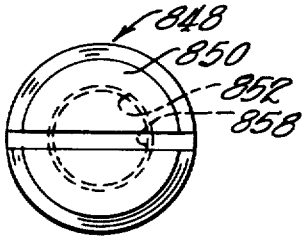
FIG. 74 is an end view of the construction illustrated in FIG. 73.

FIGS. 73 and 74 illustrate on an enlarged scale an overspeed governor arrangement embodying a vibration responsive body of a character which is responsive to engine vibrations when positioned whereby the vibration responsive body will vibrate relative to the engine in a path which is in substantial parallelism with the direction of primary vibrations of the engine established by piston reciprocation. The overspeed governor unit 848 includes a valve housing 850 fashioned with exterior threads 851 for threading the housing into a threaded bore in a carburetor.

The housing has an elongated bore 852, the open end region of the bore being fashioned with a recess to accommodate an annular member 853, the opening in the central region of the annular member providing a fuel delivery port 854. Fuel is admitted into the bore 852 from a fuel chamber in a carburetor through transverse passages 855. An elongated vibration responsive body 858 of cylindrical shape has a cylindrical recess 859 accommodating an expansive coil spring 860 which abuts against the end of the bore 852.

The cylindrically-shaped body 858 is fashioned with a conically-shaped valve portion 862 which extends into and seats against a circular edge 863 normally closing the port 854. The cylindrical portion of the body is of lesser diameter than the bore 852 so as to be loosely slidable in the bore 852 along its longitudinal axis substantially coincident with the axis of the bore 852. The body 858 is of a size and density so as to be responsive to the frequency of vibrations which occur at the speed at which the engine is to be governed in a direction coincident with or substantially parallel to the longitudinal axis of the body 858.

Figure 75:
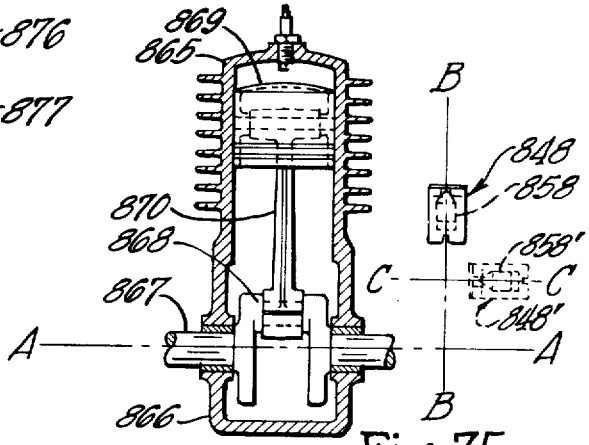
FIG. 75 is a schematic sectional view of a reciprocating piston engine illustrating the relationship of the overspeed governor means shown in FIG. 73 with moving components of an engine for attaining overspeed governor operation.

FIG. 75 is a schematic illustration of a reciprocating piston engine and relative positions for the means shown in FIG. 73 wherein the body 858 will be responsive to engine vibrations and other positions wherein the elongated body 858 will be substantially uneffected by engine vibrations. The engine illustrated in FIG. 75 includes a cylinder 865, a crankcase 866, a crankshaft 867 journaled in the crankcase and having a crank arm 868, a piston 869 reciprocable in the cylinder and a conventional connecting rod 870 connecting the piston with the crank arm 868. The axis of rotation of the crankshaft is indicated at the line AA.

During operation of the engine, the primary vibrations of the engine are in paths normal to the axis of the crankshaft AA with the major engine vibrations being in the general direction of the path of reciprocation of the piston although other secondary vibrations occur in directions also normal to the axis AA by reason of the rotation of the crank arm 868 of the crankshaft and the oscillatory movements of the connecting rod 870. In order for elongated valve body 858 of the overspeed governor unit 848 to be responsive to engine vibrations it must be positioned for movement in a direction or directions substantially normal to the axis of rotation AA of the crankshaft.

Thus, as shown in FIG. 75, the axis of the vibration responsive body 858 is positioned on a line BB which is normal to the line AA and preferably substantially parallel to the path of reciprocation of the piston 869.

In this position the elongated body 858 will be vibrated lengthwise from its seat, that is, coincident or parallel with the axis BB when the vibration frequency of the engine attains a speed at which it is desired to govern the engine to admit excess fuel from the bore 852 through the port 854 into the carburetor mixing passage. As the primary vibrations of the engine are of greatest amplitude in a direction of reciprocation of the piston 869, the vibration responsive body 858 positioned with its axis parallel with the axis of reciprocation of the piston will be vibrated by the engine vibrations of a frequency for which the valve or body 858 is calibrated.

From the foregoing description it will be apparent that the overspeed governor unit 848, shown in FIG. 73, must be disposed with the axis of the vibration responsive body 858 normal to the axis AA of rotation of the engine crankshaft as otherwise the body 858 will not be responsive to engine vibrations at any speed. For example, if the unit 848 is disposed in the position illustrated at 848' with the axis of the vibration responsive body 858' on an axis CC substantially parallel with the axis AA of the engine crankshaft, the vibration responsive body in such position is substantially uneffected by engine vibrations at any speed.

Figure 76:
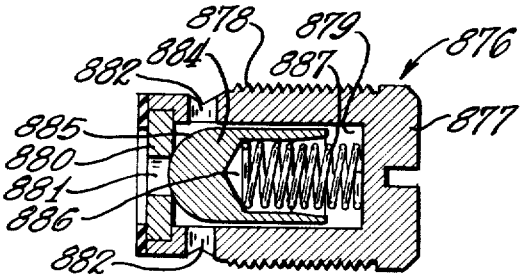
FIG. 76 is an enlarged sectional view of another modification of the overspeed governor means of the invention.

FIG. 76 illustrates on an enlarged scale an engine overspeed governor unit 876 embodying a housing 877 having exterior threads 878 for threading the housing into a threaded bore in a carburetor.

The housing has a bore 879 and an annular seat member 880 fitted into a recess fashioned at the open end of the housing, the annular member 880 providing a port 881. The bore 879 receives fuel from a fuel chamber in the carburetor through transverse passages 882. An elongated, cylindrically-shaped vibration responsive body or valve 884 is slidably disposed in the bore 879, the body having a semispherically-shaped or rounded end region 885 which forms a valve portion of the body, the semi-spherically-shaped portion being arranged for engagement with the seat 880 to close the port 881.

The elongated body 884 is formed with a recess 886 accommodating an expansive coil spring 887, the latter adapted to exert slight pressure on the elongated body for normally biasing the valve portion or surface 885 into a position closing the port 881. The body 884, being of cylindrical shape and restricted to movement axially of the body, must be positioned so that movement of the body 884 is in a direction normal to the axis of the crankshaft of an engine designated by the line AA in FIG. 75. The body 884 of the governor unit construction 876 will not be affected by vibrations of an engine if the unit is in a position with the axis of the body 884 disposed on an axis parallel with the crankshaft axis AA, that is, in a position on the line CC of FIG. 75.

In the drawings the several forms of overspeed governor unit of the invention have been greatly enlarged for purposes of illustration. Typical average dimensions for an overspeed unit are as follows:

The housing of the governor unit is usually about five-sixteenths of an inch in diameter, the chamber containing the ball valve being about three-sixteenths of an inch in diameter, and the ball valve, which is responsive to engine vibrations, is about five thirty-seconds of an inch in diameter. The housing of the unit is about seven-sixteenths of an inch in length.

It is to be understood that these dimensions may be varied depending upon the size of the engine with which the device is used and the amount of excess fuel to be delivered through the governor unit necessary to enrichen the mixture to an extent that the overrich mixture in the engine is either nonignitible or slow burning so as to quickly reduce the engine speed and prevent overspeeding of the engine. The resilient means or springs biasing the ball valves toward port-closing position are usually calibrated to exert a pressure of between five grams and 50 grams depending upon the size or mass of the vibration responsive valve, the size of the fuel port controlled by the valve, the particular speed at which the engine is to be governed, the size of the engine and the amount of excess fuel to be delivered for engine governing purposes in accordance with the principles of the invention as herein described.

It is apparent that, within the scope of the invention, modifications and different arrangements may be made other than as herein disclosed, and the present disclosure is illustrative merely, the invention comprehending all variations thereof.

We claim:

[1. A valve unit of the character disclosed including, in combination, a cylindrically-shaped housing having a bore therein defining a chamber, a ball-shaped valve member disposed for relative movement in the chamber, a seat for the valve member shaped to define a fuel port, spring means in the housing normally biasing the valve member to port-closing position, said spring means being the sole force biasing the valve member to port-closing position, passage means opening into the chamber for admitting fuel from a supply into the chamber, the mass of the valve member and the pressure of the spring means being calibrated to be responsive to a predetermined frequency of vibration to effect movement of the valve member at said frequency away from port-closing position to permit fuel flow through said port.]

2. The combination according to claim [1] *8* including an adjustable abutment element in said housing engaging the spring means.

3. The combination according to claim 2 wherein the abutment element has threaded engagement with the housing for adjusting the relative position of the element.

4. The combination according to claim 2 including a closure for the end of the bore in the housing adjacent the adjustable abutment.

5. The combination of claim 4 wherein the closure is a cap frictionally engaging an exterior surface region of the housing.

6. The combination according to claim [1] *8* wherein the seat for the valve member has a frusto-conically shaped surface for engagement with the valve member.

7. The combination according to claim [1] *8* wherein the seat for the valve member is of annular shape, and a circular recess in an end region of the housing, said annularly-shaped seat being snugly disposed in said circular recess.

*8. An overspeed governing valve assembly for an internal combustion engine, which valve assembly is responsive to engine vibrations to introduce additional fuel into the engine for engine speed control, and which assembly includes, in combination, a cylindrically-shaped housing defining a first chamber, a ball-shaped valve member in said chamber disposed for relative movement therein in either a transverse or lengthwise direction regardless of the housing position with respect to the engine, said housing defining a seat for the valve member, which seat defines a fuel port, spring means in the housing normally biasing the valve member to port-closing position, said housing defining a fuel chamber and a mixing passage, operation of the engine developing a pressure differential between the pressures in the fuel chamber and mixing passage, both of which pressures are below atmospheric pressure, said spring means in cooperation with said pressure differential combining to bias said ball-shaped valve member to the port-closing position, and said housing defining a fuel passage opening into the first chamber for admitting fuel into the first chamber, the mass of the valve member and the pressure of the spring means being calibrated to be responsive to a predetermined frequency of engine vibration to effect movement of the valve member at said predetermined frequency away from the port-closing position to permit fuel flow through said fuel port.*

* * * * *